US006658652B1

(12) United States Patent
Alexander, III et al.

(10) Patent No.: US 6,658,652 B1
(45) Date of Patent: Dec. 2, 2003

(54) METHOD AND SYSTEM FOR SHADOW HEAP MEMORY LEAK DETECTION AND OTHER HEAP ANALYSIS IN AN OBJECT-ORIENTED ENVIRONMENT DURING REAL-TIME TRACE PROCESSING

(75) Inventors: William Preston Alexander, III, Austin, TX (US); Frank Eliot Levine, Austin, TX (US); William Robert Reynolds, Austin, TX (US); Robert J. Urquhart, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 492 days.

(21) Appl. No.: 09/589,798

(22) Filed: Jun. 8, 2000

(51) Int. Cl.[7] .................................................. G06F 9/44

(52) U.S. Cl. ............................... 717/128; 711/1; 711/6; 711/100; 711/152; 707/206; 707/173; 714/42.47

(58) Field of Search ............................ 717/128; 714/42, 714/47; 711/1, 6, 100, 152, 173; 707/206

(56) References Cited

U.S. PATENT DOCUMENTS

| | | | | |
|---|---|---|---|---|
| 4,746,920 A | | 5/1988 | Nellen et al. | 340/825.2 |
| 4,821,220 A | | 4/1989 | Duisberg | 703/2 |
| 5,047,919 A | | 9/1991 | Sterling et al. | 714/47 |
| 5,161,226 A | | 11/1992 | Wainer | 710/264 |
| 5,179,702 A | | 1/1993 | Spix et al. | 709/102 |
| 5,307,499 A | | 4/1994 | Yin | 717/139 |
| 5,355,487 A | | 10/1994 | Keller et al. | 717/127 |
| 5,371,878 A | | 12/1994 | Coker | 703/28 |
| 5,408,650 A | * | 4/1995 | Arsenault | 717/124 |

(List continued on next page.)

FOREIGN PATENT DOCUMENTS

| | | | |
|---|---|---|---|
| DE | WO 94/14117 | 6/1994 | G06F/11/00 |
| DE | 296 00 609 U1 | 3/1997 | G05B/19/05 |
| JP | 5-303533 | 11/1993 | G06F/9/06 |
| WO | WO 96/12224 | 4/1996 | G06F/9/445 |

OTHER PUBLICATIONS

Gupta, Aloke and Fuchs, W. Kent, "Garbage Collection in a Distributed Object–Oriented System", 1993 IEEE, p. 257–265, retrieved from the IEEE database Dec. 5, 2002.*

(List continued on next page.)

*Primary Examiner*—Gregory Morse
*Assistant Examiner*—Mary Steelman
(74) *Attorney, Agent, or Firm*—Duke W. Yee; Leslie A. Van Leeuwen; Stephen J. Walder, Jr.

(57) ABSTRACT

A method and system for detecting memory leaks in an object-oriented environment during real-time trace processing is provided. During the profiling of a program executing in a data processing system, a profiler processes events caused by the execution of the program, and the profiler maintains a profile data structure containing execution-related metrics for the program. The execution-related metrics may include object allocation and deallocation metrics that are associated with object processing initiated on behalf of an executing method. An object allocator allocates objects during the execution of the program and modifies object allocation metrics in the profile data structure. Object metrics are stored in a particular location and a pointer to that location is stored in a hash table associated with the object's ID. In another embodiment the pointer to the location is stored in a shadow heap in the same relative position as the position of the object in the heap. The object allocation metrics and the object deallocation metrics may be compared to identify memory leaks.

48 Claims, 24 Drawing Sheets

U.S. PATENT DOCUMENTS

| | | | |
|---|---|---|---|
| 5,442,758 A | | 8/1995 | Slingwine et al. .............. 707/8 |
| 5,450,586 A | | 9/1995 | Kuzara et al. .............. 717/124 |
| 5,459,868 A | | 10/1995 | Fong .......................... 717/139 |
| 5,483,654 A | | 1/1996 | Staron et al. ............... 345/763 |
| 5,485,574 A | | 1/1996 | Bolosky et al. ............... 714/35 |
| 5,509,070 A | | 4/1996 | Schull .......................... 705/54 |
| 5,613,118 A | | 3/1997 | Heisch et al. ............... 717/158 |
| 5,682,328 A | | 10/1997 | Roeber et al. .............. 702/187 |
| 5,689,707 A | * | 11/1997 | Donnelly .................... 707/206 |
| 5,706,515 A | | 1/1998 | Connelly et al. ........... 709/106 |
| 5,742,672 A | | 4/1998 | Burk ..................... 379/201.12 |
| 5,761,380 A | | 6/1998 | Lewis et al. .................. 706/47 |
| 5,768,500 A | | 6/1998 | Agrawal et al. .............. 714/47 |
| 5,799,143 A | | 8/1998 | Butt et al. ..................... 714/38 |
| 5,845,077 A | | 12/1998 | Fawcett ..................... 709/221 |
| 5,872,909 A | | 2/1999 | Wilner et al. ................. 714/38 |
| 5,884,080 A | | 3/1999 | Blandy et al. .............. 717/130 |
| 5,884,082 A | | 3/1999 | Seidel et al. ................ 717/128 |
| 5,900,001 A | * | 5/1999 | Wolczko et al. ............ 707/206 |
| 5,908,470 A | | 6/1999 | Stonecypher, Jr. .......... 713/502 |
| 5,911,144 A | * | 6/1999 | Schwartz et al. ........... 707/206 |
| 5,919,247 A | | 7/1999 | Van Hoff et al. ........... 709/217 |
| 5,920,876 A | * | 7/1999 | Ungar et al. ................ 707/206 |
| 5,964,846 A | | 10/1999 | Berry et al. ................ 709/400 |
| 5,966,540 A | | 10/1999 | Lister et al. ................ 717/174 |
| 5,978,578 A | | 11/1999 | Azarya et al. .............. 717/100 |
| 5,991,543 A | | 11/1999 | Amberg et al. ............. 717/175 |
| 5,995,757 A | | 11/1999 | Amberg et al. ............. 717/175 |
| 6,006,035 A | | 12/1999 | Nabahi ....................... 717/175 |
| 6,093,216 A | * | 7/2000 | Adl-Tabatabai et al. .... 717/128 |
| 6,105,040 A | * | 8/2000 | Agesen ....................... 707/206 |
| 6,199,075 B1 | * | 3/2001 | Ungar et al. ................ 707/206 |
| 6,338,159 B1 | * | 1/2002 | Alexander et al. .......... 717/128 |
| 6,349,406 B1 | * | 2/2002 | Levine et al. ............... 717/128 |

OTHER PUBLICATIONS

Petit–Bianco, Alexandre, "Java Garbage Collection for Real–Time Systems", Dr. Dobb's Journal Oct. 1998, retrieved from a google.com search Dec. 5, 2002. www.d-dj.com/documents/s=915/ddj9810a/9810a.*

Venners, Bill, "Java's garbage–collected heap", Java World, 1996, retireved from a google.com search Dec. 5, 2002. www.javaworld.com/javaworld/jw–08–1996/jw–08–gc__ p.*

Zorn, Benjamin and Grunwald, Dirk, "Evaluating Models of Memory Allocation", 1994 ACM, retrieved from the ACM database Dec. 5, 2002.*

Data Structure and Insertion Algorithm for Representing Asynchronous Occurrences for Visualization by Trace Visualization Tools using Ghant Charts with Occurrence Hierarchies; International Business Machines Technical Disclosure Bulletin; Vol 36, No 07, Jul. 1993; pp. 547–557.

Adaptive Trace–Directed ProgramRestructuring; International Business Machines Technical Disclosure Bulletin; vol. 37 No. 02B, Feb. 1994; pp. 115–116.

Profiling and Tracing Dynamic Library Usage Via Interposition; Curry; USENIX Conference; 1994; pp. 267–278.

Application of Interpreter for Debugging Functions; International Business Machines Technical Disclosure Bulletin; Vol 36, No 09B, Sep. 1993; pp 67–68.

Minimizing Locking to Access Global Shared Data; International Business Machines Technical Disclosure Bulletin; Feb. 1995; pp. 619–622.

A Unifying Approach to Performance Analysis In The Java Environment; Alexander et al; Vol 39, No. 1; pp 1–16.

Java Virtual Machine Profiler Interface; Viswanathan et al.; vol. 39, No. 1; pp. 1–14.

Call Path Profiling of Monotonic Program Resources in UNIX; Hall et al; Jun. 24–25, 1993; pp. 1–13.

Exploiting Hardware Performance Counters with Flow and Context Sensitive Profiling; Ammons et al; 1997; pp. 85–96.

Optimally Profiling and Tracing Programs; Ball et al; Jul. 1994; pp 1319–1360.

* cited by examiner

FIG. 1
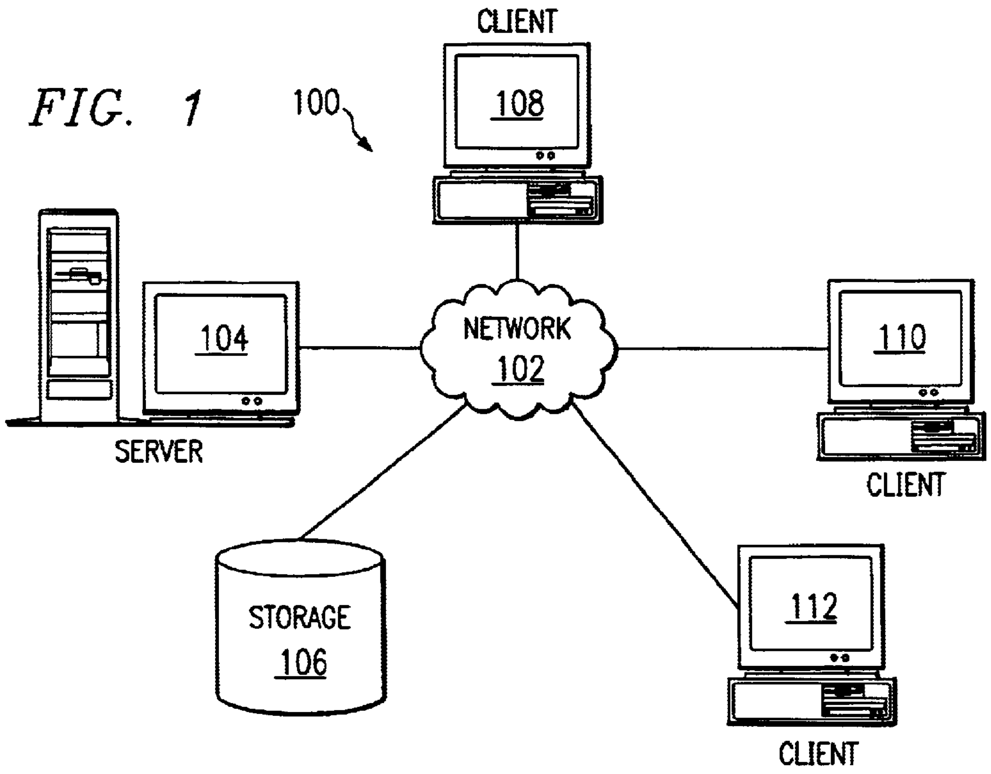
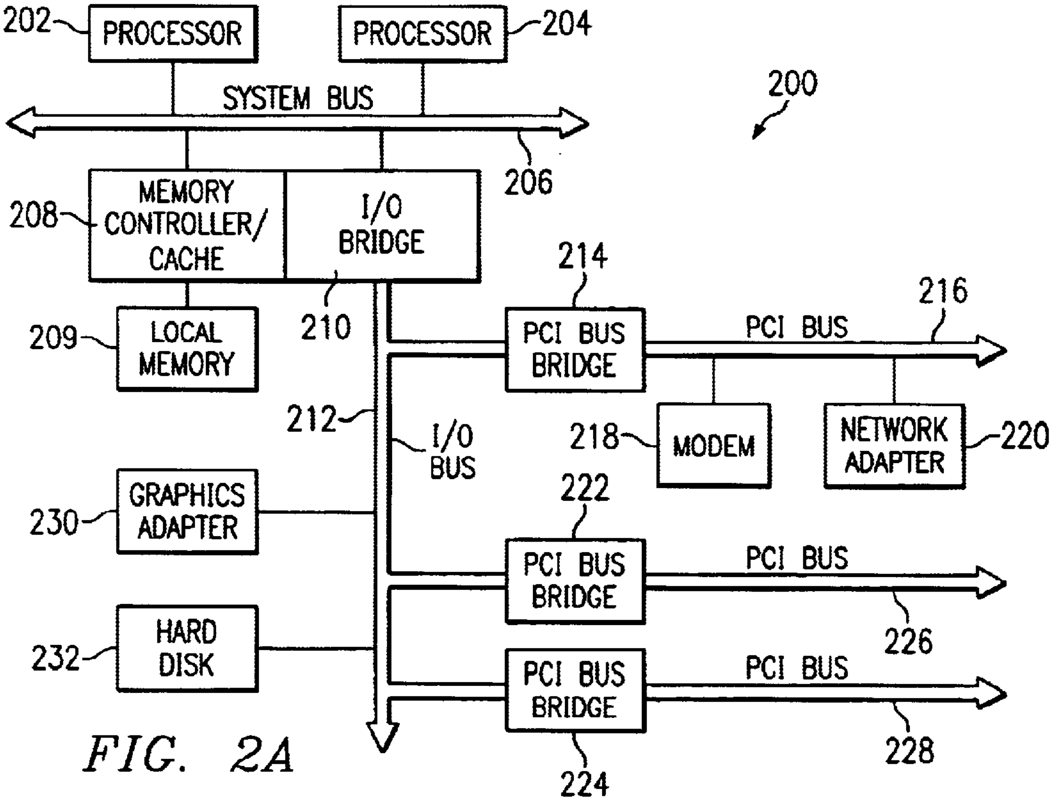
FIG. 2A

FIG. 10B

| SAMPLE | CALL STACK @ SAMPLE |
|---|---|
| 1 | C |
| 2 | CAB |
| 3 | CAB |
| 4 | CAB |
| 5 | C |
| 6 | CBA |
| 7 | CBABA |
| 8 | CBA |
| 9 | CBA |
| 10 | C |

FIG. 10A

| TIMESTAMP | EVENT | CALL STACK AFTER |
|---|---|---|
| 0 | ENTER C | C |
| 1 | ENTER A | CA |
| 2 | ENTER B | CAB |
| 3 | EXIT FROM B | CA |
| 4 | ENTER B | CAB |
| 5 | ENTER B | CABB |
| 6 | EXIT FROM B | CAB |
| 7 | EXIT FROM B | CA |
| 8 | EXIT FROM A | C |
| 9 | ENTER B | CB |
| 10 | ENTER A | CBA |
| 11 | ENTER B | CBAB |
| 12 | ENTER A | CBABA |
| 13 | EXIT FROM A | CBAB |
| 14 | EXIT FROM B | CBA |
| 15 | ENTER X | CBAX |
| 16 | EXIT FROM X | CBA |
| 17 | EXIT FROM A | CB |
| 18 | EXIT FROM B | C |
| 19 | EXIT FROM C | |

FIG. 12

| 1230 LEVEL | 1232 RL | 1234 CALLS | 1236 BASE | 1238 CUM | 1240 INDENT |
|---|---|---|---|---|---|
| 0 | 1 | 1 | 0 | 19 | pt_pidtid |
| 1 | 1 | 1 | 3 | 19 | -C |
| 2 | 1 | 1 | 3 | 7 | --A |
| 3 | 1 | 2 | 3 | 4 | ---B |
| 4 | 2 | 1 | 1 | 1 | ----B |
| 2 | 1 | 1 | 2 | 9 | --B |
| 3 | 1 | 1 | 3 | 7 | ---A |
| 4 | 2 | 1 | 2 | 3 | ----B |
| 5 | 2 | 1 | 1 | 1 | -----A |
| 4 | 1 | 1 | 1 | 1 | ----X |

FIG. 15B
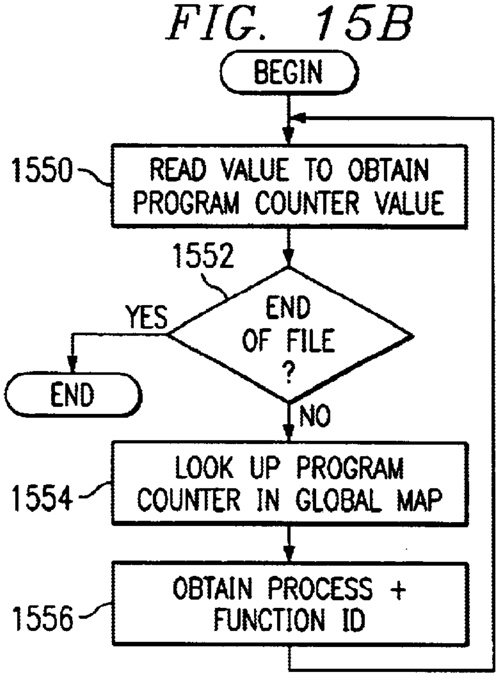
FIG. 16
1600
| CALLS (1602) | BASE (1604) | CUM (1606) | NAME (1608) |
|---|---|---|---|
| 1 | 0 | 19 | pt_pit.tid |
| 1 | 3 | 19 | C |
| 3 | 7 | 14 | A |
| 5 | 8 | 13 | B |
| 1 | 1 | 1 | X |
FIG. 20
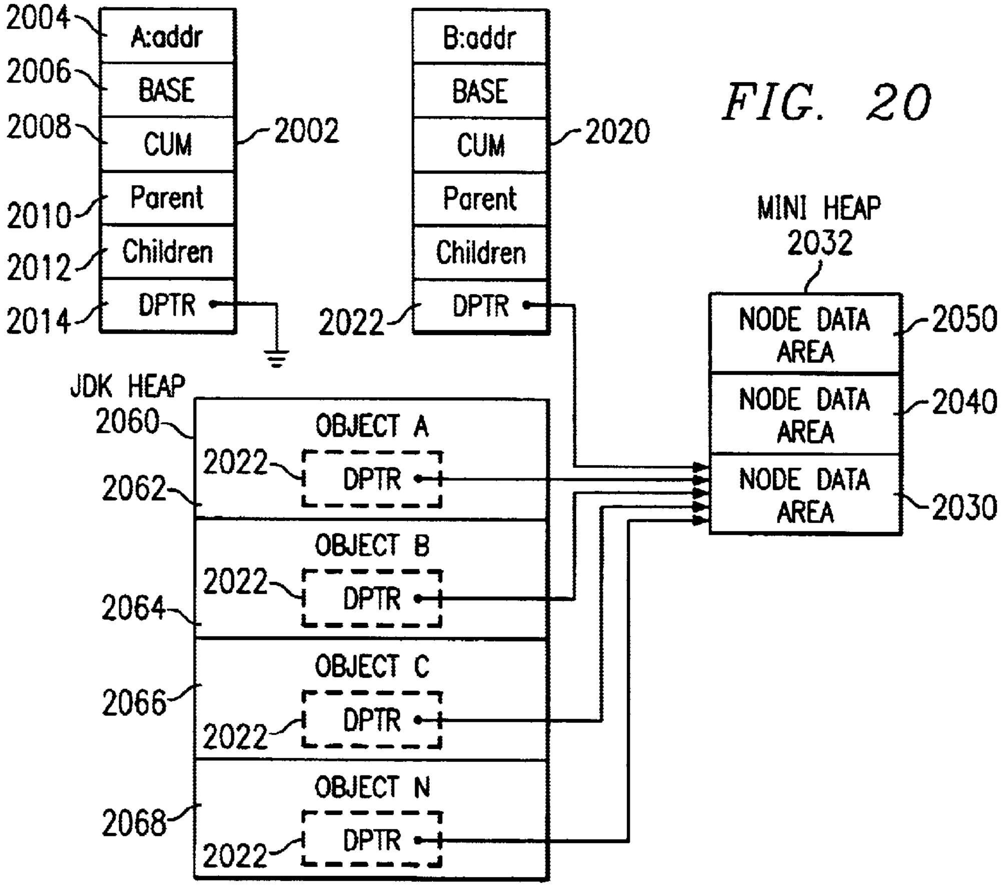

1700

ArcFlow Output

Base – Time/Instructions directly in function
Cum – Time/Instructions directly & indirectly in function ArcFlow Invarients:

1) Sum(Parent(Calls)) = Self(Calls)
2) Sum(Parent(Base)) = Self(Base)
3) Sum(Parent(Cum)) = Self(Cum)
4) Sum(Child(Cum)) = Self(Cum)–Self(Base)

| Source | Calls | Base | Cum | Function |
|---|---|---|---|---|
| Self | 1 | 0 | 19 | [0] pt_pidtid |
| Child | 1 | 3 | 19 | C |
| Parent | 1 | 3 | 19 | pt_pidtid |
| Self | 1 | 3 | 19 | [1] C |
| Child | 1 | 2 | 9 | B |
| Child | 1 | 3 | 7 | A |
| Parent | 1 | 3 | 7 | C |
| Parent | 1 | 3 | 7 | B |
| rParent | 1 | 1 | 1 | B |
| Self | 3 | 7 | 17<br>15 | [2] A |
| Child | 3 | 5 | 7 | B |
| Child | 1 | 1 | 1 | X |
| Parent | 2 | 3 | 4 | A |
| rParent | 1 | 2 | 3 | A |
| Parent | 1 | 2 | 9 | C |
| Self | 5 | 8 | 13<br>17 | [3] B |
| Child | 1 | 3 | 7 | A |
| rChild | 1 | 1 | 1 | A |
| Child | 1 | 1 | 1 | B |
| Parent | 1 | 1 | 1 | A |
| Self | 1 | 1 | 1 | [4] X |

Units : : Ticks
Total : : 342

| LvL | RL | Calls | Base | Cum | Indent Name |
|---|---|---|---|---|---|
| 1 | 1 | 1 | 0 | 342 | - _Thread-21__(0xe0046618) |
| 2 | 1 | 3 | 0 | 342 | -- J:nulltestScore()I |
| 3 | 1 | 2 | 0 | 272 | --- J:nulltestMilliseconds(I)I |
| 4 | 1 | 29450 | 0 | 271 | ---- J:nullexecute()I |
| 5 | 1 | 271 | 0 | 271 | ----+ stack_0x40 ← 1802 |
| 6 | 1 | 271 | 0 | 271 | ----+- F:ExecuteJava |
| 7 | 1 | 271 | 0 | 271 | ----+-- F:jit_invokeCompiledEntryMethod |
| 8 | 1 | 271 | 0 | 271 | ----+--- F:_jit_invokeentry |
| 9 | 1 | 271 | 0 | 271 | ----+---- F:JITInvokeCompiledEntryMethod_md |
| 10 | 1 | 271 | 0 | 271 | ----+----+ J:nullrun()V |
| 11 | 2 | 271 | 0 | 271 | ----+----+- J:nulltestScore()I |
| 12 | 2 | 271 | 0 | 271 | ----+----+-- J:nulltestMilliseconds(I)I |
| 13 | 2 | 271 | 268 | 271 | ----+----+--- J:nullexecute()I |
| 14 | 1 | 2 | 0 | 2 | ----+----+---- F:jperf_methodEntry |
| 15 | 1 | 2 | 0 | 2 | ----+----+----+ F:SoftTracehook |
| 16 | 1 | 2 | 2 | 2 | ----+----+----+- F:enable_interrupts |
| 14 | 1 | 1 | 1 | 1 | ----+----+---- F:jperf_methodExit |
| 4 | 1 | 1 | 0 | 1 | ---- stack_0x40 ← 1804 |
| 5 | 1 | 1 | 0 | 1 | ----+ F:ExecuteJava |
| 6 | 1 | 1 | 0 | 1 | ----+- F:jit_invokeCompiledEntryMethod |
| 7 | 1 | 1 | 0 | 1 | ----+-- F:_jit_invokeentry |
| 8 | 1 | 1 | 0 | 1 | ----+--- F:JITInvokeCompiledEntryMethod_md |
| 9 | 1 | 1 | 0 | 1 | ----+---- J:nullrun()V |
| 10 | 2 | 1 | 0 | 1 | ----+----+ J:nulltestScore()I |
| 11 | 2 | 1 | 0 | 1 | ----+----+- J:nulltestMilliseconds(I)I |
| 12 | 1 | 1 | 0 | 1 | ----+----+-- J:nullexecute()I |
| 13 | 1 | 1 | 0 | 1 | ----+----+--- F:jperf_methodExit |
| 14 | 1 | 1 | 0 | 1 | ----+----+---- F:SoftTracehook |
| 15 | 1 | 1 | 1 | 1 | ----+----+----+ F:enable_interrupts |
| 4 | 1 | 2 | 0 | 0 | ---- J:nullcleanUp()I |

1806 (rows 6–14, first group)

1808 (rows 5–4, second group)

| MAJOR CODE | MINOR CODE | DATA ITEM 1 | DATA ITEM 2 | DATA ITEM 3 | DATA ITEM 4 | DATA ITEM 5 | DESCRIPTION |
|---|---|---|---|---|---|---|---|
| 0x4 | LEVEL + 0x1 | DEPTH | N/A | N/A | N/A | | BEGIN INTERRUPT AT LEVEL |
| 0x4 | LEVEL + 0x80000001 | DEPTH | N/A | N/A | N/A | | END INTERRUPT AT LEVEL |
| 0x10 | 0xab | SYSTEM TID | JAVA TID | IS SYSTEM THREAD (BOOLEAN) | N/A | | THREAD CREATED WITHOUT A NAME WHILE TRACE ACTIVE |
| 0x10 | 0xac | SYSTEM TID | N/A | N/A | N/A | | IDENTIFIES THE IDLE THREAD |
| 0x10 | 0xad | SYSTEM TID | N/A | N/A | N/A | | IDENTIFIES THE GARBAGE COLLECTION THREAD |
| 0x10 | 0xae | SYSTEM TID | JAVA TID | THREAD NAME | N/A | | THREAD CREATED WITH A NAME WHILE TRACE ACTIVE |
| 0x30 | 0x10 | OBJECT ID | METHOD BLOCK ADDRESS | N/A | N/A | | METHOD INVOCATION (INTERPRETED) |
| 0x30 | 0x10 + 0x80000000 | OBJECT ID | METHOD BLOCK ADDRESS | N/A | N/A | | METHOD EXIT (INTERPRETED) |
| 0x40 | 0x7fffffff | NUMBER (N) OF STACK UNWINDS AT TIMER INTERRUPT | PC1-PROGRAM COUNTER OF INTERRUPTED ROUTINE | PC2-CALLER OF INTERRUPTED ROUTINE | ....... | PCN-1 OF N-2ND CALLER OF INTERRUPTED ROUTINE | PCN OF N-1ST CALLER OF INTERRUPTED ROUTINE |
| 0x41 | 0x7fffffff | NUMBER (N) OF STACK UNWINDS AT INSTRUMENTED ROUTINE | PC1-PROGRAM COUNTER OF INSTRUMENTED ROUTINE | PC2-CALLER OF INSTRUMENTED ROUTINE | ....... | | PCN OF N-1ST CALLER OF INSTRUMENTED ROUTINE |
| 0x50 | 0x10 | OBJECT ID | METHOD BLOCK ADDRESS | N/A | N/A | | METHOD INVOCATION (JITTED) |
| 0x50 | 0x10 + 0x80000000 | OBJECT ID | METHOD BLOCK ADDRESS | N/A | N/A | | METHOD EXIT (JITTED) |

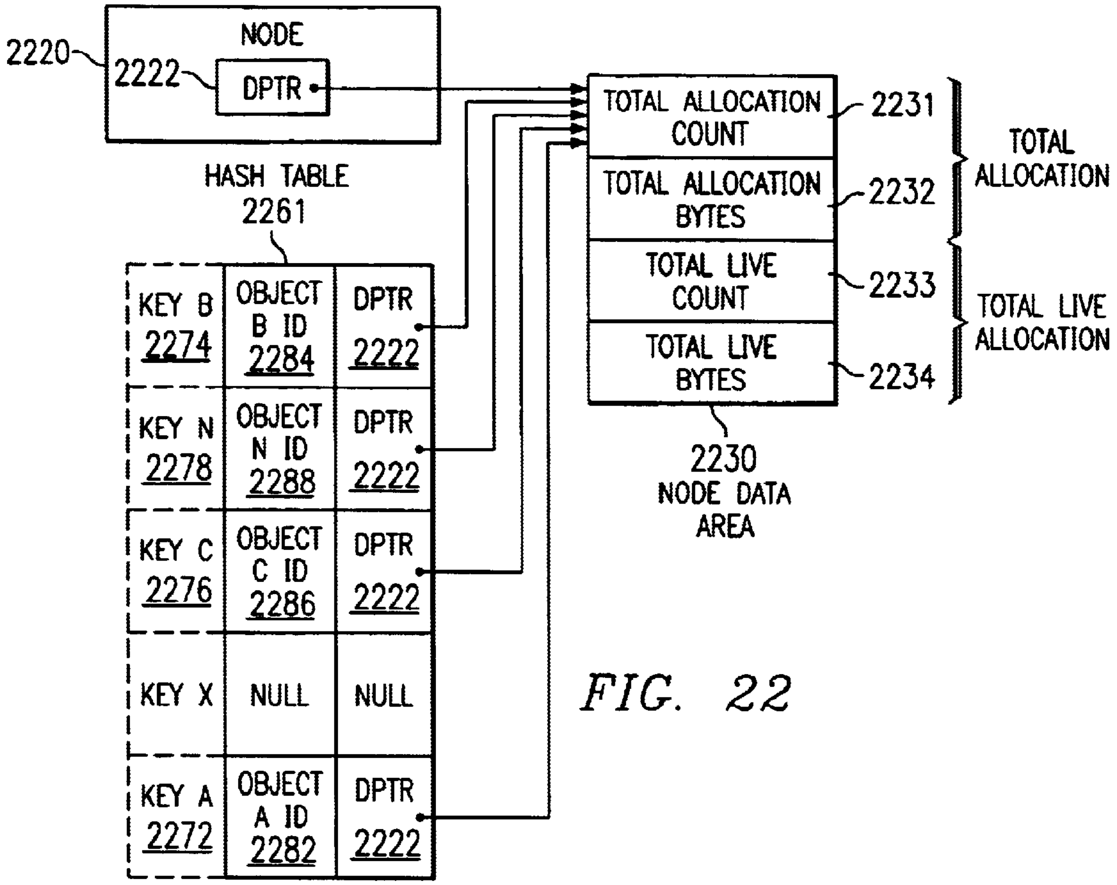
*FIG. 22*
*FIG. 23*
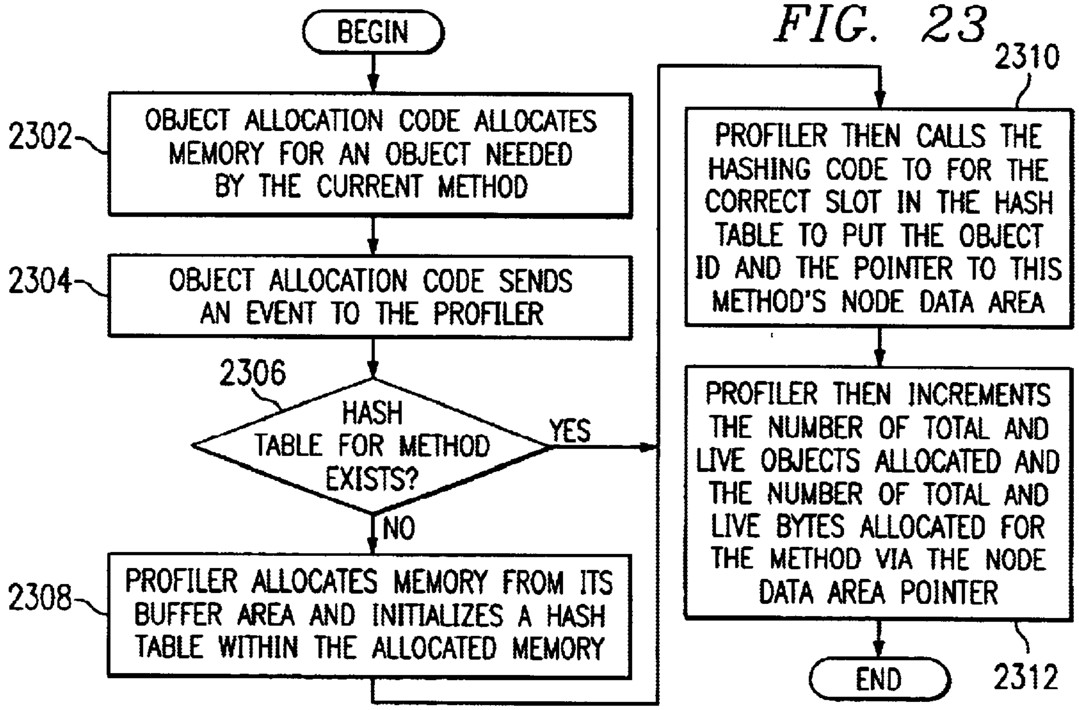

FIG. 34

HEAD DUMP 3400

| DUMP | OBJECT ID | BYTES | DPTR | IND | CLASS |
|---|---|---|---|---|---|
| *DH(4)* | 00d1ff0c | 32 | 1416d79 | L | sun.java2d.loops.GraphicsPrimitiveProxy |
| *DH(4)* | 00d1ff2c | 56 | 1416d79 | L | char[] |
| *DH(4)* | 00d1ff64 | 24 | 1416d79 | L | java.lang.String |
| *DH(4)* | 00d1ff7c | 32 | 1416d79 | D | sun.java2d.loops.GraphicsPrimitiveProxy |
| *DH(4)* | 00d1ff9c | 56 | 1416d79 | L | char[] |
| *DH(4)* | 00d1ffd4 | 24 | 1416d79 | L | java.lang.String |

FIG. 35

CALL STACK SNAPSHOT 3500

| LEVEL | ALLOC OBJECTS | ALLOC BYTES | LIVE OBJECTS | LIVE BYTES | NODE DATA POINTER | METHOD NAME |
|---|---|---|---|---|---|---|
| 0 | 5 | 152 | 1 | 16 | 1770d2 | main |
| 1 | 15 | 1352 | 2 | 1288 | 1770ee | screenSet_up |
| 2 | 5 | 258 | 2 | 66 | 177101 | parseCommandLine |
| 3 | 55770 | 3569280 | 55770 | 3569280 | 177122 | getToken |

FIG. 36

HEAP DUMP FOR NODE DATA AREA 177101 3600

GARBAGE COLLECTION: 1
DUMP #1

| OBJECT ID | BYTES | NODE DATA POINTER | LIVE/ DYING | CLASS |
|---|---|---|---|---|
| 0d1f66 | 64 | 177101 | D | java.lang.String |
| 0d2c30 | 50 | 177101 | L | char[] |
| 0d2c52 | 64 | 177101 | D | java.lang.String |
| 0d2d16 | 64 | 177101 | D | java.lang.String |
| 0f1b00 | 16 | 177101 | L | Token |

FIG. 37

MEMORY USAGE SUMMARY FOR ONE CALL STACK 3700

GARBAGE COLLECTION 1
DUMP #1
UNITS: BYTES
TOTAL: 4748964

| CALLS | %BASE | %CUM | BASE | CUM | METHOD NAME |
|---|---|---|---|---|---|
| 1 | 0.00 | 75.18 | 16 | 3570650 | main |
| | | | 1 | 16 | TransactionRef |
| 1 | 0.02 | 75.18 | 1288 | 3570634 | screenSet_up |
| | | | 1 | 80 | char[] |
| | | | 1 | 1208 | Screen |
| 6197 | 0.00 | 75.16 | 66 | 3569346 | parseCommandLine |
| | | | 1 | 50 | char[] |
| | | | 1 | 16 | Token |
| 55770 | 75.15 | 75.15 | 3569280 | 3569280 | getToken |
| | | | 55770 | 640 | StringBuffer |

METHOD AND SYSTEM FOR SHADOW HEAP MEMORY LEAK DETECTION AND OTHER HEAP ANALYSIS IN AN OBJECT-ORIENTED ENVIRONMENT DURING REAL-TIME TRACE PROCESSING

CROSS-REFERENCE TO RELATED APPLICATIONS

This application is a related to the following commonly assigned applications entitled "SYSTEM AND METHOD FOR PROVIDING TRACE INFORMATION REDUCTION", U.S. Pat. No. 6,055,492, issued on Apr. 25, 2000; "A METHOD AND APPARATUS FOR STRUCTURED PROFILING OF DATA PROCESSING SYSTEMS AND APPLICATIONS", U.S. Pat. No. 6,002,872, issued on Dec. 14, 1999; "A METHOD AND APPARATUS FOR STRUCTURED MEMORY ANALYSIS OF DATA PROCESSING SYSTEMS AND APPLICATIONS", U.S. Pat. No. 6,158,024 issued on Dec. 5, 2000; "METHOD AND APPARATUS FOR PROFILING PROCESSES IN A DATA PROCESSING SYSTEM", U.S. Pat. No. 6,311,325 issued on Oct. 30, 2001; "PROCESS AND SYSTEM FOR MERGING TRACE DATA FOR PRIMARILY INTERPRETED METHODS", U.S. application Ser. No. 09/343,439, currently allowed, filed on Jun. 30, 1999; "METHOD AND SYSTEM FOR MERGING EVENT-BASED DATA AND SAMPLED DATA INTO POSTPROCESSED TRACE OUTPUT", U.S. application Ser. No. 09/343,438, currently allowed, filed on Jun. 30, 1999; "METHOD AND SYSTEM FOR MEMORY LEAK DETECTION IN AN OBJECT-ORIENTED ENVIRONMENT DURING REAL-TIME TRACE PROCESSING", U.S. application Ser. No. 09/414,331, currently allowed, filed on Oct. 7, 1999.

BACKGROUND OF THE INVENTION

1. Technical Field

The present invention relates to an improved data processing system and, in particular, to a method and apparatus for optimizing performance in a data processing system. Still more particularly, the present invention provides a method and apparatus for a software program development tool for enhancing performance of a software program through software profiling.

2. Description of Related Art

In analyzing and enhancing performance of a data processing system and the applications executing within the data processing system, it is helpful to know which software modules within a data processing system are using system resources. Effective management and enhancement of data processing systems requires knowing how and when various system resources are being used. Performance tools are used to monitor and examine a data processing system to determine resource consumption as various software applications are executing within the data processing system. For example, a performance tool may identify the most frequently executed modules and instructions in a data processing system, or may identify those modules, which allocate the largest amount of memory or perform the most I/O requests. Hardware performance tools may be built into the system or added at a later point in time. Software performance tools also are useful in data processing systems, such as personal computer systems, which typically do not contain many, if any, built-in hardware performance tools.

One known software performance tool is a trace tool. A trace tool may use more than one technique to provide trace information that indicates execution flows for an executing program. One technique keeps track of particular sequences of instructions by logging certain events as they occur, so-called event-based profiling technique. For example, a trace tool may log every entry into, and every exit from, a module, subroutine, method, function, or system component. Typically, a time-stamped record is produced for each such event. Corresponding pairs of records similar to entry-exit records also are used to trace execution of arbitrary code segments, starting and completing I/O or data transmission, and for many other events of interest.

In order to improve performance of code generated by various families of computers, it is often necessary to determine where time is being spent by the processor in executing code, such efforts being commonly known in the computer processing arts as locating "hot spots." Ideally, one would like to isolate such hot spots at the instruction and/or source line of code level in order to focus attention on areas, which might benefit most from improvements to the code.

Another trace technique involves program sampling to identify certain locations in programs in which the programs appear to spend large amounts of time. This technique is based on the idea of interrupting the application or data processing system execution at regular intervals, so-called sample-based profiling. At each interruption, information is recorded for a predetermined length of time or for a predetermined number of events of interest. For example, the program counter of the currently executing thread, which is a process that is part of the larger program being profiled, may be recorded during the intervals. These values may be resolved against a load map and symbol table information for the data processing system at post-processing time, and a profile of where the time is being spent may be obtained from this analysis.

For example, isolating such hot spots to the instruction level permits compiler writers to find significant areas of suboptimal code generation at which they may thus focus their efforts to improve code generation efficiency. Another potential use of instruction level detail is to provide guidance to the designer of future systems. Such designers employ profiling tools to find characteristic code sequences and/or single instructions that require optimization for the available software for a given type of hardware.

Another runtime statistic that may be analyzed by software developers is memory allocation. A trace tool may log an allocation/deallocation requests and the amounts of memory allocated for each memory allocation/deallocation request. Memory allocation information may allow a software developer to analyze memory leakage problems. As an application executes, it stores and retrieves data in a variety of static and dynamic data structures. Statically allocated data structures are declared within the source code, and the compiler allocates storage space for the static data structure. When the application is loaded into memory, the static data structure has a predetermined amount of memory reserved for it, and the application cannot dynamically deallocate this memory. In some programming languages, arrays are statically allocated.

Other data structures can be dynamically allocated within memory when requested either by the application or by the runtime environment. A portion of memory is dynamically provided for the data structure or data object, and after the application is finished using the data structure, the memory space for the data structure is dynamically deallocated.

A memory leak occurs when the dynamically allocated memory space is not properly deallocated; either the application or the runtime environment may lose its pointer or memory reference to the dynamically allocated memory space, and once lost, the pointer or memory reference may not be retrieved. However, the memory allocation mechanism, which may be the operating system, will not reallocate the memory space because it was not deallocated, and a portion of memory is no longer being utilized. If one considers a newly initialized system as having a "full" memory, then the memory may slowly lose portions of its allocable space until a "low" memory condition occurs in which no more memory may be allocated, which usually causes the system to crash soon after this condition arises. Memory leaks are extremely difficult to find as the first and only symptom of a memory leak may be a system crash, which may occur significantly after the "leaky" code has executed. Using an object-oriented language like Java, the Jvm may allocate memory from a "Java Heap" where the memory heap allocations and deallocations are hidden from the Java programmer. The allocations are performed by the Java virtual machine (Jvm) when new objects are specified, such as, "String ABC="ABC". The Jvm uses the implied new constructor in this case as it allocates the string "ABC". The deallocations are done by the Jvm asynchronously at Garbage collection (GC) time when there are no longer any reverences to the ABC string; that is, the object is no longer referenced. Because these allocations and deallocations are done by the Jvm, the Java programmer is usually not aware of the cost associated with the objects created and may not take care to eliminate references to objects that are not required. In the case of Java, the memory leaks will also cause more frequent GCS, which in turn reduce performance.

Therefore, it would be advantageous to provide a method and system for accurate memory leak detection in an object-oriented environment, and it would be particularly advantageous to provide memory leak detection during real-time trace processing.

SUMMARY OF THE INVENTION

A method and system for detecting memory leaks in an object-oriented environment during real-time trace processing is provided. During the profiling of a program executing in a data processing system, a profiler processes events caused by the execution of the program, and the profiler maintains a profile data structure containing execution-related metrics for the program. The execution-related metrics may include object allocation and deallocation metrics that are associated with object processing initiated on behalf of an executing method. An object allocator allocates objects during the execution of the program and modifies object allocation metrics in the profile data structure. Object metrics are stored in a particular location and a pointer to that location is stored in a hash table associated with the object's ID. In another embodiment a pointer to the location is stored in a shadow heap in the same relative position as the position of the object in the heap. The object allocation metrics and the object deallocation metrics may be compared to identify memory leaks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a distributed data processing system in which the present invention may be implemented;

FIGS. 2A–B are block diagrams depicting a data processing system in which the present invention may be implemented;

FIG. 10A is a diagram depicting a program execution sequence along with the state of the call stack at each function entry/exitpoint;

FIG. 10B is a diagram depicting a particular timer based sampling of the execution flow depicted in FIG. 10A;

FIG. 12 is a table depicting a call stack tree;

FIG. 15B is a flowchart depicting a process for identifying functions from an address obtained during sampling;

FIG. 16 is a diagram depicting a record generated using the processes of present invention;

FIG. 17 is a diagram depicting another type of report that may be produced to show the calling structure between routines shown in FIG. 12;

FIG. 18 is a table depicting a report generated from a trace file containing both event-based profiling information (method entry/exits) and sample-based profiling information (stack unwinds);

FIG. 19 is a table depicting major codes and minor codes that may be employed to instrument modules for profiling;

FIG. 20 is a block diagram depicting a data structure that may be used to facilitate tracking additional information related to a routine;

FIG. 22 is a block diagram more clearly depicting a relationship between a node data area and a hash table in a data structure, that may be used to facilitate tracking memory in accordance with another embodiment of the present invention;

FIG. 23 is a flowchart depicts the process followed by object allocation code for allocating an object with trace support by utilizing a hash table in accordance with an alternative embodiment of the present invention;

FIG. 34 is an example of such a live object report;

FIG. 35 shows a small extract of a report attributing live objects to specific call stack configurations, showing memory allocation information for one particular call stack;

FIG. 36 illustrates one example of additional information that can be reported if the profiler has collected the classes of live and dying objects in addition to the counts; and FIG. 37 shows memory allocation information for a particular call stack.

DETAILED DESCRIPTION OF THE PREFERRED EMBODIMENT

Figure 2B:
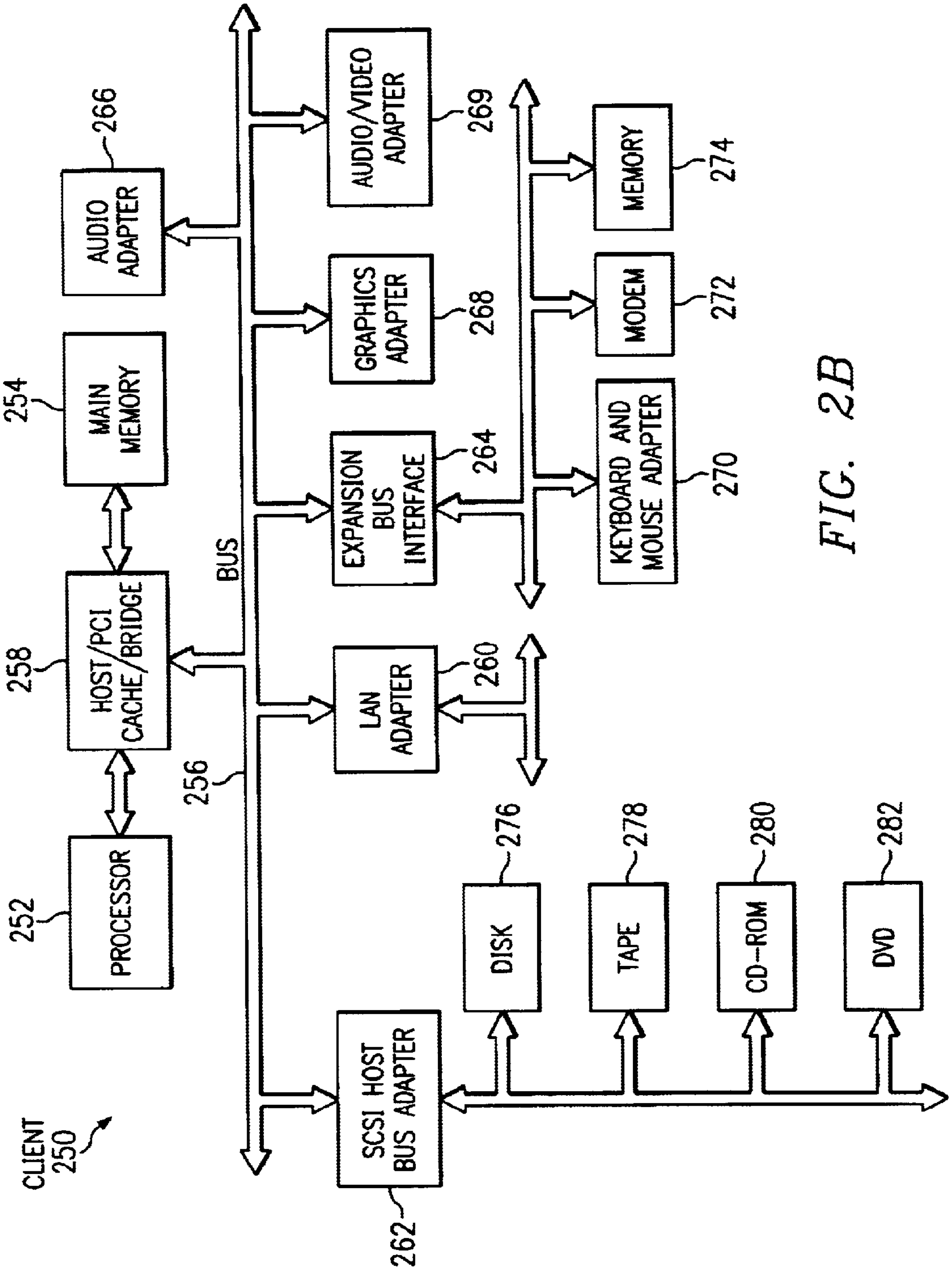

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

FIG. 1 is intended as an example, and not as an architectural limitation for the processes of the present invention.

With reference now to FIG. 2A, a block diagram of a data processing system which may be implemented as a server, such as server 104 in FIG. 1, is depicted in accordance to the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2A may vary. For example, other peripheral devices, such as optical disk drive and the like also may be used in addition or in place of the hardware depicted. The depicted example is not meant to imply architectural limitations with respect to the present invention.

The data processing system depicted in FIG. 2A may be, for example, an IBM RISC/System 6000 system, a product of International Business Machines Corporation in Armonk, New York, running the Advanced Interactive Executive (AIX) operating system.

With reference now to FIG. 2B, a block diagram of a data processing system in which the present invention may be implemented is illustrated. Data processing system 250 is an example of a client computer. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, CD-ROM 280, and DVD drive 282 in the depicted example. Typical PCI local bus implementations will support three or four PCI expansion slots or add-in connectors.

An operating system runs on processor 252 and is used to coordinate and provide control of various components within data processing system 250 in FIG. 2B. The operating system may be a commercially available operating system such as JavaOS for Business™ or OS/2™, which are available from International Business Machines Corporations™. JavaOS is loaded from a server on a network to a network client and supports Java programs and applets. A couple of characteristics of JavaOS that are favorable for performing traces with stack unwinds, as described below, are that JavaOS does not support paging or virtual memory. An object oriented programming system such as Java may run in conjunction with the operating system and may provide calls to the operating system from Java programs or applications executing on data processing system 250. Instructions for the operating system, the object-oriented operating system, and applications or programs are located on storage devices, such as hard disk drive 276 and may be loaded into main memory 254 for execution by processor 252. Hard disk drives are often absent and memory is constrained when data processing system 250 is used as a network client.

Those of ordinary skill in the art will appreciate that the hardware in FIG. 2B may vary depending on the implementation. For example, other peripheral devices, such as optical disk drives and the like may be used in addition to or in place of the hardware depicted in FIG. 2B. The depicted example is not meant to imply architectural limitations with respect to the present invention. For example, the processes of the present invention may be applied to a multiprocessor data processing system.

The present invention provides a process and system for profiling software applications. Although the present invention may operate on a variety of computer platforms and operating systems, it may also operate within a Java runtime environment. Hence, the present invention may operate in conjunction with a Java virtual machine (Jvm) yet within the boundaries of a Jvm as defined by Java standard specifications. In order to provide a context for the present invention, portions of the operation of a Jvm according to Java specifications are herein described.

Figure 3A:
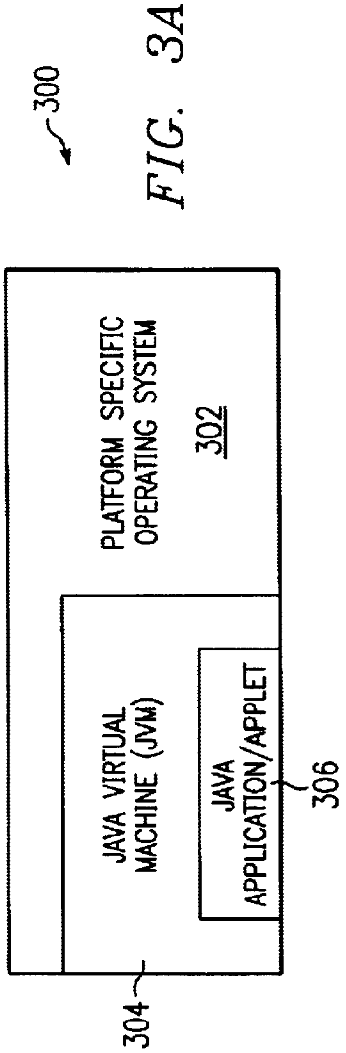
FIG. 3A is a block diagram depicting the relationship of software components operating within a computer system that may implement the present invention.

With reference now to FIG. 3A, a block diagram illustrates the relationship of software components operating within a computer system that may implement the present invention. Java-based system 300 contains platform specific operating system 302 that provides hardware and system support to software executing on a specific hardware platform. Jvm 304 is one software application that may execute in conjunction with the operating system. Jvm 304 provides a Java run-time environment with the ability to execute Java application or applet 306, which is a program, servlet, or software component written in the Java programming language. The computer system in which Jvm 304 operates may be similar to data processing system 200 or computer 100 described above. However, Jvm 304 may be implemented in dedicated hardware on a so-called Java chip, Java-on-silicon, or Java processor with an embedded picoJava core.

At the center of a Java run-time environment is the Jvm, which supports all aspects of Java's environment, including its architecture, security features, mobility across networks, and platform independence.

The Jvm is a virtual computer, i.e. a computer that is specified abstractly. The specification defines certain features that every Jvm must implement, with some range of design choices that may depend upon the platform on which the Jvm is designed to execute. For example, all JVMs must execute Java bytecodes and may use a range of techniques to execute the instructions represented by the bytecodes. A Jvm may be implemented completely in software or somewhat in hardware. This flexibility allows different JVMs to be designed for mainframe computers and PDAs.

The Jvm is the name of a virtual computer component that actually executes Java programs. Java programs are not run directly by the central processor but instead by the Jvm, which is itself a piece of software running on the processor. The Jvm allows Java programs to be executed on a different platform as opposed to only the one platform for which the code was compiled. Java programs are compiled for the Jvm. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the Jvm that alternately decodes and interprets a bytecode or bytecodes. These bytecode instructions are designed to be easy to interpret on any computer and easily translated on the fly into native machine code. Byte codes may be translated into native code by a just-in-time compiler or JIT.

A Jvm must load class files and execute the bytecodes within them. The Jvm contains a class loader, which loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but LJVMs may also use other techniques, such as just-in-time compiling, to execute bytecodes.

Interpreting code provides an additional benefit. Rather than instrumenting the Java source code, the interpreter may be instrumented. Trace data may be generated via selected events and timers through the instrumented interpreter without modifying the source code. Profile instrumentation is discussed in more detail further below.

When an application is executed on a Jvm that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 3B:
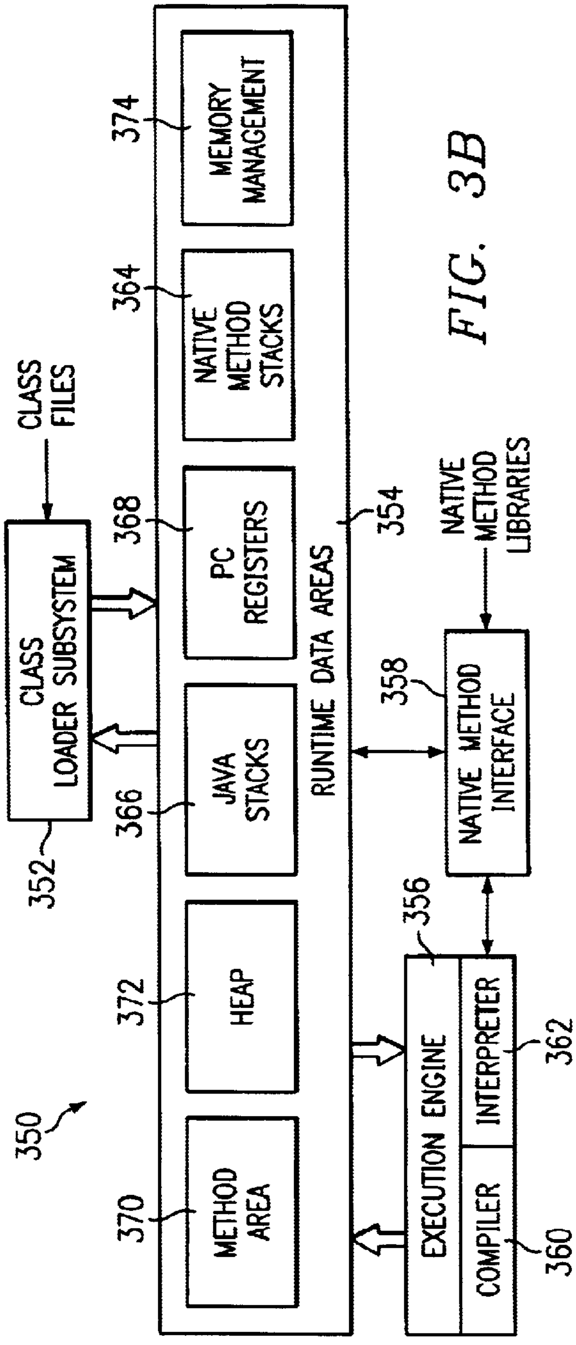
FIG. 3B is a block diagram depicting a Java virtual machine in accordance with a preferred embodiment of the present invention.

With reference now to FIG. 3B, a block diagram of a Jvm is depicted in accordance with a preferred embodiment of the present invention. Jvm 350 includes a class loader subsystem 352, which is a mechanism for loading types, such as classes and interfaces, given fully qualified names. Jvm 350 also contains runtime data areas 354, execution engine 356, native method interface 358, and memory management 374. Execution engine 356 is a mechanism for executing instructions contained in the methods of classes loaded by class loader subsystem 352. Execution engine 356 may be, for example, Java interpreter 362 or just-in-time compiler 360. Native method interface 358 allows access to resources in the underlying operating system. Native method interface 358 may be, for example, a Java native interface.

Runtime data areas 354 contain native method stacks 364, Java stacks 366, PC registers 368, method area 370, and heap 372. These different data areas represent the organization of memory needed by Jvm 350 to execute a program.

Java stacks 366 are used to store the state of Java method invocations. When a new thread is launched, the Jvm creates a new Java stack for the thread. The Jvm performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the Jvm pushes a new frame onto the Java stack of the thread. When the method completes, the Jvm pops the frame for that method and discards it. The Jvm does not have any registers for holding intermediate values; any Java instruction that requires or produces an intermediate value uses the stack for holding the intermediate values. In this manner, the Java instruction set is well defined for a variety of platform architectures.

PC registers 368 are used to indicate the next instruction to be executed. Each instantiated thread gets its own PC register (program counter) and Java stack. If the thread is executing a Jvm method, the value of the PC register indicates the next instruction to execute. If the thread is executing a native method, then the contents of the PC register are undefined.

Native method stacks 364 store the state of invocations of native methods. The state of native method invocations is stored in an implementation-dependent way in native method stacks, registers, or other implementation-dependent memory areas. In some Jvm implementations, native method stacks 364 and Java stacks 366 are combined.

Method area 370 contains class data while heap 372 contains all instantiated objects. The Jvm specification strictly defines data types and operations. Most JVMs choose to have one method area and one heap, each of which is shared by all threads running inside the Jvm. When the Jvm loads a class file, it parses information about a type from the binary data contained in the class file. It places this type information into the method area. Each time a class instance or array is created, the memory for the new object is allocated from heap 372. Jvm 350 includes an instruction that allocates memory space within the memory for heap 372 but includes no instruction for freeing that space within the memory. Memory management 374 in the depicted example manages memory space within the memory allocated to heap 370. Memory management 374 may include a Garbage Collector, which automatically reclaims memory used by objects that are no longer referenced. Additionally, a Garbage Collector also may move objects to reduce heap fragmentation.

The processes within the following figures provide an overall perspective of the many processes employed within the present invention: processes that generate event-based profiling information; processes that generate sample-based profiling information; processes that use the profile information to generate more useful information, such as representations of call stack trees, to be placed into profile reports; and processes that generate the profile reports for the user of the profiling utility.

Figure 4:
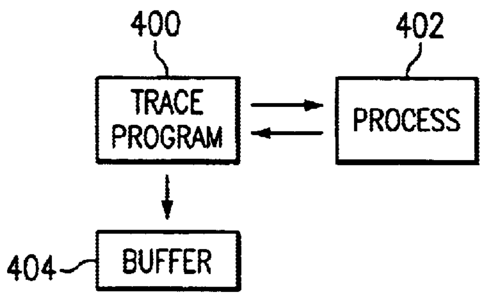
FIG. 4 is a block diagram depicting components used to profile processes in a data processing system.

With reference now to FIG. 4, a block diagram depicts components used to profile processes in a data processing system. A trace program 400 is used to profile processes 402. Trace program 400 may be used to record data upon the execution of a hook, which is a specialized piece of code at a specific location in a routine or program in which other routines may be connected. Trace hooks are typically inserted for the purpose of debugging, performance analysis, or enhancing functionality. These trace hooks are employed to send trace data to trace program 400, which stores the trace data in buffer 404. The trace data in buffer 404 may be subsequently stored in a file for post-processing, or the trace data may be processed in real-time.

With Java operating systems, the present invention employs trace hooks that aid in identifying methods that may be used in processes 402. In addition, since classes may be loaded and unloaded, these changes may also be identified using trace data. This is especially relevant with "network client" data processing systems, such as those that may operate under JavaOS, since classes and jitted methods may be loaded and unloaded more frequently due to the constrained memory and role as a network client.

Figure 5:
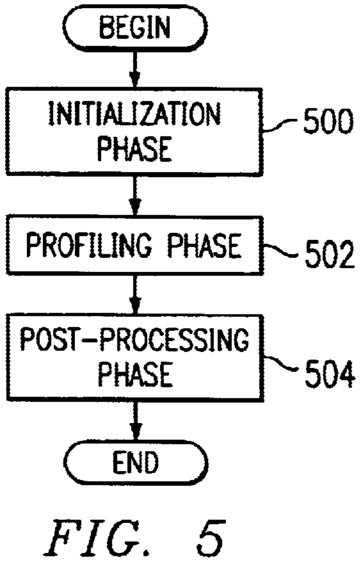
FIG. 5 is an illustration depicting various phases in profiling the active processes in an operating system.

With reference now to FIG. 5, a diagram depicts various phases in profiling the processes active in an operating system. Subject to memory constraints, the generated trace output may be as long and as detailed as the analyst requires for the purpose of profiling a particular program.

An initialization phase 500 is used to capture the state of the client machine at the time tracing is initiated. This trace initialization data includes trace records that identify all existing threads, all loaded classes, and all methods for the loaded classes. Records from trace data captured from hooks are written to indicate thread switches, interrupts, and loading and unloading of classes and jitted methods. Any class, which is loaded, has trace records that indicate the name of the class and its methods. In the depicted example, four byte IDs are used as identifiers for threads, classes, and methods. These IDs are associated with names that have been output in the records. A record is written to indicate when all of the start up information has been written.

Next, during the profiling phase 502, trace records are written to a trace buffer or trace file. In the present invention, a trace buffer may have a combination of types of records, such as those that may originate from a trace hook executed in response to a particular type of event, e.g., a method entry or method exit, and those that may originate from a stack walking function executed in response to a timer interrupt, e.g., a stack unwind record, also called a call stack record.

For example, the following process may occur during the profiling phase if the user of the profiling utility has requested sample-based profiling information. Each time a particular type of timer interrupt occurs, a trace record is written, which indicates the system program counter. This system program counter may be used to identify the routine that is interrupted. In the depicted example, a timer interrupt is used to initiate gathering of trace data. Of course, other types of interrupts may be used other than timer interrupts. Interrupts based on a programmed performance monitor event or other types of periodic events may be employed.

In the post-processing phase 504, the data collected in the trace buffer is sent to a trace file for post-processing. In one configuration, the file may be sent to a server, which determines the profile for the processes on the client machine. Of course, depending on available resources, the post-processing also may be performed on the client machine. In post-processing phase 504, B-trees and/or hash tables may be employed to maintain names associated the records in the trace file to be processed. A hash table employs hashing to convert an identifier or a key, meaningful to a user, into a value for the location of the corresponding data in the table. While processing trace records, the B-trees and/or hash tables are updated to reflect the current state of the client machine, including newly loaded jitted code or unloaded code. Also, in the post-processing phase 504, each trace record is processed in a serial manner. As soon as the indicator is encountered that all of the startup information has been processed, trace records from trace hooks and trace records from timer interrupts are then processed. Timer interrupt information from the timer interrupt records are resolved with existing hash tables. In addition, this information identifies the thread and function being executed. The data is stored in hash tables with a count identifying the number of timer tick occurrences associated with each way of looking at the data. After all of the trace records are processed, the information is formatted for output in the form of a report.

Alternatively, trace information may be processed on the fly so that trace data structures are maintained during the profiling phase. In other words, while a profiling function, such as a timer interrupt, is executing, rather than (or in addition to) writing trace records to a buffer or file, the trace record information is processed to construct and maintain any appropriate data structures.

For example, during the processing of a timer interrupt during the profiling phase, a determination could be made as to whether the code being interrupted is being interpreted by the Java interpreter. If the code being interrupted is interpreted, the method ID of the method being interpreted may be placed in the trace record. In addition, the name of the method may be obtained and placed in the appropriate B-tree. Once the profiling phase has completed, the data structures may contain all the information necessary for generating a profile report without the need for post-processing of the trace file.

Figure 6:
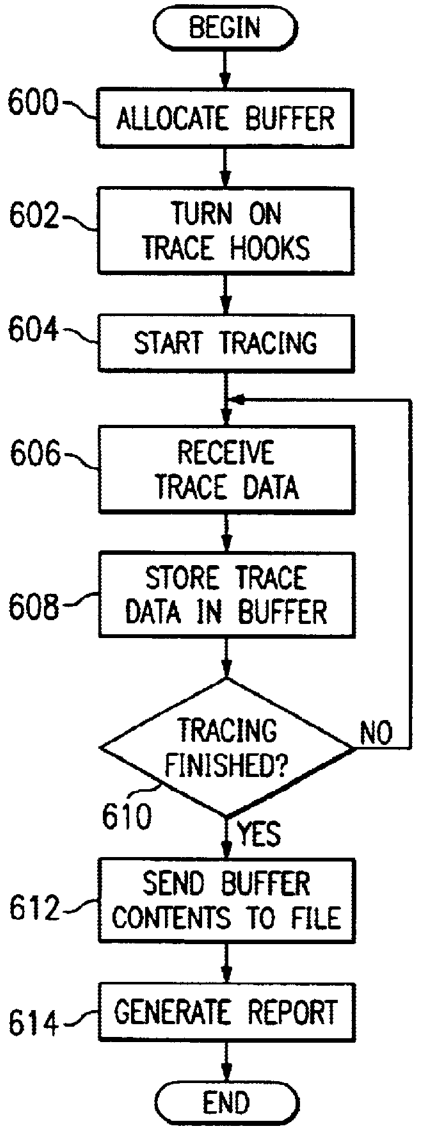
FIG. 6 is a flowchart depicting a process used by a trace program for generating trace records from processes executing on a data processing system.

With reference now to FIG. 6, a flowchart depicts a process used by a trace program for generating trace records from processes executing on a data processing system. FIG. 6 provides further detail concerning the generation of trace records that were not described with respect to FIG. 5.

Trace records may be produced by the execution of small pieces of code called “hooks”. Hooks may be inserted in various ways into the code executed by processes, including statically (source code) and dynamically (through modification of a loaded executable). This process is employed after trace hooks have already been inserted into the process or processes of interest. The process begins by allocating a buffer (step 600), such as buffer 404 in FIG. 4. Next, in the depicted example, trace hooks are turned on (step 602), and tracing of the processes on the system begins (step 604). Trace data is received from the processes of interest (step 606). This type of tracing may be performed during phases 500 and/or 502. This trace data is stored as trace records in the buffer (step 608). A determination is made as to whether tracing has finished (step 610). Tracing finishes when the trace buffer has been filled or the user stops tracing via a command and requests that the buffer contents be sent to file. If tracing has not finished, the process returns to step 606 as described above.

Otherwise, when tracing is finished, the buffer contents are sent to a file for post-processing (step 612). A report is then generated in post-processing (step 614) with the process terminating thereafter.

Although the depicted example uses post-processing to analyze the trace records, the processes of the present invention may be used to process trace information in real-time depending on the implementation.

Figure 7:
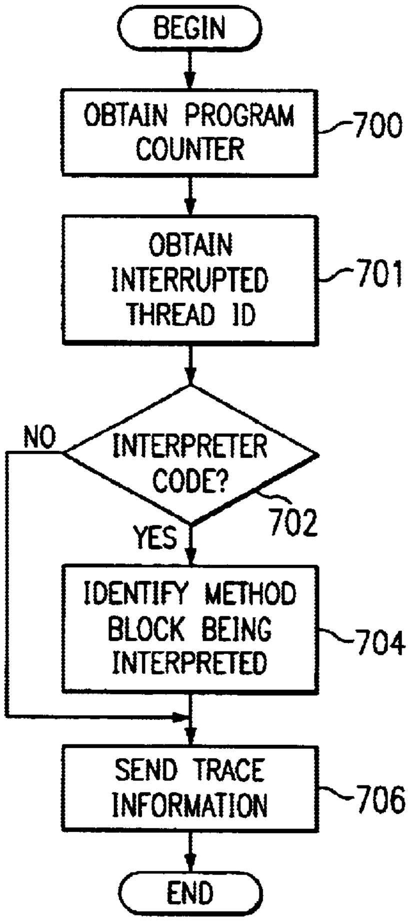
FIG. 7 is a flowchart depicting a process used in a system interrupt handler trace hook.

With reference now to FIG. 7, a flowchart depicts a process that may be used during an interrupt handler trace hook.

The process begins by obtaining a program counter (step 700). Typically, the program counter is available in one of the saved program stack areas. Thereafter, an interrupted thread ID is obtained (step 701) and a determination is made as to whether the code being interrupted is interpreted code (step 702). This determination may be made by determining whether the program counter is within an address range for the interpreter used to interpret bytecodes. If the code being interrupted is interpreted, a method block address is obtained for the code being interpreted (step 704). A trace record is then written (step 706). The trace record is written by sending the trace information to a trace program, such as trace program 400, which-generates trace records for post-processing in the depicted example. This trace record is referred to as an interrupt record, or an interrupt hook.

This type of trace may be performed during phase 502. Alternatively, a similar process, i.e. determining whether code that was interrupted is interpreted code, may occur during post-processing of a trace file.

Figure 8:
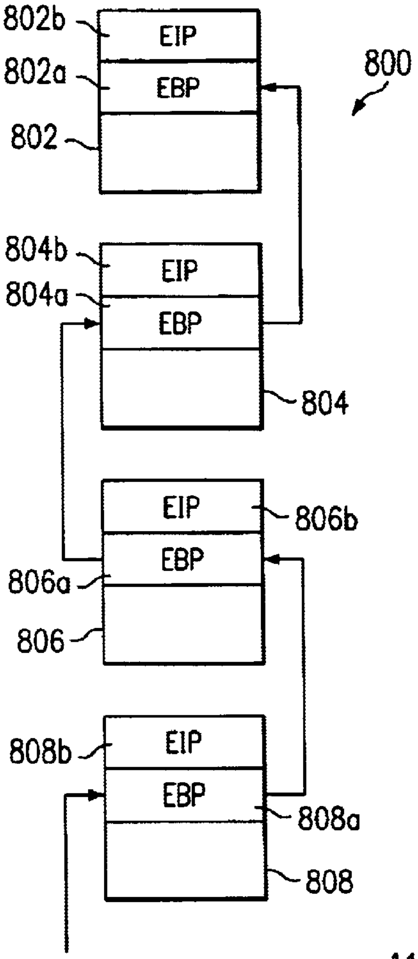
FIG. 8 is a diagram depicting the call stack containing stack frames.
Figure 9:
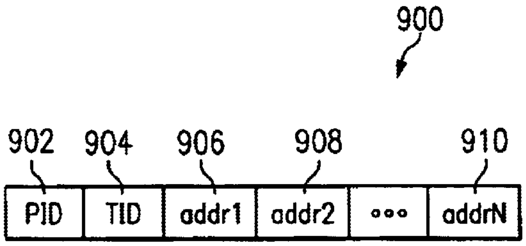
FIG. 9 is an illustration depicting a call stack sample.

A set of processes may be employed to obtain sample-based profiling information. As applications execute, the applications may be periodically interrupted in order to obtain information about the current runtime environment. This information may be written to a buffer or file for post-processing, or the information may be processed on the fly into data structures representing an ongoing history of the runtime environment. FIGS. 8 and 9 describe sample-based profiling in more detail.

A sample-based profiler may obtain information from the stack of an interrupted thread. The thread is interrupted by a software timer interrupt available in many operating systems. The user of the trace facility selects either the program counter option or the stack unwind option, which may be accomplished by enabling one major code or another major code, as described further below. This timer interrupt is employed to sample information from a call stack. By walking-back up the call stack, a complete call stack can be obtained for analysis. A "stack walk" may also be described as a "stack unwind", and the process of "walking the stack" may also be described as "unwinding the stack." Each of these terms illustrates a different metaphor for the process. The process can be described as "walking" as the process must obtain and process the stack frames step-by-step or frame-by-frame. The process may also be described as "unwinding" as the process must obtain and process the stack frames that point to one another, and these pointers and their information must be "unwound" through many pointer references.

The stack unwind follows the sequence of functions/method calls at the time of the interrupt. A call stack is an ordered list of routines plus offsets within routines (i.e. modules, functions, methods, etc.) that have been entered during execution of a program. For example, if routine A calls routine B, and then routine B calls routine C, while the processor is executing instructions in routine C, the call stack is ABC. When control returns from routine C back to routine B, the call stack is AB. For more compact presentation and ease of interpretation within a generated report, the names of the routines are presented without any information about offsets. Offsets could be used for more detailed analysis of the execution of a program, however, offsets are not considered further herein.

Thus, during timer interrupt processing or at post-processing, the generated sample-based profile information reflects a sampling of call stacks, not just leaves of the possible call stacks, as in some program counter sampling techniques. A leaf is a node at the end of a branch, i.e. a node that has no descendants. A descendant is a child of a parent node, and a leaf is a node that has no children.

With reference now FIG. 8, a diagram depicts the call stack containing stack frames. A "stack" is a region of reserved memory in which a program or programs store status data, such as procedure and function call addresses, passed parameters, and sometimes local variables. A "stack frame" is a portion of a thread's stack that represents local storage (arguments, return addresses, return values, and local variables) for a single function invocation. Every active thread of execution has a portion of system memory allocated for its stack space. A thread's stack consists of sequences of stack frames. The set of frames on a thread's stack represent the state of execution of that thread at any time. Since stack frames are typically interlinked (e.g., each stack frame points to the previous stack frame), it is often possible to trace back up the sequence of stack frames and develop the scall "stack". A call stack represents all not-yet-completed function calls—in other words, it reflects the function invocation sequence at any point in time.

Call stack 800 includes information identifying the routine that is currently running, the routine that invoked it, and so on all the way up to the main program. Call stack 800 includes a number of stack frames 802, 804, 806, and 808. In the depicted example, stack frame 802 is at the top of call stack 800, while stack frame 808 is located at the bottom of call stack 800. The top of the call stack is also referred to as the "root". The timer interrupt (found in most operating systems) is modified to obtain the program counter value (pcv) of the interrupted thread, together with the pointer to the currently active stack frame for that thread. In the Intel architecture, this is typically represented by the contents of registers: EIP (program counter) and EBP (pointer to stack frame). By accessing the currently active stack frame, it is possible to take advantage of the (typical) stack frame linkage convention in order to chain all of the frames together. Part of the standard linkage convention also dictates that the function return address be placed just above the invoked-function's stack frame; this can be used to ascertain the address for the invoked function. While this discussion employs an Intel-based architecture, this example is not a restriction. Most architectures employ linkage conventions that can be similarly navigated by a modified profiling interrupt handler.

When a timer interrupt occurs, the first parameter acquired is the program counter value. The next value is the pointer to the top of the current stack frame for the interrupted thread. In the depicted example, this value would point to EBP 808*a* in stack frame 808. In turn, EBP 606 points to EBP 806*a* in stack frame 806, which in turn points to EBP 804*a* in stack frame 804. In turn, this EBP points to EBP 802*a* in stack frame 802. Within stack frames 802–808 are EIPs 802*b*–808*b*, which identify the calling routine's return address. The routines may be identified from these addresses. Thus, routines are defined by collecting all of the return addresses by walking up or backwards through the stack.

With reference now to the FIG. 9, an illustration of a call stack is depicted. A call stack, such as call stack 900 is obtained by walking the call stack. A call stack is obtained each time a periodic event, such as, for example, a timer interrupt occurs. These call stacks may be stored as call stack unwind trace records (also called merely "stack unwinds") within the trace file for post-processing or may be processed on-the-fly while the program continues to execute.

In the depicted example, call stack 900 contains a pid 902, which is the process identifier, and a tid 904, which is the thread identifier. Call stack 900 also contains addresses addr1 906, addr2 908 . . . addrN 910. In this example, addr1 906 represents the value of the program counter at the time of the interrupt. This address occurs somewhere within the scope of the interrupted function. addr2 908 represents an address within the process that called the function that was interrupted. For Intel-processor-based data processing systems, it represents the return address for that call; decrementing that value by 4 results in the address of the actual call, also known as the call-site. This corresponds with EIP 808*b* in FIG. 8; addrN 910 is the top of the call stack (EIP 802*b*). The call stack that would be returned if the timer interrupt interrupted the thread whose call stack state is depicted in FIG. 8 would consist of: a pid, which is the process id of the interrupted thread; a tid, which is the thread id for the interrupted thread; a pcv, which is a program counter value (not shown on FIG. 8) for the interrupted thread; EIP 808*b*; EIP 806*b*; EIP 804*b*; and EIP 802*b*. In terms of FIG. 9, pcv=addr1, EIP 808*b*=addr2, EIP 806*b*=addr3, EIP 804*b*=addr4, EIP 802*b*=addr5.

With reference now to. FIG. 10A, a diagram of a program execution sequence along with the state of the call stack at each function entry/exit point is provided. The illustration shows entries and exits occurring at regular time intervals, but this is only a simplification for the illustration. If each function (A, B, C, and X in the figure) were instrumented with entry/exit event hooks, then complete accounting of the time spent within and below each function would be readily obtained. Note in FIG. 10A that at time 0, the executing thread is in routine C. The call stack at time 0 is C. At time1, routine C calls routine A, and the call stack becomes CA and so on. It should be noted that the call stack in FIG. 10A is a reconstructed call stack that is generated by processing the event-based trace records in a trace file to follow such events as method entries and method exits.

The accounting technique and data structures are described in more detail further below. Unfortunately, this type of instrumentation can be expensive, can introduce bias, and in some cases, can be difficult to apply. Sample-based profiling, during which the sampling would be limited to sampling the program's call stack, helps to alleviate the performance bias and other complications that entry/exit hooks can produce.

Consider FIG. 10B, in which the same program is executed but is being sampled on a regular basis. In the example, the interrupt occurs at a frequency equivalent to two timestamp values. Each sample includes a snapshot of the interrupted thread's call stack. Not all call stack combinations are seen with this technique; for example, note that routine X does not show up at all in the set of call stack samples in FIG. 10B. This is an acceptable limitation of sampling. The idea is that with an appropriate sampling rate (e.g., 30–1000 times per second), the call stacks in which most of the time is spent will be identified. Although some call stacks are omitted, it is a minor issue provided these call stacks are combinations for which little time is consumed.

In the event-based traces, there is a fundamental assumption that the traces contain information about routine entries and matching routine exits. Often, entry-exit pairs are nested in the traces because routines call other routines. Time spent (or memory consumed) between entry into a routine and exit from the same routine is attributed to that routine, but a user of a profiling tool may want to distinguish between time spent directly in a routine and time spent in other routines that it calls.

Figure 10C:
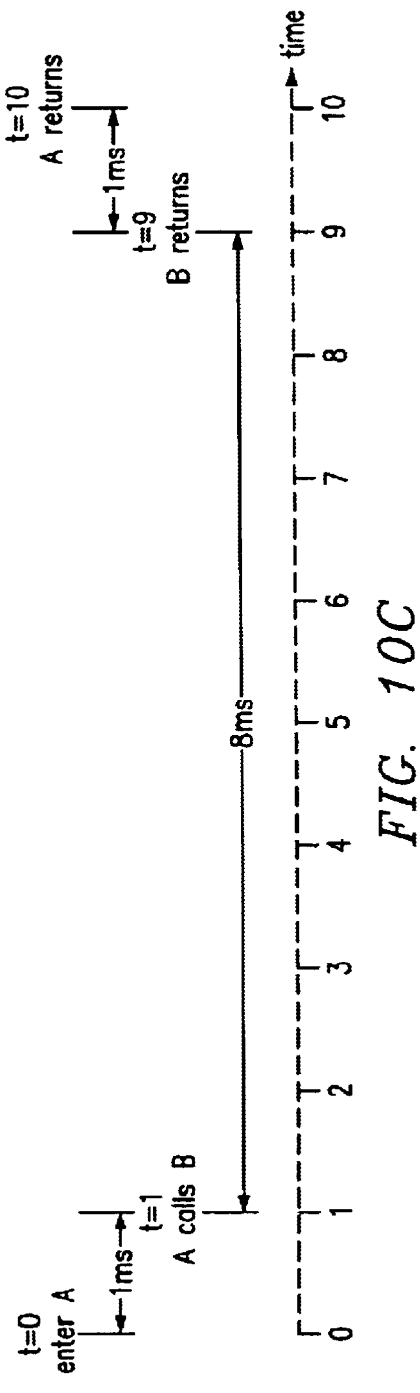
FIGS. 10C–D are time charts providing an example of the types of time for which the profiling tool accounts.

FIG. 10C shows an example of the manner in which time may be expended by two routines: a program's "main" calls routine A at time "t" equal to zero; routine A computes for 1 ms and then calls routine B; routine B computes for 8 ms and then returns to routine A; routine A computes for 1 ms and then returns to "main". From the point of view of "main", routine A took 10 ms to execute, but most of that time was spent executing instructions in routine B and was not spent executing instructions within routine A. This is a useful piece of information for a person attempting to optimize the example program. In addition, if routine B is called from many places in the program, it might be useful to know how much of the time spent in routine B was on behalf of (or when called by) routine A and how much of the time was on behalf of other routines.

A fundamental concept in the output provided by the methods described herein is the call stack. The call stack consists of the routine that is currently running, the routine that invoked it, and so on all the way up to main. A profiler may add a higher, thread level with the pid/tid (the process IDs and thread IDs). In any case, an attempt is made to follow the trace event records, such as method entries and exits, as shown in FIG. 10A, to reconstruct the structure of the call stack frames while the program was executing at various times during the trace.

The post-processing of a trace file may result in a report consisting of three kinds of time spent in a routine, such as routine A: (1) base time-the time spent executing code in routine A itself; (2) cumulative time (or "CUM time" for short)—the time spent executing in routine A plus all the time spent executing every routine that routine A calls (and all the routines they call, etc.); and (3) wall-clock time or elapsed time. This type of timing information may be obtained from event-based trace records as these records have timestamp information for each record.

A routine's cumulative time is the sum of all the time spent executing the routine plus the time spent executing any other routine while that routine is below it on the call stack. In the example above in FIG. 10C, routine A's base time is 2 ms, and its cumulative time is 10 ms. Routine B's base time is 8 ms, and its cumulative time is also 8 ms because it does not call any other routines. It should be noted that cumulative time may not be generated if a call stack tree is being generated on the fly—cumulative time may only be computed after the fact during the post-processing phase of a profile utility.

For wall-clock or elapsed time, if while routine B was running, the system fielded an interrupt or suspended this thread to run another thread, or if routine B blocked waiting on a lock or I/O, then routine B and all the entries above routine B on the call stack accumulate elapsed time but not base or cumulative time. Base and cumulative time are unaffected by interrupts, dispatching, or blocking. Base time only increases while a routine is running, and cumulative time only increases while the routine or a routine below it on the call stack is running.

Figure 10D:
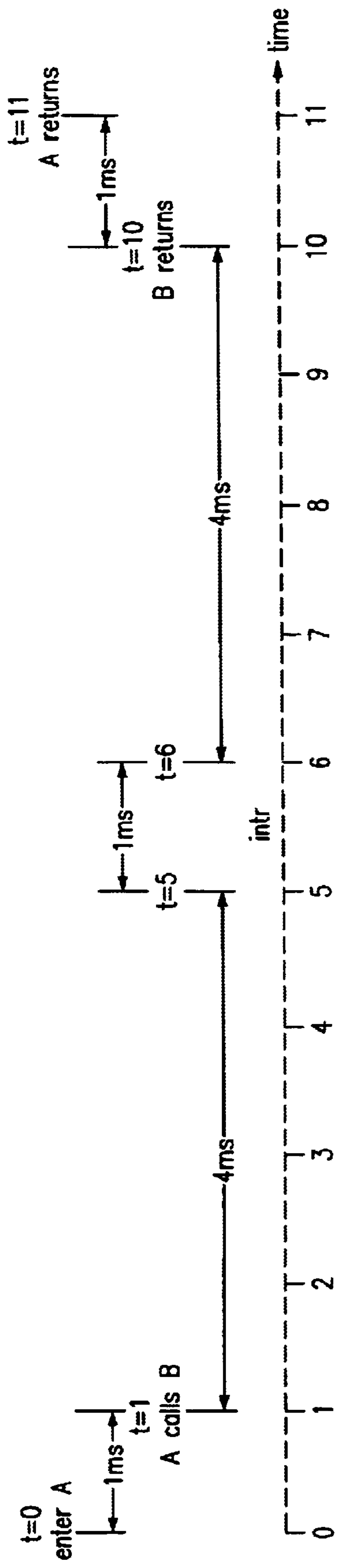

In the example in FIG. 10C, routine A's elapsed time is the same as its cumulative time—10 ms. Changing the example slightly, suppose there was a 1 ms interrupt in the middle of B, as shown in FIG. 10D. Routine A's base and cumulative time are unchanged at 2 ms and 10 ms, but its elapsed time is now 11 ms.

Although base time, cumulative time and elapsed time were defined in terms of processor time spent in routines, profiling is useful for attributing consumption of almost any system resource to a set of routines, as described in more detail below with respect to FIG. 11B. Referring to FIG. 10C again, if routine A initiated two disk I/O's, and then routine B initiated three more I/O's when called by routine A, routine A's "base I/O's" are two and routine A's "cumulative I/O's" are five. "Elapsed I/O's" would be all I/O's, including those by other threads and processes that occurred between entry to routine A and exit from routine A. More general definitions for the accounting concepts during profiling would be the following: base—the amount of the tracked system resource consumed directly by this routine; cumulative—the amount of the tracked system resource consumed by this routine and all routines below it on the call stack; elapsed—the total amount of the tracked system resource consumed (by any routine) between entry to this routine and exit from the routine.

Figure 11A:
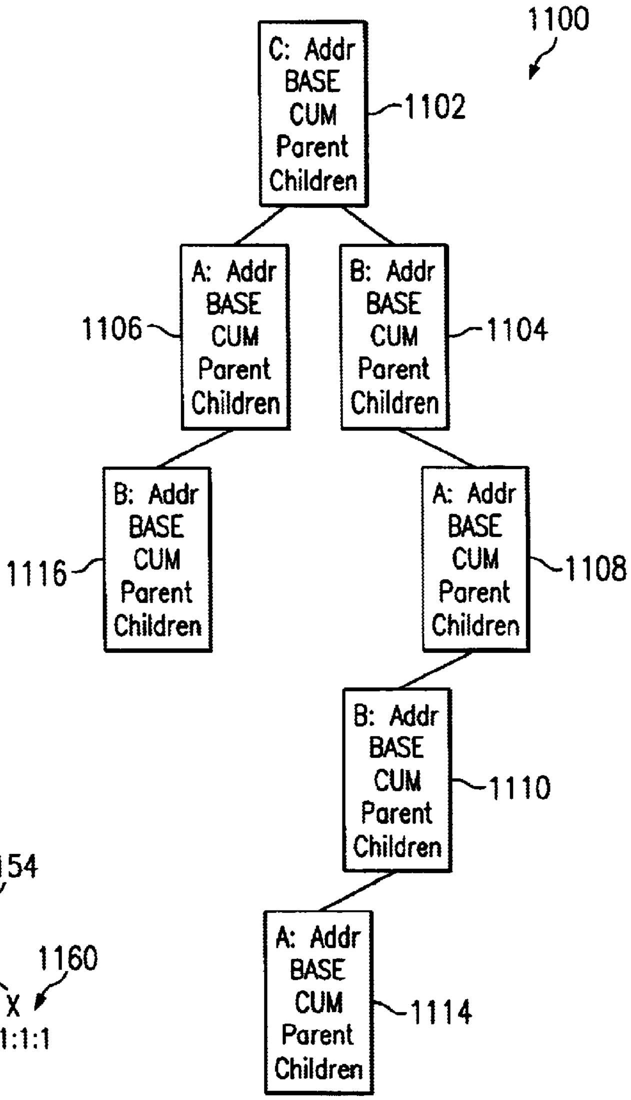
FIG. 11A is a diagram depicting a tree structure generated from sampling a call stack.

With reference now to FIG. 11A, a diagram depicts a tree structure generated from trace data. This figure illustrates a call stack tree 1100 in which each node in tree structure 1100 represents a function entry point.

Additionally, in each node in tree structure 1100, a number of statistics are recorded. In the depicted example, each node, nodes 1102–1116, contains an address (addr), a base time (BASE), cumulative time (CUM) and parent and children pointers. As noted above, this type of timing information may be obtained from event-based trace records as these records have timestamp information for each record. The address represents a function entry point. The base time represents the amount of time consumed directly by the thread executing this function. The cumulative time is the amount of time consumed by the thread executing this function and all functions below it on the call stack. In the depicted example, pointers are included for each node. One pointer is a parent pointer, a pointer to the node's parent. Each node also contains a pointer to each child of the node.

Those of ordinary skill in the art will appreciate that tree structure 1100 may be implemented in a variety of ways and that many different types of statistics may be maintained at the nodes other than those in the depicted example.

The call stack is developed from looking back at all return addresses. These return addresses will resolve within the bodies of those functions. This information allows for accounting discrimination between distinct invocations of the same function. In other words, if function X has 2 distinct calls to function A, the time associated with those calls can be accounted for separately. However, most reports would not make this distinction.

Figure 11B:
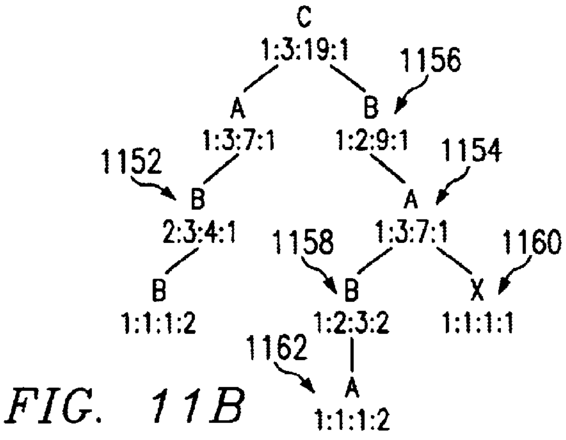
FIG. 11B is a diagram depicting an event tree, which reflects call stacks observed during system execution.

With reference now to FIG. 11B, a call stack tree which reflects call stacks observed during a specific example of system execution will now be described. At each node in the tree, several statistics are recorded. In the example shown in FIG. 11B, the statistics are time-based statistics. The particular statistics shown include the number of distinct times the call stack is produced, the sum of the time spent in the call stack, the total time spent in the call stack plus the time in those call stacks invoked from this call stack (referred to as cumulative time), and the number of instances of this routine above this instance (indicating depth of recursion).

For example, at node 1152 in FIG. 11B, the call stack is CAB, and the statistics kept for this node are 2:3:4:1. Note that call stack CAB is first produced at time 2 in FIG. 10A, and is exited at time 3. Call stack CAB is produced again at time 4, and is exited at time 7. Thus, the first statistic indicates that this particular call stack, CAB, is produced twice in the trace. The second statistic indicates that call stack CAB exists for three units of time (at time 2, time 4, and time 6). The third statistic indicates the cumulative amount of time spent in call stack CAB and those call stacks invoked from call stack CAB (i.e., those call stacks having CAB as a prefix, in this case CABB). The cumulative time in the example shown in FIG. 11B is four units of time. Finally, the recursion depth of call stack CAB is one, as none of the three routines present in the call stack have been recursively entered.

Those skilled in the art will appreciate that the tree structure depicted in FIG. 11B may be implemented in a variety of ways, and a variety of different types of statistics may be maintained at each node. In the described embodiment, each node in the tree contains data and pointers. The data items include the name of the routine at that V node, and the four statistics discussed above. Of course, many other types of statistical information may be stored at each node. In the described embodiment, the pointers for each node include a pointer to the node's parent, a pointer to the first child of the node (i.e. the left-most child), a pointer to the next sibling of the node, and a pointer to the next instance of a given routine in the tree. For example, in FIG. 11B, node 1154 would contain a parent pointer to node 1156, a first child pointer to node 1158, a next sibling pointer to node 1160, and a next instance pointer to node 1162. Those skilled in the art will appreciate that other pointers may be stored to make subsequent analysis more efficient. In addition, other structural elements, such as tables for the properties of a routine that are invariant across instances, e.g., the routine's name, may also be stored.

The type of performance information and statistics maintained at each node are not constrained to time-based performance statistics. The present invention may be used to present many types of trace information in a compact manner, which supports performance queries. For example, rather than keeping statistics regarding time, tracing may be used to track the number of Java bytecodes executed in each method (i.e., routine) called. The tree structure of the present invention would then contain statistics regarding bytecodes executed rather than time. In particular, the quantities recorded in the second and third categories would reflect the number of bytecodes executed rather than the amount of time spent in each method.

Tracing may also be used to track memory allocation and deallocation. Every time a routine creates an object, a trace record could be generated. The tree structure of the present invention would then be used to efficiently store and retrieve information regarding memory allocation. Each node would represent the number of method calls, the amount of memory allocated within a method, the amount of memory allocated by methods called by the method, and the number of methods above this instance (i.e., the measure of recursion). Those skilled in the art will appreciate that the tree structure of the present invention may be used to represent a variety of performance data in a manner which is very compact, and allows a wide variety of performance queries to be performed.

The tree structure shown in FIG. 11B depicts one way in which data may be pictorially presented to a user. The same data may also be presented to a user in tabular form as shown in FIG. 12.

With reference now to FIG. 12, a call stack tree presented as a table will now be described. Note that FIG. 12 contains a routine, pt_pidtid, which is the main process/thread, which calls routine C. Table 12 includes columns of data for Level 1230, RL 1232, Calls 1234, Base 1236, Cum 1238, and Indent 1240. Level 1230 is the tree level (counting from the root as level 0) of the node. RL 1232 is the recursion level. Calls 1234 is the number of occurrences of this particular call stack, i.e., the number of times this distinct call stack configuration occurs. Base 1236 is the total observed time in the particular call stack, i.e., the total time that the stack had exactly these routines on the stack. Cum 1238 is the total time in the particular call stack plus deeper levels below it. Indent 1240 depicts the level of the tree in an indented manner. From this type of call stack configuration information, it is possible to infer each unique call stack configuration, how many times the call stack configuration occurred, and how long it persisted on the stack. This type of information also provides the dynamic structure of a program, as it is possible to see which routine called which other routine. However, there is no notion of time-order in the call stack tree. It cannot be inferred that routines at a certain level were called before or after other routines on the same level.

Figure 13:
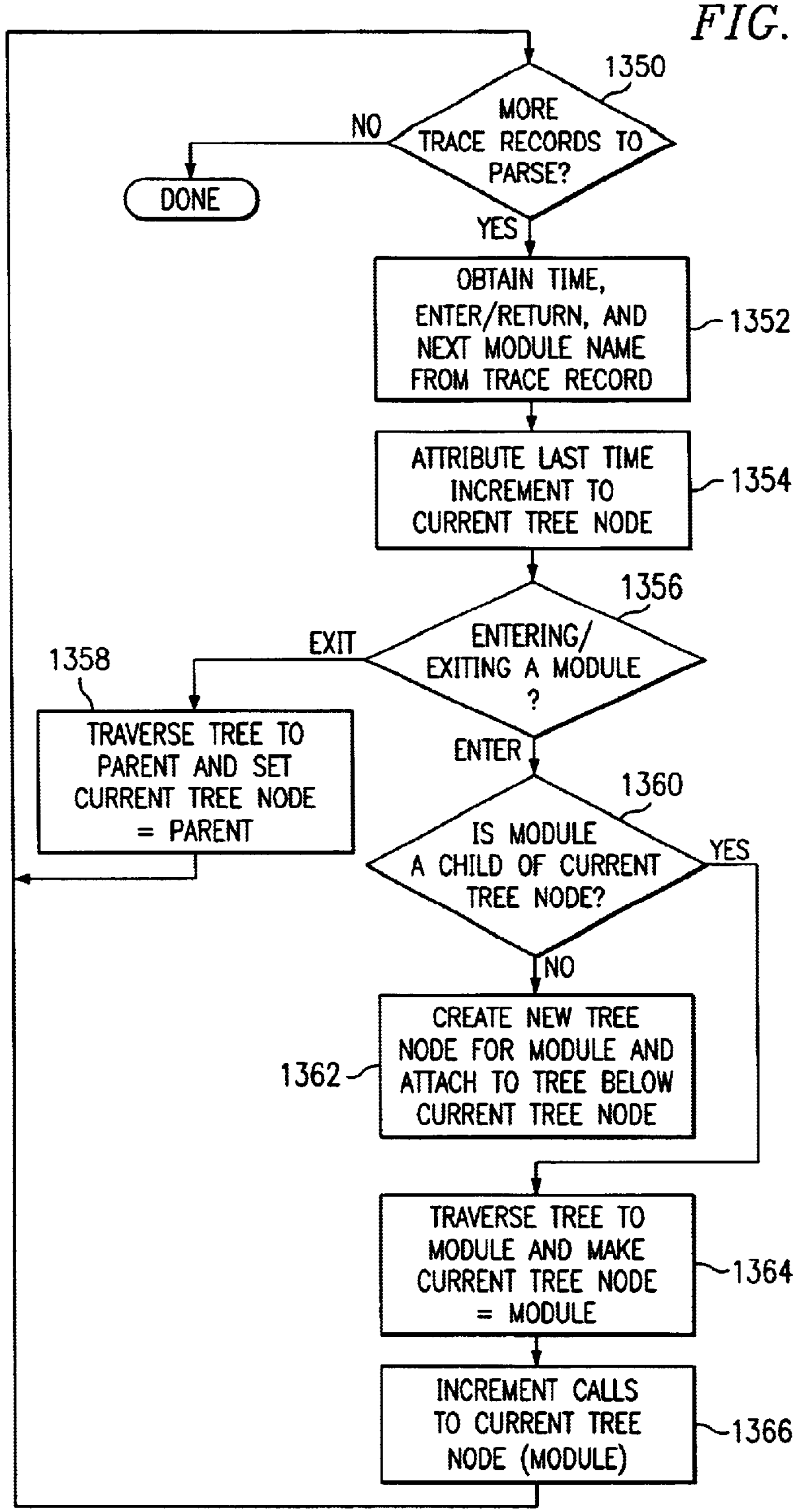
FIG. 13 is a flow chart depicting a method for building a call stack tree using a trace text file as input.

The pictorial view of the call stack tree, as illustrated in FIG. 11B, may be built dynamically on-the-fly or built statically using a trace file as input. FIG. 13 depicts a flow chart of a method for building a call stack tree using a trace file as input. In FIG. 13, the call stack tree is built to illustrate module entry and exit points.

With reference now to FIG. 13, it is first determined if there are more trace records in the trace file (step 1350). If so, several pieces of data are obtained from the trace record, including the time, whether the event is an enter or an exit, and the module name (step 1352). Next, the last time increment is attributed to the current node in the tree (step 1354). A check is made to determine if the trace record is an enter or an exit record (step 1356). If it is an exit record, the tree is traversed to the parent (using the parent pointer), and the current tree node is set equal to the parent node (step 1358). If the trace record is an enter record, a check is made to determine if the module is already a child node of the current tree node (step 1360). If not, a new node is created for the module and it is attached to the tree below the current tree node (step 1362). The tree is then traversed to the module's node, and the current tree node is set equal to the module node (step 1364). The number of calls to the current tree node is then incremented (step 1366). This process is repeated for each trace record in the trace output file until there are no more trace records to parse.

Figure 14:
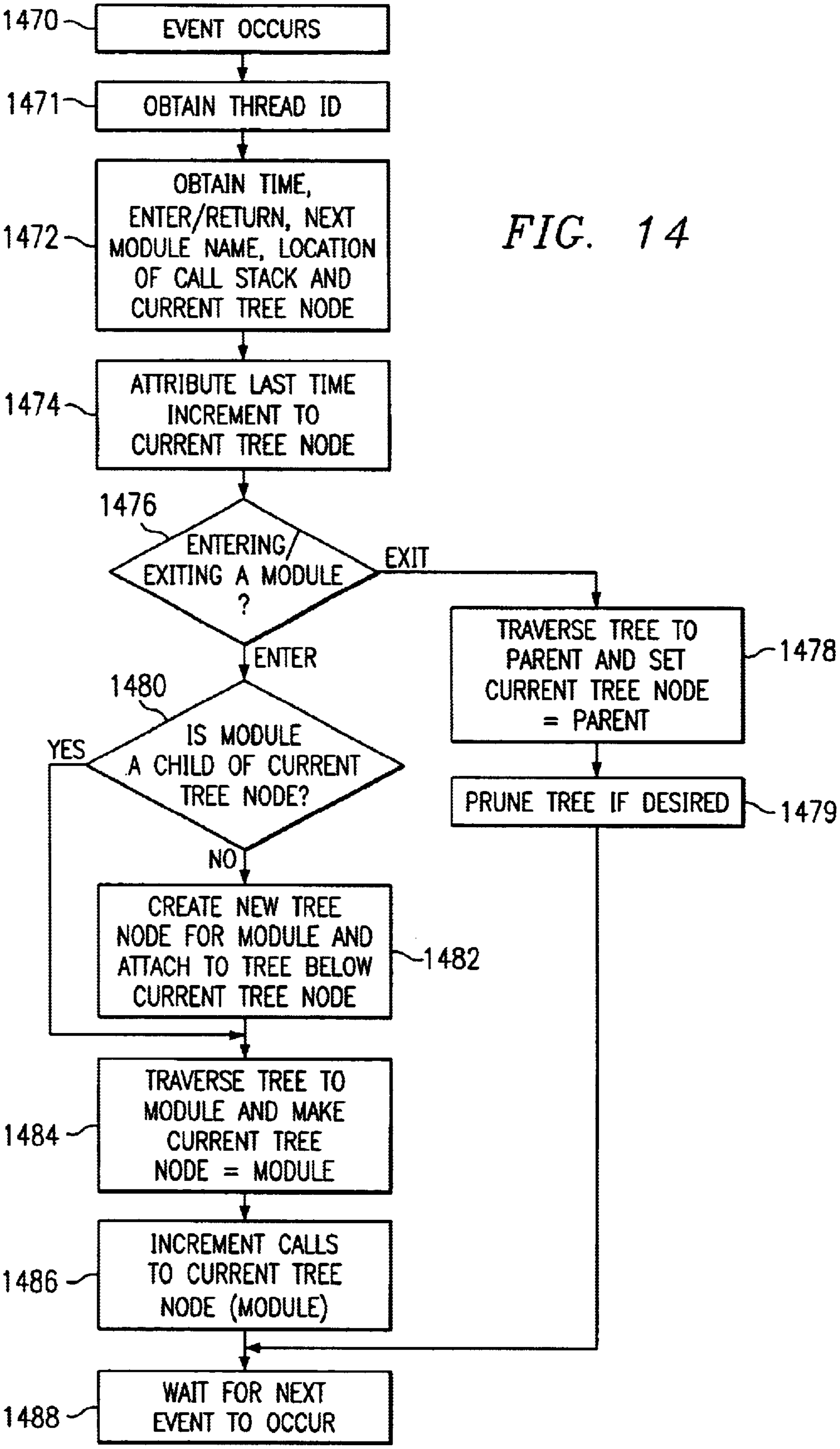
FIG. 14 is a flow chart depicting a method for building a call stack tree dynamically as tracing is taking place during system execution.

With reference now to FIG. 14, a flow chart depicts a method for building a call stack tree dynamically as tracing is taking place during system execution. In FIG. 14, as an event is logged, it is added to the tree in real time. Preferably, a separate call stack tree is maintained for each thread. The call stack tree reflects the call stacks recorded to date, and a current tree node field indicates the current location in a particular tree. When an event occurs (step 1470), the thread ID is obtained (step 1471). The time, type of event (i.e., in this case, whether the event is a method entry or exit), the name of the module (i.e., method), location of the thread's call stack, and location of the thread's "current tree node" are then obtained (step 1472). The last time increment is attributed to the current tree node (step 1474). A check is made to determine if the trace event is an enter or an exit event (step 1476). If it is an exit event, the tree is traversed to the parent (using the parent pointer), and the current tree node is set equal to the parent node (step 1478). At this point, the tree can be dynamically pruned in order to reduce the amount of memory dedicated to its maintenance (step 1479). Pruning is discussed in more detail below. If the trace event is an enter event, a check is made to determine if the module is already a child node of the current tree node (step 1480). If not, a new node is created for the module, and it is attached to the tree below the current tree node (step 1482). The tree is then traversed to the module's node, and the current tree node is set equal to the module node (step 1484). The number of calls to the current tree node is then incremented (step 1486). Control is then passed back to the executing module, and the dynamic tracing/reduction program waits for the next event to occur (step 1488).

One of the advantages of using the dynamic tracing/reduction technique described in FIG. 14 is its enablement of long-term system trace collection with a finite memory buffer. Very detailed performance profiles may be obtained without the expense of an "infinite" trace buffer. Coupled with dynamic pruning, the method depicted in FIG. 14 can support a fixed-buffer-size trace mechanism.

The use of dynamic tracing and reduction (and dynamic pruning in some cases) is especially useful in profiling the performance characteristics of long running programs. In the case of long running programs, a finite trace buffer can severely impact the amount of useful trace information that may be collected and analyzed. By using dynamic tracing and reduction (and perhaps dynamic pruning), an accurate and informative performance profile may be obtained for a long running program.

Many long-running applications reach a type of steady-state, where every possible routine and call stack is present in the tree and updating statistics. Thus, trace data can be recorded and stored for such applications indefinitely within the constraints of a bounded memory requirement using dynamic pruning. Pruning has value in reducing the memory requirement for those situations in which the call stacks are actually unbounded. For example, unbounded call stacks are produced by applications that load and run other applications.

Pruning can be performed in many ways, and a variety of pruning criteria is possible. For example, pruning decisions may be based on the amount of cumulative time attributed to a subtree. Note that pruning may be disabled unless the amount of memory dedicated to maintaining the call stack exceeds some limit. As an exit event is encountered (such as step 1478 in FIG. 14), the cumulative time associated with the current node is compared with the cumulative time associated with the parent node. If the ratio of these two cumulative times does not exceed a pruning threshold (e.g., 0.1), then the current node and all of its descendants are removed from the tree. The algorithm to build the tree proceeds as before by traversing to the parent, and changing the current node to the parent.

Many variations of the above pruning mechanism are possible. For example, the pruning threshold can be raised or lowered to regulate the level of pruning from very aggressive to none. More global techniques are also possible, including a periodic sweep of the entire call stack tree, removing all subtrees whose individual cumulative times are not a significant fraction of their parent node's cumulative times.

Data reduction allows analysis programs to easily and quickly answer many questions regarding how computing time was spent within the traced program. This information may be gathered by "walking the tree" and accumulating the data stored at various nodes within the call stack tree, from which it can be determined the amount of time spent strictly within routine A, the total amount of time spent in routine A and in the routines called by routine A either directly or indirectly, etc.

Figure 15A:
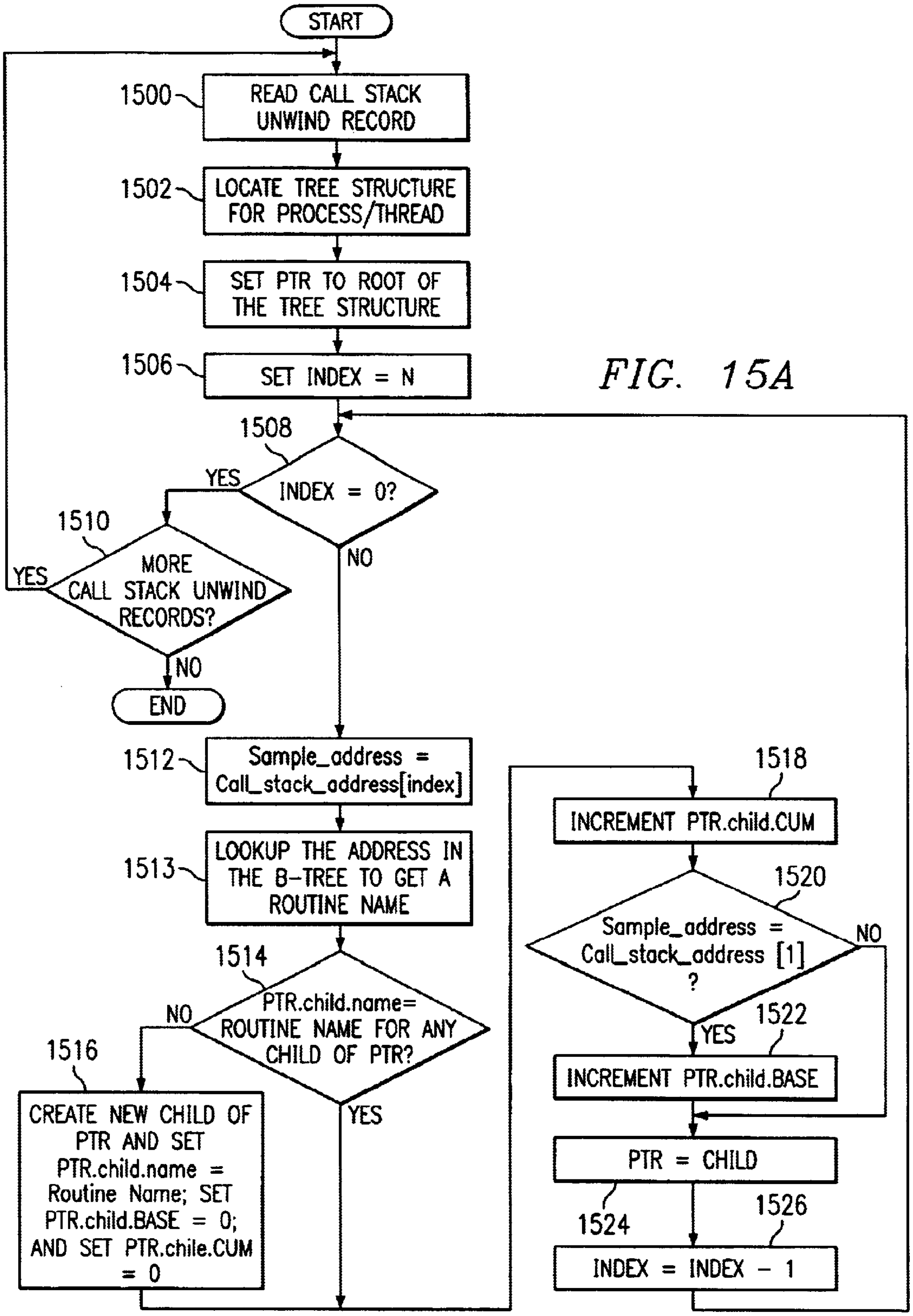
FIG. 15A is a flowchart depicting a process for creating a call stack tree structure from call stack unwind records in a trace file.

With reference now to FIG. 15A, a flowchart depicts a process for creating a call stack tree structure from call stack unwind records in a trace file. FIGS. 10A–14 above primarily showed the processes involved in generating a call stack tree from event-based trace records, which show events such as method entries and method exits. These types of trace records allow a call stack to be generated, usually during a postprocessing phase of the profile tool or utility. Using timer interrupts, a profiling function may walk an active call stack to generate a call stack unwind trace record. FIG. 15A describes a process for combining the information in a call stack unwind trace record into a call stack tree. The call stack tree may have been previously constructed from other call stack unwind trace records or from event-based trace records according to the methods described in FIGS. 10A–14.

The process begins by reading a call stack unwind record (step 1500). This step processes the call stack information in the record to determine what routines are or were executing when the timer interrupt occurs or occurred, depending on whether the call stack unwind record is being processed on-the-fly or is being postprocessed. A sample-based profiling function avoids, through the call stack unwind, the need for adding additional instructions to the program, which affects the performance and time spent in routines. Next, the tree structure for this process/thread (pid, tid) is located (step 1502). Then, the pointer (PTR) is set to the root of this tree structure by setting PTR=root(pid, tid) (step 1504). The index is set equal to N, which is the number of entries in the call stack (step 1506).

A determination is made as to whether the index is equal to zero (step 1508). If the index is equal to zero, the process then returns to determine whether additional call stack unwind trace records are present for processing (step 1510). If additional call stack unwind trace records are present, the process then returns to step 1500 to read another call stack unwind trace record. Otherwise, the process terminates.

On the other hand, if the index is not equal to zero, the process then sets sample__address equal to the call__stack__address[index] (step 1512). The B-tree is then used to lookup the address to get a routine name (step 1513). Next, a determination is made as to whether PTR.child.name for any child of PTR is equal to the looked-up routine name (step 1514). In other words, this step determines whether the routine name has ever been seen at this level in the tree structure. If the address has never been seen at this level in the tree structure, a new child of PTR is created and the PTR.child.name is set equal to the routine name, the variable PTR.child.BASE for the node is set equal to zero, and the variable PTR.child.CUM for the node is set equal to zero (step 1516). Thereafter, the cumulative time for the node is incremented by incrementing the variable PTR.child.CUM (step 1518). The process also proceeds to step 1518 from step 1514 if the address has been seen at this level. In the case of sample-based trace records, the "cumulative" time represents the number of times that this particular call stack configuration has been processed.

Next, a determination is made as to whether the sample address, sample__address, is equal the last address in the call stack sample, call__stack__address[1] (step 1520). If the sample address is equal to the address being processed, the base time for the node is incremented by incrementing the variable PTR.child.BASE (step 1522). The pointer PTR is then set equal to the child (step 1524), and the index is decremented (step 1526) with the process then returning to step 1508 as previously described. With reference again to step 1520, if the sample address is not equal to the address being processed, the process then proceeds to step 1524.

In the depicted example in FIG. 15A, the process is used to process call stack unwind records recorded during execution of a program. The illustrated process also may be implemented to dynamically process call stack unwind records during execution of a program. For example, step 1510 may be modified to wait until the next timer interrupt occurs and then continue to loop back to step 1510 at the next interrupt.

The addresses obtained during sampling are used to identify functions. The functions are identified by mapping these addresses into functions.

With reference now to FIG. 15B, a flowchart depicts a process for identifying functions from an address obtained during sampling. The process begins by reading a program counter value that is obtained during sampling of the call stack (step 1550). A determination is made as to whether the end of file has been reached (step 1552). If the end of the file has not been reached, the program counter value is looked up in a global map (step 1554). A global map in the depicted example is a map of system and per process symbols that are generated from system loader information and application, library, and system symbol tables. A process plus function id is obtained from the global map in response to looking up the program counter value (step 1556). Thereafter, the process returns to step 1550.

The function information may be used in generating reports, such as those described below. The process in FIG. 15B also may be used during execution of a program that is sampled.

With reference now to FIG. 16, a diagram of a record generated using the processes of present invention is depicted. Each routine in record 1600 is listed separately, along with information regarding the routine in FIG. 16. For example, calls column 1602 lists the number of times each routine has been called. BASE column 1604 contains the total time spent in the routine, while CUM column 1606 includes the cumulative time spent in the routine and all routines called by the routine. Name column 1608 contains the name of the routine.

With reference now to FIG. 17, a diagram of another type of report that may be produced is depicted. The report depicted in FIG. 17 illustrates much of the same information found in FIG. 17, but in a slightly different format. As with FIG. 17, diagram 1700 includes information on calls, base time, and cumulative time.

FIG. 17 shows a trace output containing times spent within various routines as measured in microseconds. FIG. 17 contains one stanza (delimited by horizontal lines) for each routine that appears in the trace output. The stanza contains information about the routine itself on the line labeled "Self", about who called it on lines labeled "Parent", and about who the routine called on lines labeled "Child". The stanzas are in order of cumulative time. The third stanza is about routine A, as indicated by the line beginning with "Self." The numbers on the "Self" line of this stanza show that routine A was called three times in this trace, once by routine C and twice by routine B. In the profile terminology, routines C and B are (immediate) parents of routine A. Routine A is a child of routines C and B. All the numbers on the "Parent" rows of the second stanza are breakdowns of routine A's corresponding numbers. Three microseconds of the seven microsecond total base time spent in A was when it was called by routine C, and three microseconds when it was first called by routine B, and another one microsecond when it was called by routine B for a second time. Likewise, in this example, half of routine A's fourteen microsecond cumulative time was spent on behalf of each parent.

Looking now at the second stanza, we see that routine C called routine B and routine A once each. All the numbers on "Child" rows are subsets of numbers from the child's profile. For example, of the three calls to routine A in this trace, one was by routine C; of routine A's seven microsecond total base time, three microseconds were while it was called directly by routine C; of routine A's fourteen microsecond cumulative time, seven microseconds was on behalf of routine C. Notice that these same numbers are the first row of the third stanza, where routine C is listed as one of routine A's parents.

The four relationships that are true of each stanza are summarized at the top of FIG. 17. First, the sum of the numbers in the Calls column for Parents equals the number of calls on the Self row. Second, the sum of the numbers in the Base column for Parents equals Self's base. Third, the sum of the numbers in the Cum column for Parents equals Self's Cum. These first three invariants are true because these characteristics are the definition of Parent; collectively they are supposed to account for all of Self's activities.

Fourth, the Cum in the Child rows accounts for all of Self's Cum except for its own Base.

Program sampling may contain information from the call stack and may provide a profile reflecting the sampling of an entire call stack, not just the leaves. Furthermore, the sample-based profiling technique may also be applied to other types of stacks. For example, with Java programs, a large amount of time is spent in a routine called the "interpreter". If only the call stack was examined, the profile would not reveal much useful information. Since the interpreter also tracks information in its own stack, e.g., a Java stack (with its own linkage conventions), the process can be used to walk up the Java stack to obtain the calling sequence from the perspective of the interpreted Java program.

With reference now to FIG. 18, a figure depicts a report generated from a trace file containing both event-based profiling information, such as method entry/exits, and stack unwind information generated during sample-based profiling. FIG. 1B is similar to FIG. 12, in which a call stack tree is presented as a report, except that FIG. 18 contains embedded stack walking information. Call stack tree 1800 contains two stack unwinds generated within the time period represented by the total of 342 ticks. Stack unwind identifier 1802 denotes the beginning of stack unwind information 1806, with the names of routines that are indented to the right containing the stack information that the stack walking process was able to discern. Stack unwind identifier 1804 denotes the beginning of stack unwind information 1808. In this example, "J:" identifies an interpreted Java method and "F:" identifies a native function, such as a native function within JavaOS. A call from a Java method to a native method is via "ExecuteJava." Hence, at the point at which the stack walking process reaches a stack frame for an "ExecuteJava," it cannot proceed any further up the stack as the stack frames are discontinued. The process for creating a tree containing both event-based nodes and sample-based nodes is described in more detail further below. In this case, identifiers 1802 and 1804 also denote the major code associated with the stack unwind.

With reference now to FIG. 19, a table depicts major codes and minor codes that may be employed to instrument software modules for profiling. A set of codes may be used to turn on and off various types of profiling functions in a particular profiling session.

For example, as shown in FIG. 19, the minor code for a stack unwind is designated as 0x7fffffff, which may be used for two different purposes. The first purpose, denoted with a major code of 0x40, is for a stack unwind during a timer interrupt. The second purpose, denoted with a major code of 0x41, is for a stack unwind in an instrumented routine. When the stack information is output into a trace file with its major and minor codes, the trace information that-appears within the file can be analyzed in the appropriate manner indicated by the major and minor codes.

Other examples in the table show a profile or major code purpose of tracing jitted methods with a major code value of 0x50. Tracing of jitted methods may be distinguished based on the minor code that indicates method invocation or method exit. In contrast, a major code of 0x30 indicates a profiling purpose of instrumenting interpreted methods, while the minor code again indicates, with the same values, method invocation or method exit.

Referring back to FIG. 18, the connection can be made between the use of major and minor codes, the instrumentation of code, and the post-processing of profile information. In the generated report shown in FIG. 18, the stack unwind identifiers can be seen to be equal to 0x40, which, according to the table in FIG. 19, is a stack unwind generated in response to a timer interrupt. This type of stack unwind may have occurred in response to an interrupt that was created in order to generate a sampled profile of the executing software.

As noted in the last column of the table in FIG. 19, by using a utility that places a hook into a software module to be profiled, a stack unwind may be instrumented into a routine. If so, the output for this type of stack unwind will be designated with a major code of 0x41.

As noted previously in the description related to FIGS. 11A–11B, tracing may also be used to track memory allocation and deallocation in order to find and resolve memory leaks. A memory leak occurs when the dynamically allocated memory space is not properly deallocated. The memory allocation mechanism, which may be the Jvm, cannot reallocate the memory space because it was not deallocated, and a portion of memory is no longer being utilized. Over time, the amount of allocable memory may gradually diminish. In general, memory leaks are extremely difficult to find, as the first and only symptom of a memory leak may be a system crash, which may occur significantly after the "leaky" code has executed. Alternatively, when a low memory condition arises, the system may enter a soft shutdown mode in which an application is safely halted without crashing.

In the Java environment, since the allocations and deallocations are performed by the Jvm, a Java application developer is usually not aware of the costs associated with object management. Although, in many ways, the object-oriented nature of the Jvm and the convenience of the Garbage Collector relieve the developer of some program execution duties, the developer is, in other ways, less in control of the execution environment. This situation compounds the difficulties in finding memory leaks.

By generating trace information or events concerning memory allocation and deallocation, the present invention may enable a software developer to identify a memory leak. Every time a routine creates an object, thereby requiring memory allocation for the object, an event may be generated, and the profiler may be notified of the memory allocation event. To process the event, a call stack tree structure maintained in real-time by the profiler may then be used to efficiently store and retrieve information regarding memory allocation. Each node representing a routine could store the number of method calls, the amount of memory allocated within a method, the amount of memory allocated by methods called by the method, and the number of methods above in this instance (i.e., the measure of recursion), etc. This provides memory allocation and deallocation information in conjunction with a method call stack context. However, keeping track of memory deallocations related to objects created for a method is difficult because objects in an object-oriented runtime environment are generally freed by a Garbage Collector, such as, a Garbage Collector within memory management 374.

Although the present invention will be described in terms of the Java runtime environment, one of ordinary skill in the art would readily realize that the present invention could be implemented in other programming languages without departing from the scope of the invention. For example, one of ordinary skill in the art could easily incorporate the features of the present invention in the C programming language. In C, object allocations would correspond to MALLOCs and object frees would correspond to FREEs.

With a MALLOC, the object ID would be the address of the storage returned by the MALLOC call. In order to support tracing MALLOC/FREE events, the MALLOC/FREE code must be instrumented, which could be done via a variety of means. These include the methodolgy previously described in patent, U.S. Pat. No. 5,946,486: "APPARATUS AND METHOD FOR TRACING ENTRIES TO OR EXITS FROM A DYNAMICALLY LINKED LIBRARY" Other approaches include patching the object code and instrumenting the source.

With reference now to FIG. 20, a block diagram depicting a data structure that may be used to facilitate tracking additional information related to a routine. This process is more thoroughly discussed in "METHOD AND SYSTEM FOR MEMORY LEAK DETECTION IN AN OBJECT-ORIENTED ENVIRONMENT DURING REAL-TIME TRACE PROCESSING", U.S. application Ser. No. 09/414,331, which is incorporated herein by reference.

Node 2002 is similar to one of the nodes depicted within FIG. 11A. Address 2004 represents a routine entry point. Base metric 2006 ("BASE") represents the amount of a tracked metric (such as time) consumed directly by the execution of the routine represented by node 2002. Cumulative metric 2008 ("CUM") is the amount of a metric (such as time) consumed by the execution of this routine and all routines below it on the call stack. Parent 2010 is a pointer to this node's parent node in the call stack tree. Children 2012 are pointers to each child node of this node.

As noted previously, nodes may include data items related to non-temporal profile statistics. DPTR 2014 is a pointer to a node data area provided by the profiler. When the node is created, a node data area is not automatically allocated for the node, and its pointer to the node data area (DPTR) is initialized to zero or NULL, as shown by DPTR 2014.

The profiler allocates a node data area for a node, which represents a method that has had an object, allocated. Node 2020 represents a method that has had at least one object allocation, so node 2020 has DPTR 2022 that points to node data area 2030, which is one of several node data areas maintained by the profiler, such as node data area 2040 and node data area 2050. The profiler may use a variety of data structures for maintaining the node data areas, such as, a linked list. As a node data area is needed for a node, a new element may be added to the linked list. Alternatively, the profiler has its own buffer area or "mini heap" from which it may allocate space for each node data area. Here space in mini heap 2032 has been allocated for node data areas 2050, 2040 and 2030.

Several data items may be stored within each node data area, and the number and content of the data items may vary depending upon the implementation of the system. Node data area 2030 may contain a variety of information related to a node including statistical data, or as described in the above-mentioned patent application, memory allocation information. In the case of memory allocation, node data area 2030 may contain, for example, the number of object allocations, number of object deallocations, number of bytes allocated, number of bytes deallocated, counts and classes of live objects, and other memory-related information.

After the profiler has allocated and initialized node data area 2030 in response to the notification of an allocation of the first object for the method represented by node 2020, the pointer to the node data area for node 2020 is returned to the object allocation code, and the object allocation code places the pointer to the node data area within the object. The profiler returns the pointer to the node data area for each object allocated for the method represented by node 2020, so each object "owned" by the method contains this pointer.

The object allocation code allocates objects from a heap, such as Jvm heap 2060. Within Jvm heap 2060, each object owned by a method has been modified to hold a copy of the appropriate node data area pointer. For example, objects 2062, 2064, 2066 and 2068 owned by node 2020 contain copies of its DPTR 2022.

While this method has the advantage of providing each object that is allocated from a heap, and owned by a node, with a pointer referenced to a node data area containing additional information about the call stack and statistical information kept for the node, it has certain side effects as well. Some of these side effects result from the object allocation code inserting the node data area pointer in the object, the object's size is thereby increased with the addition of the pointer.

One problem associated with modifying an object's size is allocating the additional space in the heap needed to accommodate the object. If the modified object fits into a minimum allocation area designated for an object then no further allocation of heap area is necessary by the object allocation code. However, if the modified object does not fit within the minimum allocation area designated for the object, then the object allocation code must allocate an additional minimum allocation area for the portion of the object not fitting into the allocated area of the heap. In this case, most of the additional area allocated in the heap is unused and wasted because its only content is a pointer. If the insertion of node data area pointer in an object does not increase the object's size over that in the minimum allocation area the memory space in the heap is conserved and even optimized because no additional space must be allocated from the heap for the pointer. However, if the inclusion of a pointer within an object increases the object's area over the area allocated in the heap, then the additional minimum allocation area allocated in the heap for the object is mostly wasted because the area is used only for object overflow caused by inserting the pointer.

Additionally, the inclusion of a pointer within an object also makes extending an object more difficult because the pointer, which is not part of the original object, must be dealt with. The extra space needed for the object is more difficult to allocate because the pointer to the node data area must be accounted for.

A final problem associated with modifying an object is that the pointer affects the object's behavior. It is not unreasonable to assume that the object code defining an object has been optimized prior to allocating the object. If that object is then modified it cannot be taken for granted that the object will behave as expected. While the differences in the object with and without the pointer may only amount to a slight reduction in performance, this slight reduction cannot be assured. Moreover, the inclusion of the pointer has the affect of slanting some of the statistical information sought by including the pointer in the first place. Thus, the inclusion of a pointer affects the very post processing information that was originally sought by including the pointer.

Figure 21:
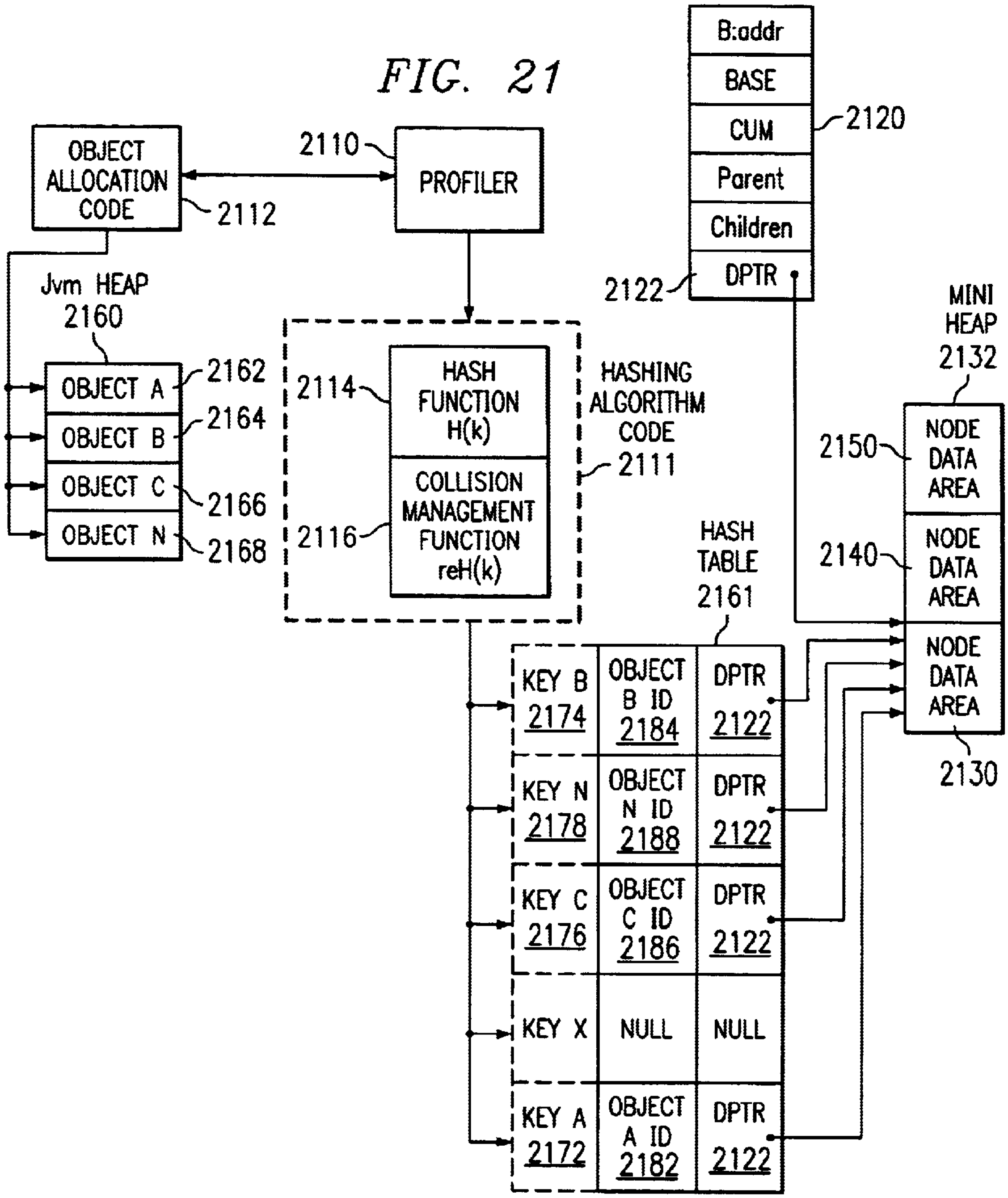
FIG. 21 is a block diagram depicting a data structure that may be used to facilitate tracking additional information related to a routine without increasing the object's size using a hash table in accordance with the present invention.

It would therefore be advantageous to store pointers in a data area outside the object itself rather than including the pointer within the object as it is being allocated. With reference now to FIG. 21, a block diagram depicting a data structure that may be used to facilitate tracking additional information related to a routine without increasing the object's size using a hash table in accordance with the present invention.

Node 2120 is similar to node 2020 depicted in FIG. 20 above, which in turn is one of the nodes depicted within FIG. 11A. Node 2120 includes a data item related to non-temporal profile statistics, DPTR 2122, which is a pointer to a node data area provided by the profiler. As discussed above, when a node is created, a node data area is not automatically allocated for the node, and its DPTR is initialized to zero or NULL.

Profiler 2110 allocates a node data area for a node, which represents a method that has had an object allocated. Node 2120 represents a method that has had at least one object allocation, so node 2120 has DPTR 2122 that points to node data area 2130, which is one of several node data areas residing in mini heap 2132 maintained by the profiler, such as, node data area 2140 and node data area 2150. Profiler 2110 may use a variety of data structures for maintaining the node data areas, such as, a linked list. As a node data area is needed for a node, a new element may be added to the linked list. Alternatively, the profiler has its own buffer area or "mini-heap" from which it may allocate space for each node data area. Space in mini heap 2132 has been allocated for node data areas 2150, 2140 and 2130.

Node data area 2130 may contain a variety of information related to a node including statistical data, or, as described in the U.S. application Ser. No. 09/414,331, memory allocation information. In the case of memory allocation, node data area 2130 may contain the number of object allocations, number of object deallocations, number of bytes allocated, number of bytes deallocated, and counts and classes of live objects.

In accordance with a preferred embodiment of the present invention, the hash table 2161 is used for storing pointers to node data areas rather than storing them inside the objects themselves. With reference to FIG. 21, as a method is called, profiler 2110 maintains a call stack tree structure in real-time for efficient storage and retrieval of information, such as, memory allocation information. Once a method is called, profiler 2110 allocates memory from its buffer area and initializes a hash table within the allocated memory.

Hash table 2161 is implemented as an array. Each node or slot in hash table 2161 contains a hash value (or key) and a pair of data values. The pair of data values comprise an object ID (or element) and a pointer to a node data area. A key is an integer generated from an element such as a string of text or in this case, an object ID. In the case of object allocations, object IDs are the elements to be hashed into unique key values. Therefore, the minimum number of unique key values needed for a method is also the number of objects allocated for a method. A key value is an integer that is substantially smaller than the element (or object ID) itself. A key is generated by a formula in such a way that it is unlikely that two elements or object IDs will produce the same key.

The range of the keys' values determines the size of the hash table so an ideal mapping function, H(t), limits the size of hash table 2161 without substantially increasing he number of collisions. Ideally, $$h(k)\Rightarrow(1,m)$$

maps each value of the key, k, to the range (1,m), where m is a maximum number of objects in the method that can be mapped to a unique key. Hash table 2161 requires that the mapping function, h(k), be a one-to-one mapping from each k to integers in (1,m), that is a perfect hashing function. Unfortunately, finding a perfect hashing function for all possible object IDs is not possible. Therefore, a small number of elements may map on to the same key.

When a key is generated from an object ID it is necessary to compare the key with the key slot in the hash table. Objects having identical IDs will map to the same slot, and since object IDs are unique each slot in the hash table should hold a unique element. However, a key may be hashed to a slot where a key has previously been hashed. This is called a collision. No two elements will occupy the same slot. A collision means that there is more than one unique element that hashed to a single slot of the hash table. Various techniques are used to manage collisions such as chaining, overflow areas, and re-hashing schemes. Re-hashing schemes include using neighboring slots (linear probing); quadratic probing; and random probing. Each of these techniques will be discussed briefly below.

Re-hashing schemes use a second hashing operation when there is a collision. If there is a further collision, another re-hash takes place until an empty "islot" in the hash table is found. The re-hashing function can either be a new function or a re-application of the hash function. The functions must be applied to a key in the same order.

Linear probing is one of the simplest re-hashing functions. For instance, varying the key by +1 (or −1) on a collision, allows for effectively looking in neighboring slots in the hash table for an empty slot. Linear probing quickly calculates the new slot address extremely effectively but is subject to a clustering phenomenon, wherein, re-hashes from one location occupy a block of slots in the table which "grows" towards slots to which other keys hash. Clustering invites more collisions and therefore, the number of re-hashed keys can become large.

Quadratic probing is where a secondary hash function depends on a re-hash index such as:

$$\text{address}=h(k)+c\cdot i^2$$

Since keys, which are mapped to the same value by the primary hash function, follow the same sequence of addresses, quadratic probing exhibits minor clustering.

Random probing utilizes a random function for rehashing a key after a collision.

In general, re-hashing schemes use the originally allocated hash table space and thus, avoid linked list overhead, but require advance knowledge of the number of items to be stored. However, collision elements are stored in slots to which other keys map directly thus, the potential for multiple collisions increase as the table becomes full. Therefore, the size of a hash table allocation is inversely proportional to the anticipated number of collisions.

Chaining involves linking all collisions in lists attached to the appropriate hash table slot. Chaining handles an unlimited number of collisions and doesn't require prior knowledge of how many keys are contained in the collection to be hashed.

Overflow areas are another scheme where the originally allocated hash table is divided into two sections: the primary area to which keys are mapped and an area for collisions; the overflow area. When a collision occurs, a slot in the overflow area is used for the new element and a link from the primary slot established as in a chained system. Overflow area schemes are essentially chaining, except that the overflow area is pre-allocated and thus possibly faster to access.

Returning to FIG. 21, until profiler 2110 calls the hashing algorithm code 2111, object hash table 2161 remains empty. When an object, e.g., object 2162, 2164, 2166 or 2168, is needed for the method, object allocation code 2112 allocates space in Jvm heap 2160 for the object, for instance, object A 2162. Object allocation code 2112 issues an object allocation event to the profiler 2110. Profiler 2110 calls the hashing algorithm code 2111 to determine a slot in hash table 2161 for a pointer to the data node area owned by the method. This is accomplished by hashing the object's unique ID using hash function H(k) 2114.

If object IDs are not addresses of the object and addresses from C MALLOCs are also handled, then an object type must be used to distinguish two objects with the same ID. For the purposes of this patent application, we assume that this object type is incorporated into the object ID and is thus always unique.

After the object allocation code 2112 has called the profiler 2110 with an object allocation event, the profiler 2110 allocates a pointer DPTR 2122 for node data area 2130. The profiler then calls hashing algorithm code 2111, which hashes object A's ID using hash function H(k) 2114. The result of hashing object A's ID is an integer key depicted as key A 2172. Hashing algorithm code 2111 then checks the object ID field of slot key A 2172 in hash table 2161. If a NULL is returned, key A 2172 is the proper slot for object A in hash table 2161. Space for DPTR 2122 in hash table 2161 is thereby reserved at a slot number having an integer value equal to key A 2172. Hashing algorithm code 2111 then stores object A ID 2182, in the object ID field and DPTR 2122 in a data pointer field in hash table 2161.

However, object A's hashed ID may collide with another previously stored hashed object ID in hash table 2160. In that case a NULL is not returned when hashing algorithm code 2111 checks the object ID field. An object ID might instead be returned. Suppose hash function H(k) 2114 produced key C 2176, rather than key A 2172. Because slot key C 2176 is presently occupied with object C ID 2186 a collision occurs. Hashing algorithm code 2111 returns object C ID 2186 rather then a NULL. Clearly hashing algorithm code 2111 cannot enter object A's ID data in slot key C 2176 because the fields are full. Therefore, hashing algorithm code 2111 returns to collision management function reH(k) 2116 for a new slot to check. Collision management function reH (k) 2116 may be any one of the schemes described above, however, it should be understood that the collision management scheme used for storing the data must be the collision management scheme used for accessing previously entered data. Collision management function 2116 returns another key, key A 2172 and hashing algorithm code 2111 again checks the object ID field at the slot number having an integer value equal to key A 2172. If a NULL is returned then object A ID 2182 is stored in the object ID field and DPTR 2122 is stored in the data pointer field.

Reclaiming deallocated objects works in reverse. When reclaiming deallocated objects, during garbage collection for instance, the garbage collection code sends an event to the profiler, which calls the hashing algorithm 2111 with the freed object's ID. The hashing algorithm hashes the Object's ID using hash function H(k) 2114, for example, object B. If key N 2178 is returned, the reclamation code checks the object ID field at the slot number having an integer value equal to key N 2178. Object N ID 2188 is returned and compared with object B's ID 2184. Because object B's ID 2184 is different from Object N ID 2188, a collision has occurred between object B's key 2174 and object N's key 2178. The reclamation code repeatedly returns to collision management system 2116 for another key until key B 2174 is returned. The reclamation code can then reclaim the slot in hash table 2160 by nulling or zeroing both the object ID field and the data pointer field. Slot key B 2174 in hash table 2160 would then have NULL written over both object B ID 2184 and DPTR 2122. With the data pointer nulled, the reference is lost from node data area 2130 to object B's slot in hash table 2160.

Alternatively, the object could be marked "freed" and all data pointers (DPTRs) left alone. In this case, the hashing algorithm would be augmented to never match on a "freed" object.

With reference now to FIG. 22, a block diagram more clearly depicting a relationship between a node data area and a hash table in a data structure, that may be used to facilitate tracking memory in accordance with another embodiment of the present invention. The diagram depicted in FIG. 22 is similar in many respects to the diagram depicted in FIG. 21, therefore, only the differences between the two will be described in detail.

Node 2220 owns node data area 2230 and contains pointer DPTR 2222 that points to node data area 2230. In this example, node data area 2230 holds memory usage information which tracks heap memory usage by node 2220.

A heap may contain either allocated or 'live' objects which are currently active, deallocated or 'dying' objects which have no reference to another object and therefore, are not active or free space. In the case of Java, the 'dying' objects are freed during garbage collection. Garbage collection is a routine that searches the memory heap for objects that are no longer active in order to reclaim that space. Any object that is not referenced is, by definition, not active. Objects that have been deallocated are not referenced and hence not active. A Garbage Collector's primary function is to make as much memory available in the heap as possible, but may also reorganize the distribution of the objects within the heap, known as compaction.

Returning to FIG. 22, node data area 2230 tracks memory usage by total allocations, measured by total allocated objects 2231 and total allocated bytes 2232 and by total live allocations, measured by total live objects 2233 and total live bytes 2234. Total allocations refer to the object count and space that has been allocated but may not currently be allocated, while live allocations refer to current object count and space allocations.

Node 2220 will contain pointer DPTR 2222 after one object has been allocated for the method. Each time an object is allocated the profiler increments the total allocations and total live allocations contained in node data area 2230. The pointer is then placed in hash table 2261 with the object's ID as described above with respect to FIG. 21.

In the present example, hash table 2261 comprises a series of slots each indexed to a unique key value, e.g., key values 2272–2278. Each slot contains an object ID field and a data area pointer field. In the present example the object ID column of hash table 2261 represents object A ID 2282, object B ID 2284, object C ID 2286 and object N ID 2288 as being allocated as each has a copy of pointer DPTR 2222 in their respective data pointer fields. The third column of hash table 2261 is set with a data pointer only when an object has been allocated for that particular slot in hash table 2261.

Total allocation objects 2231 and total allocation bytes 2232 stored in node data area 2230 are incremented as each of object A ID 2282, object B ID 2284, object C ID 2286, and object N ID 2288 is allocated. However, it cannot be known for certain from hash table 2261 if any or all of the objects are live. Hash table 2261 merely lists objects that were alive at some point since the last garbage collection. Therefore, the only accurate live object count can be acquired at garbage collection time. It is during garbage collection that the object deallocate event is issued.

In an alternative embodiment, the garbage collection code may only account for live objects. In this embodiment, the total live objects 2233 and total live bytes 2234 are both zeroed at the beginning of each garbage collection.

With reference now to FIG. 23, a flowchart depicts the process followed by object allocation code for allocating an object with trace support by utilizing a hash table in accordance with an alternative embodiment of the present invention. The process begins when the object allocation code allocates memory for an object for the current method (step 2302). The object allocation code sends an object allocation event to the profiler (step 2304). Next, a check is made by the profiler to determine if a hash table for the current method already exists (step 2306). If one does not exist the profiler allocates memory from its buffer area and initializes a hash table for the current method within the allocated memory (step 2308). Once a hash table has been initialized, or if the check at step 2306 determines that one already exists, the profiler calls the hashing code to determine the correct slot in the hash table in which to put the Object ID and the pointer to this method's node data area (step 2310). The profiler then increments the number of total and live objects allocated and the number of total and live bytes allocated for the method via the node data area pointer (step 2312). Optionally, the profiler may record additional information in the node data area; for example in addition to counts, the actual classes of the live objects could be recorded in a linked list in the node data area (not shown in FIG. 22.) The classes of live objects, while not usually necessary for memory leak detection, may be of interest to analysts and developers. The ability to record arbitrary information related to memory usage shows the 9 power and generality of the present invention. The process is complete with respect to the allocation of an object "owned" by a method.

Figure 24:
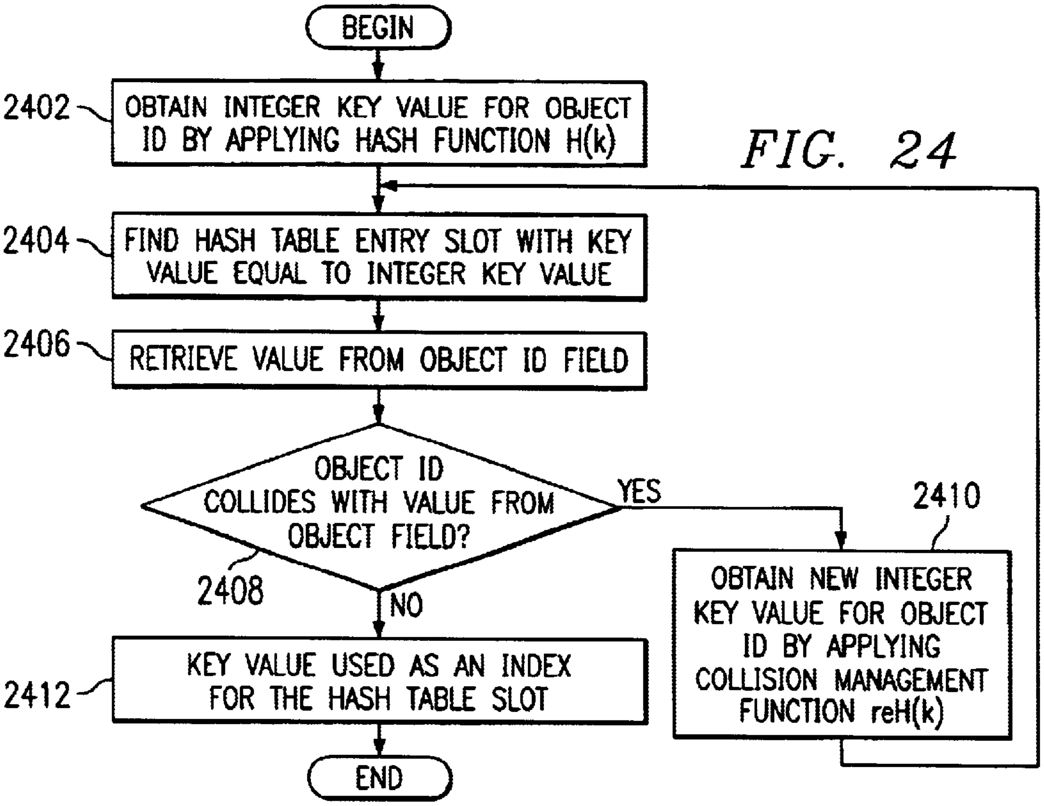
FIG. 24 is a flowchart depicts the process followed by the hashing code called by the profiler for finding the proper slot in the hash table for an object in accordance with a preferred embodiment of the present invention.

With reference now to FIG. 24, a flowchart depicts the process followed by the hashing code called by the profiler for finding the proper slot in the hash table for an object in accordance with a preferred embodiment of the present invention. This process expands on step 2310 shown in FIG. 23.

The process begins by hashing the object ID for a newly allocated object using hash function H(k) which returns an integer key value (step 2402). Using the integer key value, the object allocation code locates a slot in the hash table having an identical key value (step 2404). A value stored in the object field of the key value slot is retrieved (step 2406). Next, the object allocation code checks for collisions (step 2408). A collision can occur when the hash function generates a key for a slot that is already in use. Therefore, if any value other than NULL is retrieved from the object ID field, then a collision has occurred. Strictly speaking, if any other value other than the object ID is retrieved, a collision has occurred, as there are cases where the object may have been previously hashed and stored in the hash table. If a collision has occurred, a new key should be generated by either rehashing the object ID or the object ID and pointer should be stored in a chained list or an overflow area as described above. Assuming the profiler's memory allocation for the hash table does not support either a chained list or an overflow area, a new integer key value is generated from the object ID using rehash function reH(k) (step 2410). A new hash table entry slot is found for the new key value (step 2404) and the value held in that slot's object field is retrieved (step 2406) and checked for collision with the object ID (step 2408). The process flows through steps 2404–2410 until a slot is located for the object ID.

The process is then complete with respect to finding a slot in a hash table for an object ID. Once a key value is found with an open slot in the hash table, the key value is used as an index for the hash table slot (step 2412).

Figure 25:
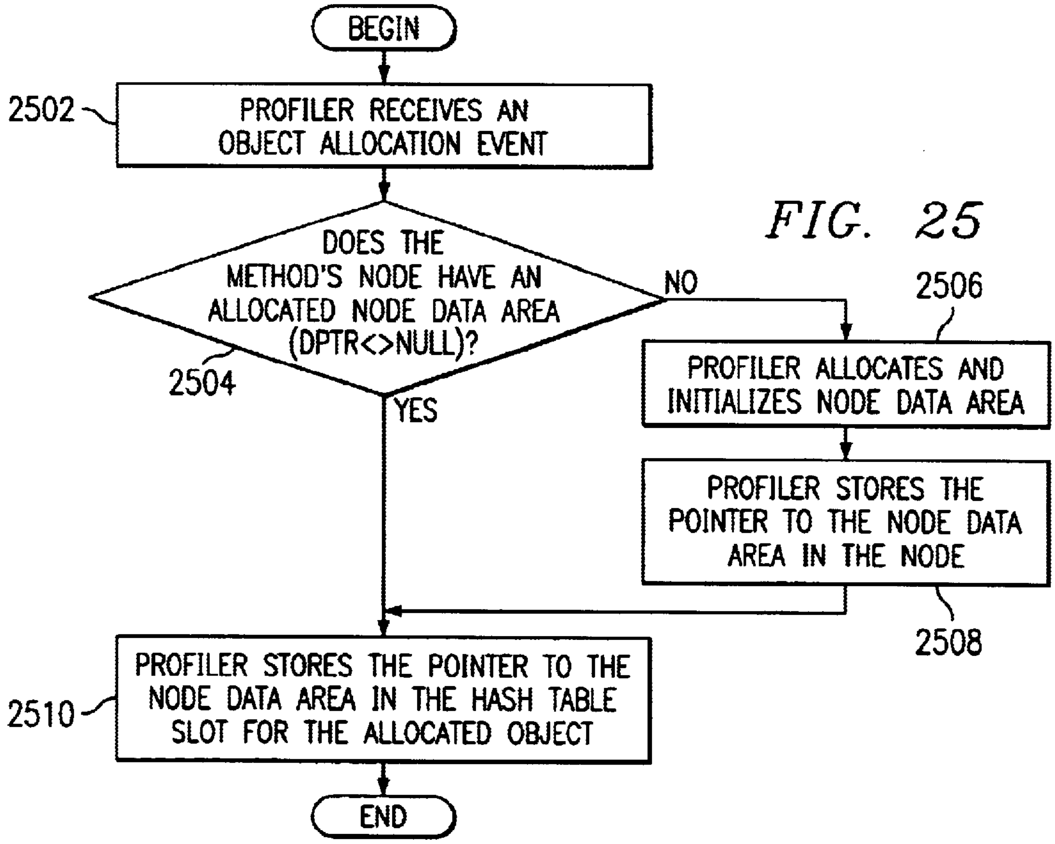
FIG. 25 is a flowchart depicting the process followed by the profiler for maintaining pointers to the node data area in accordance with a preferred embodiment of the present invention.

With reference now to FIG. 25, a flowchart depicting the process followed by the profiler for maintaining pointers to the node data area in accordance with a preferred embodiment of the present invention. This process is initiated by the object allocation code sending an event to the profiler, depicted as step 2304 shown in FIG. 23.

The process begins with the profiler receiving an event notifying it of the allocation of the object (step 2502). The profiler knows the identity of the currently executing thread that caused the allocation of the object, and the profiler also knows the identity of the current method executing within the current thread. The profiler maintains a call stack tree structure in real-time, so the profiler also has a pointer to the current node in the call stack tree structure in which the current node represents the currently executing method.

When an object is allocated, the profiler receives an object allocation event. A determination is made as to whether the node associated with the object allocation event, i.e., the node (in the call stack tree representation) representing the method that caused the object allocation event, contains a node data area pointer (step 2504). If not, then a node data area is allocated and initialized (step 2506), and the pointer to the node data area is stored within the node (step 2508), after which processing continues. In either case, once the node has a pointer to a node data area, the profiler stores the pointer to the node data area in the hash table slot for the object being allocated (step 2510, shown as step 2310 in FIG. 23) and the profiler can use this pointer to update information in the node data area during the profiling phase of a trace with memory leak detection support.

In a manner corresponding to the memory allocation tracking functionality of the object allocation code in the present invention, the object deallocation code, such as, a Garbage Collector, provides the corresponding memory deallocation tracking functionality.

Figure 26:
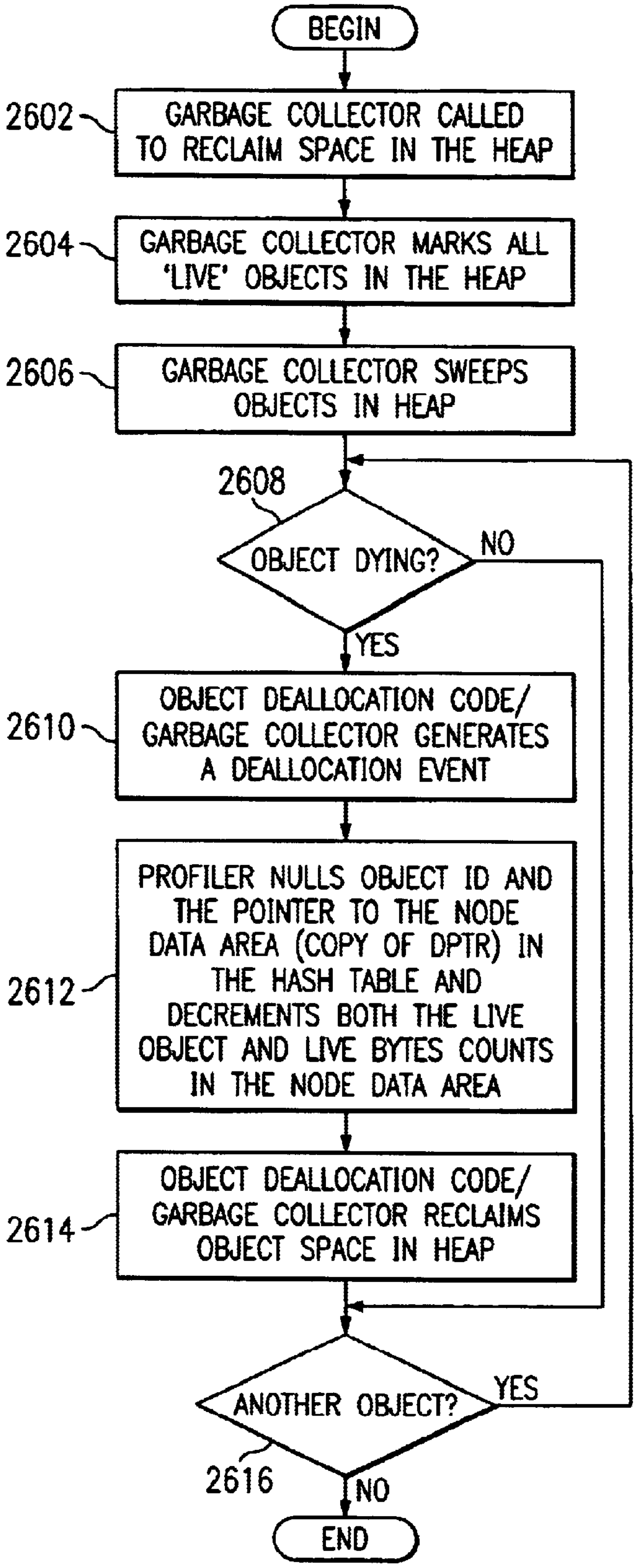
FIG. 26 is a flowchart depicting the process followed by object deallocation code for deallocating an object with trace support in accordance with a preferred embodiment of the present invention.

With reference now to FIG. 26, a flowchart depicting the process followed by object deallocation code for deallocating an object with trace support in accordance with a preferred embodiment of the present invention.

The process begins when the Object deallocation code/Garbage Collector has been called to reclaim space in the heap (step 2602). The object deallocation code/Garbage Collector may reclaim memory space in the heap using a variety of techniques, the present invention will be described using the mark and sweep garbage collection technique, however one of ordinary skill in the art would realize that other techniques could easily be employed. Using mark and sweep garbage collection, each object has a bit reserved for marking which is clear initially. During garbage collection all 'live' or allocated objects which have a reference are traced from the root and marked. Then the heap is swept wherein all objects are examined and unmarked objects are reclaimed as free space for the heap.

The mark and sweep process begins with each active object being marked as a live object in the heap (step 2604). After all live objects have been marked, the Garbage Collector sweeps the heap, one object allocation space at a time, checking each allocation space (step 2606). An object allocation space in the heap may consist of a live object (allocated), a dying object (deallocated) or may be free space. The allocation space is checked for a dying object (step 2608).

If the allocation space in the heap being checked contains a dying or deallocated object, the garbage collector/object deallocation code generates a deallocation event (step 2610). The profiler nulls the object ID and the pointer to the node data area (copy of DPTR) in the hash table, and decrements the live object and live bytes counters in the node data area (step 2612). Optionally, the profiler may record additional information in the node data area, such as the classes of deallocated objects. The object deallocation code/Garbage Collector reclaims its space in the heap and hashes the object ID (step 2614).

The mark and sweep process then continues by checking whether there is another object in the heap (step 2616). If so, the process returns to step 2608 to determine if the next object is dying.

Finally, returning to step 2608, if the object being swept is not dying, the object deallocation code/Garbage Collector takes no action. The mark and sweep process continues by checking whether there another object in the heap (step 2616). The process will continue through the heap until all object allocation spaces in the heap have been checked. Once all object allocation spaces have been checked the process ends. At this point, the node data areas contain accurate information about the live objects owned by each method at each point in the call stack tree, and reports such as those shown in FIGS. 34, 35, 36, and 37, described below, may be generated. Live object and byte counts may be compared with those at previous garbage collection points to detect memory leaks.

The process represented in FIG. 26 is described in terms of Java or other language with object deallocation done implicitly by garbage collection, but one of ordinary skill in the art will readily see that object deallocation events can be generated by the code that implements the FREE( ) call in C or C++, with the profiler handling the deallocation event exactly as described above. In this case the information in the node data areas is accurate at all times, and reports may be generated and checks for memory leaks performed at any convenient time.

Figure 27:
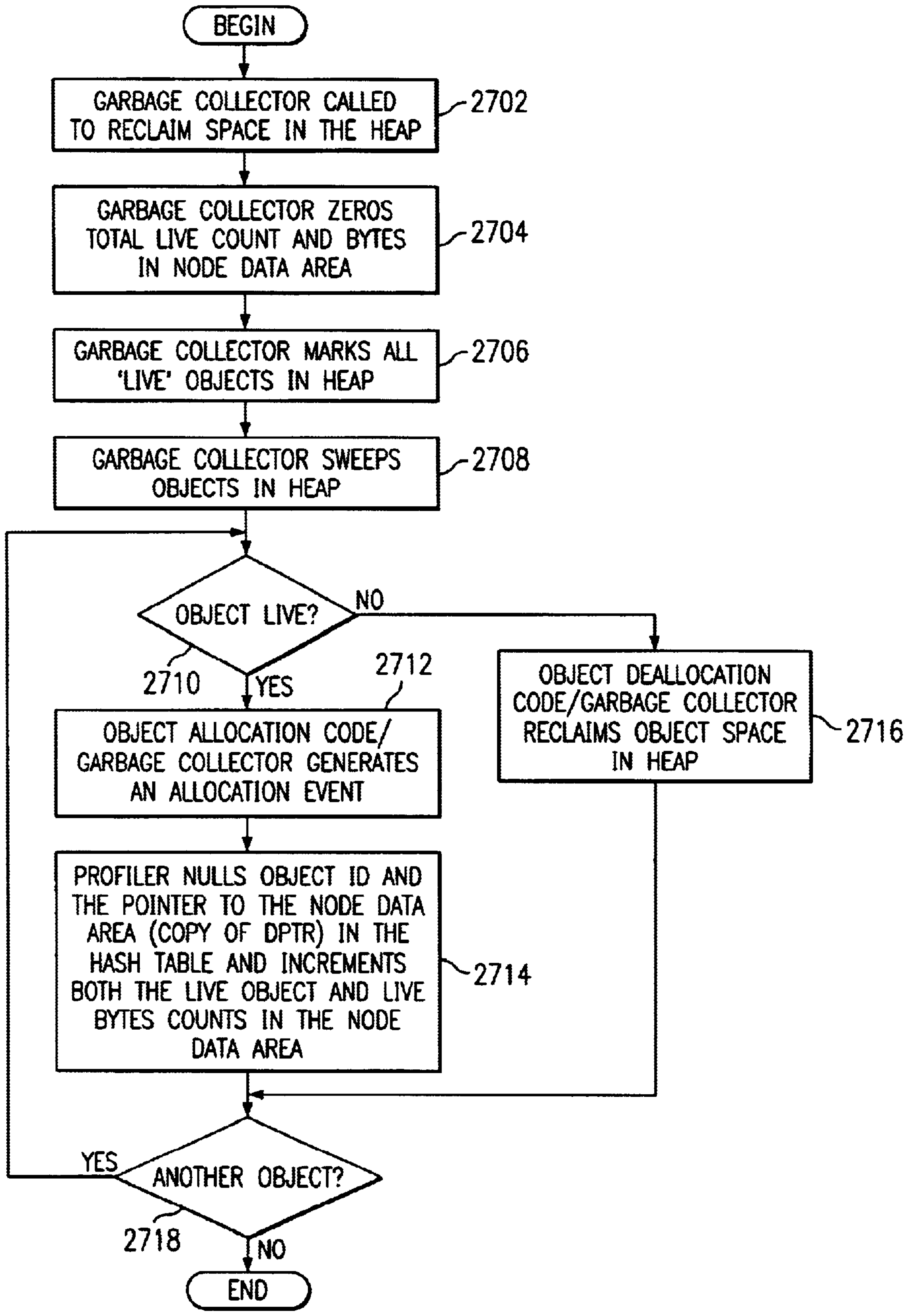
FIG. 27 is a flowchart depicting an alternate embodiment of the present invention that is specific to Java and other languages with implicit deallocation during garbage collection is depicted.

With reference now to FIG. 27, a flowchart depicting an alternate embodiment of the present invention that is specific to Java and other languages with implicit deallocation during garbage collection is depicted. In this embodiment, in response to allocation events the profiler builds and uses a hash table as discussed above or shadow heap entries as will be discussed below, but does not increment the live counts in the node data area. At the beginning of garbage collection the live counts in each node data area are zero. During the sweep phase of garbage collection, instead of generating events for each dying object, the garbage collector generates an event for each live object it encounters. In response to these events, the profiler increments the live object and live byte counts in the appropriate node data area. At the end of each garbage collection in which this is done, the live counts are accurate for each node in the call stack tree.

The alternate embodiment depicted in FIG. 27 can only be implemented for language implementations that include explicit garbage collection. However, for these languages, it has two advantages over the implementation depicted in FIG. 26. First, no work is done for objects that are allocated but that become dead before the next garbage collection, so memory leak detection is done with less total work. Second, an analyst may direct that some garbage collections be skipped, for example performing the process depicted in FIG. 27 only every tenth garbage collection; this might be appropriate for detecting slow leaks, and would further reduce the amount of processing needed to accomplish memory leak detection.

The process begins when the Garbage Collector has been called to reclaim space in the heap (step 2702). Next, the Garbage Collector zeros the total live count and bytes in the data area (step 2704). Similar to the mark and sweep process described in FIG. 26 above, the Garbage Collector first marks each active object in the heap as a live object (step 2706). After all live objects have been marked, the Garbage Collector sweeps the heap, one object allocation space at a time, checking each allocation space (step 2708). An object allocation space in the heap may consist of a live object (allocated), a dying object (deallocated) or may be free space. The allocation space is checked for a live object (step 2710).

If the allocation space in the heap being checked contains a live (or allocated) object, the Garbage Collector generates an allocation event (step 2712). The profiler nulls object ID and the pointer to the node data area (copy of DPTR) in the hash table, and increments the live object and live bytes counters in the node data area (step 2714). Optionally, the profiler may record additional information in the node data area such as the classes of the live objects. If, at step 2710 the Garbage Collector determines that the object is not live, then the Garbage Collector reclaims its space in the heap (step 2716).

The mark and sweep process then continues by checking whether there is another object in the heap (step 2718. If so, the process returns to step 2710 to determine if the next object is alive. The process will continue through the heap until all object allocation spaces in the heap have been checked. Once all object allocation spaces have been checked the process ends.

At this point, the node data areas contain accurate information about the live objects owned by each method at each point in the call stack tree, and reports such as those shown in FIGS. 34, 35, 36, and 37 described below, may be generated. Live object and byte counts may be compared with those at previous garbage collection points to detect memory leaks.

Figure 28:
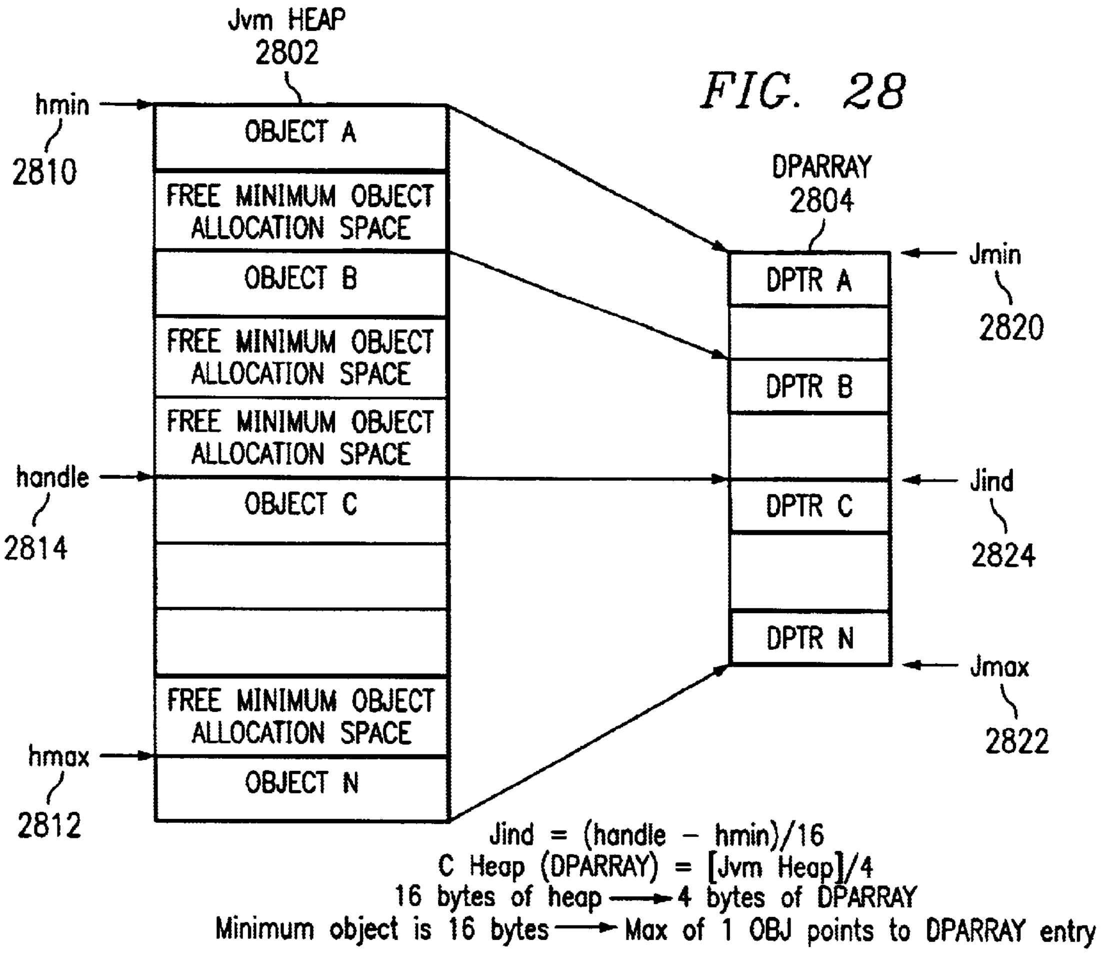
FIG. 28 is a block diagram depicting a data structure that may be used to facilitate tracking additional information related to a routine without increasing the object's size using a shadow heap instead of a hash table in accordance with the present invention.

With reference now to FIG. 28, a block diagram depicting a data structure that may be used to facilitate tracking additional information related to a routine without increasing the object's size using a shadow heap instead of a hash table in accordance with the present invention. Jvm heap 2802 represents a typical heap for storing objects. Jvm heap 2802 is allocated between address hmin 2810 and hmax 2812 in memory. Note that Jvm heap 2802 is subdivided into equal minimum object allocation spaces, for instance sixteen bytes each. Each minimum object allocation space may contain either a live object or a dying object, otherwise the minimum object allocation space is free. Jvm heap 2802 contains four objects, object A, object B, object C and object N. Objects A, B and N fit into one minimum object allocation space while object C utilizes three minimum object allocation spaces for storing the object.

As discussed above, one problem associated with increasing an object's size for incorporating a data pointer is allocating additional space in the heap for the object. If the modified object fits into the minimum allocation space designated for an object then no further work is necessary by the object allocation code. However, if the modified object does not fit within the minimum allocation area designated for the object, then the object allocation code allocates an additional minimum allocation space for the object.

This problem is alleviated by not storing the pointer to the node data area in the object, but instead storing it in a shadow heap associated with Jvm heap 2802. In accordance with a preferred embodiment of the present invention, DPARRAY 2804 is one-fourth the area of Jvm heap 2802. In the depicted example, DPARRAY 2804 is allocated between address Jmin 2820 and Jmax 2822 in memory which correlate to hmin 2810 and hmax 2812. DPARRAY 2804 is also subdivided into equal spaces, however, in the case of the shadow heap the minimum allocation space contains only enough memory for a data pointer to a node data area. The position of each data pointer in DPARRAY 2804 corresponds to the position of the object's handle in Jvm heap 2802. For example, object handle 2814 is positioned between hmin 2810 and hmax 2812 in Jvm heap 2802. Remembering that each minimum object space is sixteen bytes and that a data pointer in DPARRAY 2804 is one-fourth the size of a minimum object allocation space, or four bytes, the location of Jind 2824 within DPARRAY 2802 can be determined by:

Jind=(handle−hmin)/16

Note that FIG. 28 depicts free minimum object spaces between each object in Jvm heap 2802. Sometimes the garbage collector will compact the objects within Jvm heap 2802, thereby filling any free minimum object allocation spaces interspersed between the objects. It should be understood that because any data pointer for an object is located in DPARRAY 2804 using (handle−hmin)/16, that corresponding data pointer in DPARRAY 2804 is moved with the object handle.

As also discussed above, a data node area may contain a wide variety of data about the call stack and statistical information kept for the node. The information may directly relate to a particular object or may instead relate incrementally to objects used by the routine associated with a node.

Figure 29:
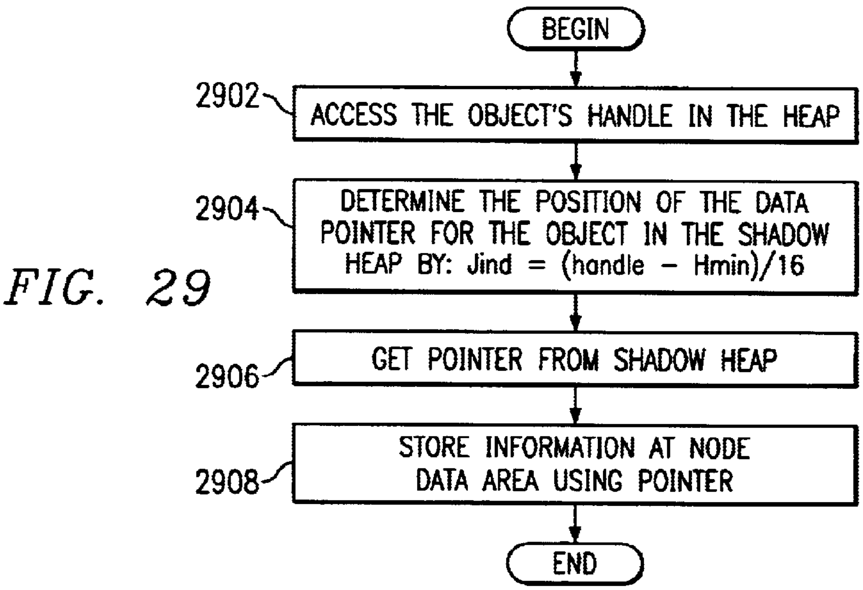
FIG. 29 is a flowchart depicting a process for storing information related to an object for trace support using a shadow heap in accordance with a preferred embodiment of the present.

With reference to FIG. 29, a flowchart depicting a process for storing information related to an object for trace support using a shadow heap in accordance with a preferred embodiment of the present. It is assumed that some information is available that must be stored in a node data area wherein the location of the node data area is not known. The process begins by accessing the object's handle in the heap (step 2902). In accordance with a preferred embodiment of the present invention a pointer to a node data area related to the object is stored in a shadow heap rather than in the object itself. Therefore, the position of the pointer to the node data area in the shadow heap can be calculated from the position of the object in the heap. The position of the data pointer in the shadow heap is determined by finding the position of the object's handle in the heap, relative to the first address of the heap (handle—hmin) and dividing that number by the minimum object space of sixteen (step 2904).

It should be understood that in the present example, a minimum object space contains sixteen bytes and the heap contains four times as much space as the shadow heap. However, one of ordinary skill in the art would realize that the minimum size of the object could be arbitrarily set as could the sizes of both the heap and the shadow heap without departing of the scope of the present invention. Finally, the pointer can be accessed in the shadow heap (step 2906) and the pointer used to store information related to the object in the node data area (step 2908).

Figure 30:
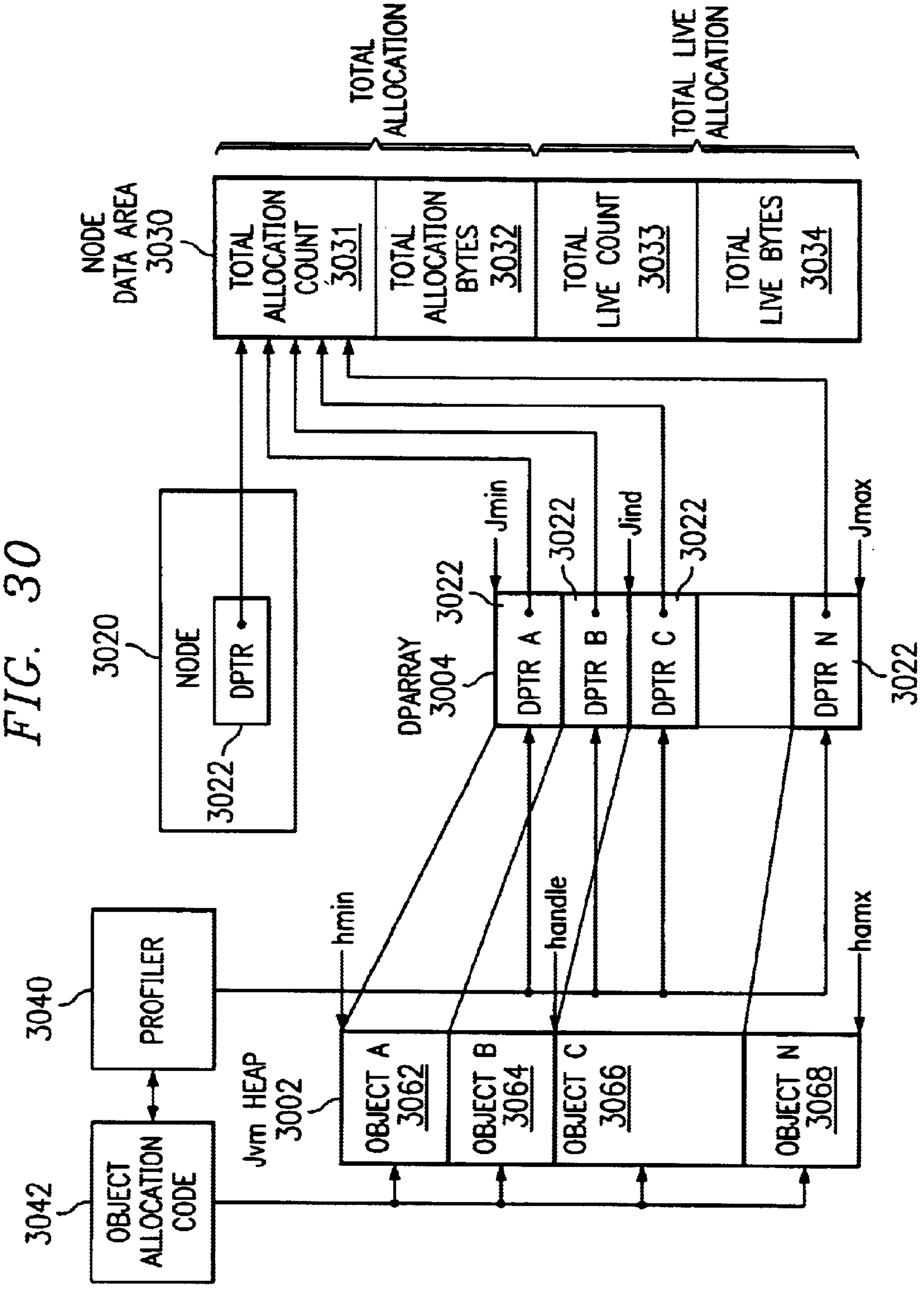
FIG. 30 is a block diagram depicting a relationship between a node data area and a shadow heap in a data structure that may be used to facilitate tracking memory in accordance with another embodiment of the present invention.

With reference now to FIG. 30, a block diagram depicting a relationship between a node data area and a shadow heap in a data structure that may be used to facilitate tracking memory in accordance with another embodiment of the present invention. In the depicted figure, node 3020 includes a data item related to non-temporal profile statistics, DPTR 3022, which is a pointer to a node data area provided by the profiler. As discussed above, when a node is created, a node data area is not automatically allocated for the node, and its DPTR is initialized to zero or NULL. Node 3020 owns node data area 3030 and contains pointer DPTR 3022 that points to node data area 3030. In accordance with a preferred embodiment of the present invention, node data area 3030 holds memory usage information which tracks heap memory usage by node 3020.

Profiler 3040 allocates a node data area for a node, which represents a method that has had an object allocated. Node 3020 represents a routine that has had at least one object allocation, so node 3020 has DPTR 3022 that points to node data area 3030, which may be one of several node data areas residing in a mini heap maintained by the profiler. Profiler 3040 may use a variety of data structures for maintaining the node data areas, such as, a linked list. As a node data area is needed for a node, a new element may be added to the linked list. Alternatively, the profiler has its own buffer area or "mini-heap" from which it may allocate space for each node data area.

Until object allocation code 3042 allocates an object, DPARRAY 3004 remains empty. When an object is needed for some method, object allocation code 3042 allocates space in Jvm heap 3002 for the object, for instance, object A. Object allocation code 3042 sends an allocation event to profiler 3040. Profiler 3040 owns the data structures necessary for tracking metrics associated with the routine, such as object allocation metrics. These data structures include a call stack tree which includes node 3020, DPARRAY 3004 and node data area 3030. Profiler 3040 stores a copy of a pointer to the node data area in DPARRAY 3004. This is accomplished by constructing DPARRAY 3004 such that a data pointer slot exists in DPARRAY 3004 that corresponds to each minimum object allocation space in Jvm heap 3002. Thus, DPARRAY 3004 contains a slot for each minimum object allocation space in Jvm heap 3002. Each data pointer is stored in the same relative position within DPARRAY 3004 as the position of the data pointer's corresponding object in Jvm heap 3002.

When an object is needed for a routine, object allocation code 3042 allocates the object and sends an object allocation event to profiler 3040. Profiler 3040 determines if the routine's node has been allocated a node data area. If not profiler 3040 allocates node data area 3030 and stores a pointer to the node data area in node 3020. Whether or not profiler 3040 allocates a node data area for the current node, node 3020, profiler 3040 stores a copy of pointer 3022 in DPARRAY 3004, in addition to storing a copy of DPTR 3022 if one has not been previously stored in node 3020. Profiler 3040 stores a copy of DPTR 3022 in the identical relative position in DPARRAY 3004 as object allocation code 3042 stores the allocated object in Jvm heap 3002.

When reclaiming deallocated objects, during garbage collection for instance, a data pointer associated with an object need not be nulled, as described in preferred embodiments directed at using a hash tables, because once the space for the object is reclaimed, the pointer is shadowing free space in the heap. Once that space is occupied by another object, the previous pointer is overwritten by a pointer related the new object. This is true whether the space is occupied by a new allocated object or by an object repositioned in the heap by compaction via the Garbage Collector.

In accordance with a preferred embodiment of the present invention, node data area 3030 tracks memory usage by total allocation and total live allocation. The total allocation is measured by total allocated count 3031 and total allocated bytes 3032. Similarly the total live allocation is measured by total live count 3033 and total live bytes 3034. Total allocation refers to the quantity of objects allocated and space allocated for the object(s) for the routine. Total allocation does not infer that the object is currently active. Live allocations, on the other hand, refer to the active object count and space allocations.

Node 3020 will contain pointer DPTR 3022 after one object has been allocated for the method. Each time an object is allocated profiler 3040 stores a copy of the pointer in a slot in DPARRAY 3004 that is relative to the object's position in Jvm heap 3002 and increments the total allocation count 3031 and the total allocation bytes 3032 contained in node data area 3030.

In the present example, total allocation count 3031 and total allocation bytes 3032 stored in node data area 3030 were each incremented as each of object A 3062, object B 3064, object C 3066, and object N 3068 were allocated. However, it cannot be known for certain from DPARRAY 3004 if any or all of the objects are live. DPARRAY 3004 merely lists pointers from objects that were alive at some point since the last garbage collection. Fn Therefore, the only accurate live object count can be acquired at garbage collection time.

Figure 31:
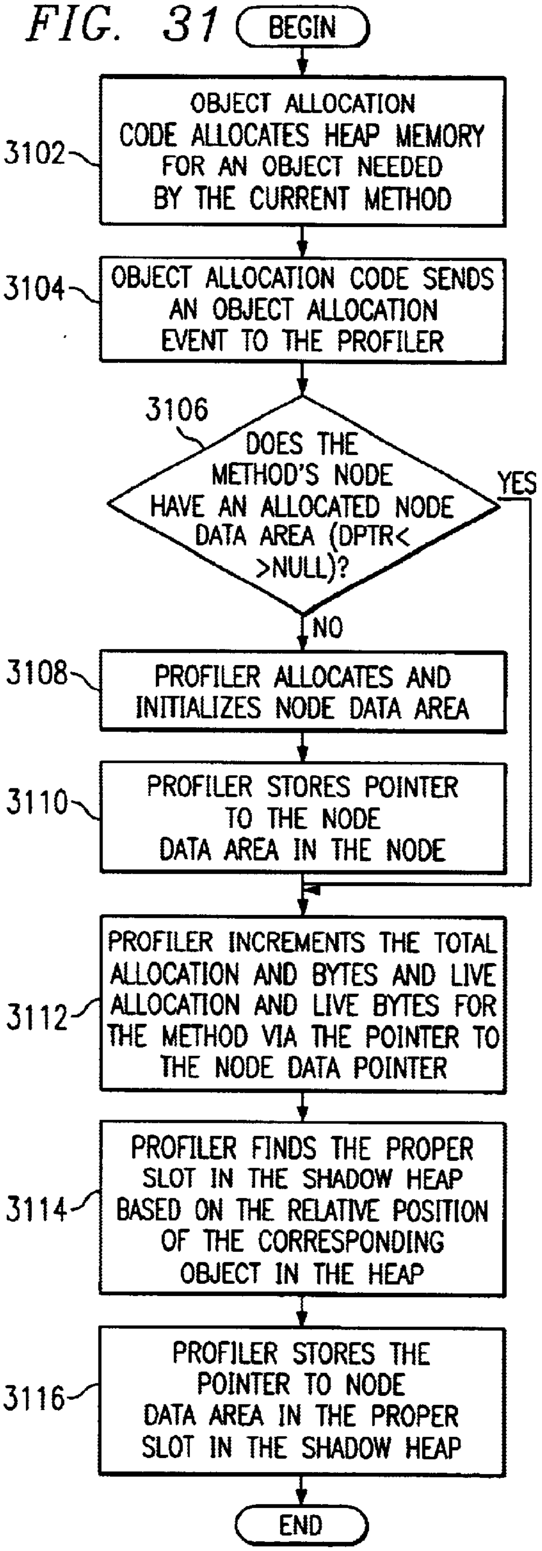
FIG. 31 is a flowchart depicting the process followed by the object allocation code for allocating an object with trace support, which utilizes a shadow heap in accordance with a preferred embodiment of the present invention.

With reference now to FIG. 31, a flowchart depicting the process followed by the object allocation code for allocating an object with trace support, which utilizes a shadow heap in accordance with a preferred embodiment of the present invention. The process begins when the object allocation code allocates memory for an object for the current method (step 3102). The object allocation code then sends an object allocation event to the profiler (step 3104).

Next, a check is made to determine if the method's node has previously been allocated a node data area (step 3106). If the node has not previously been allocated a node data area, the profiler allocates a data area for the node (step 3108) and then stores the pointer to the node data area in the method's node (3110). As discussed above, the node data area is used to store metrics being tracked for the method.

Returning to step 3106, in either case, the profiler increments the total allocation and bytes and the live allocation and bytes in the node data area for the method (step 3112). Optionally, the profiler may record additional information in the node data area such as the classes of the live objects.

Next, the profiler finds the proper slot for the pointer to the node data area in the shadow heap. The profiler identifies the correct slot for the pointer by finding the slot within the shadow heap having the same relative position within the shadow heap as the position of its corresponding object within the heap (step 3114). Determining the proper slot, or position of the pointer in the shadow memory was described above with respect to FIG. 29. The position of the pointer to the node data area in the shadow heap can be calculated from the position of the object in the heap. The position of the data pointer in the shadow heap is determined by finding the position of the objet's handle in the heap, relative to the first address of the heap (handle—hmin) and dividing that number by sixteen. The profiler then places the pointer to node data area in the;proper slot in the shadow memory (step 3116), and the process is complete with respect to the allocation of an object "owned" by a method.

Figure 32:
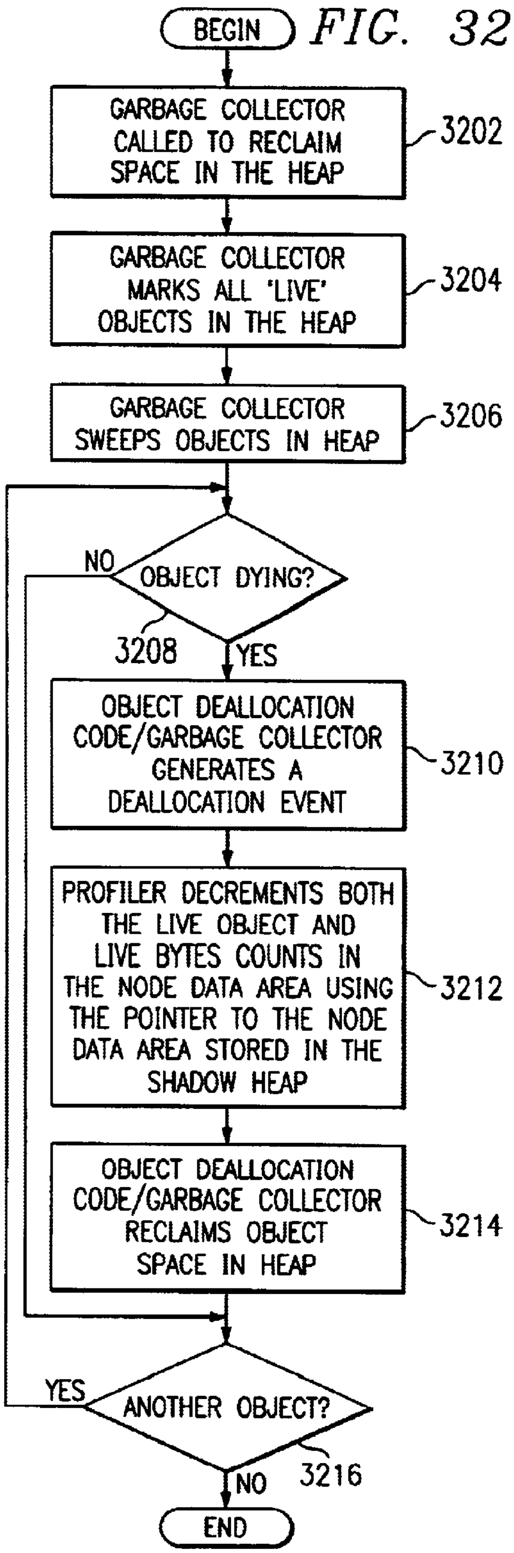
FIG. 32 is a flowchart depicting the process followed by object deallocation code for deallocating an object with trace support in accordance with a preferred embodiment of the present invention.
Figure 33:
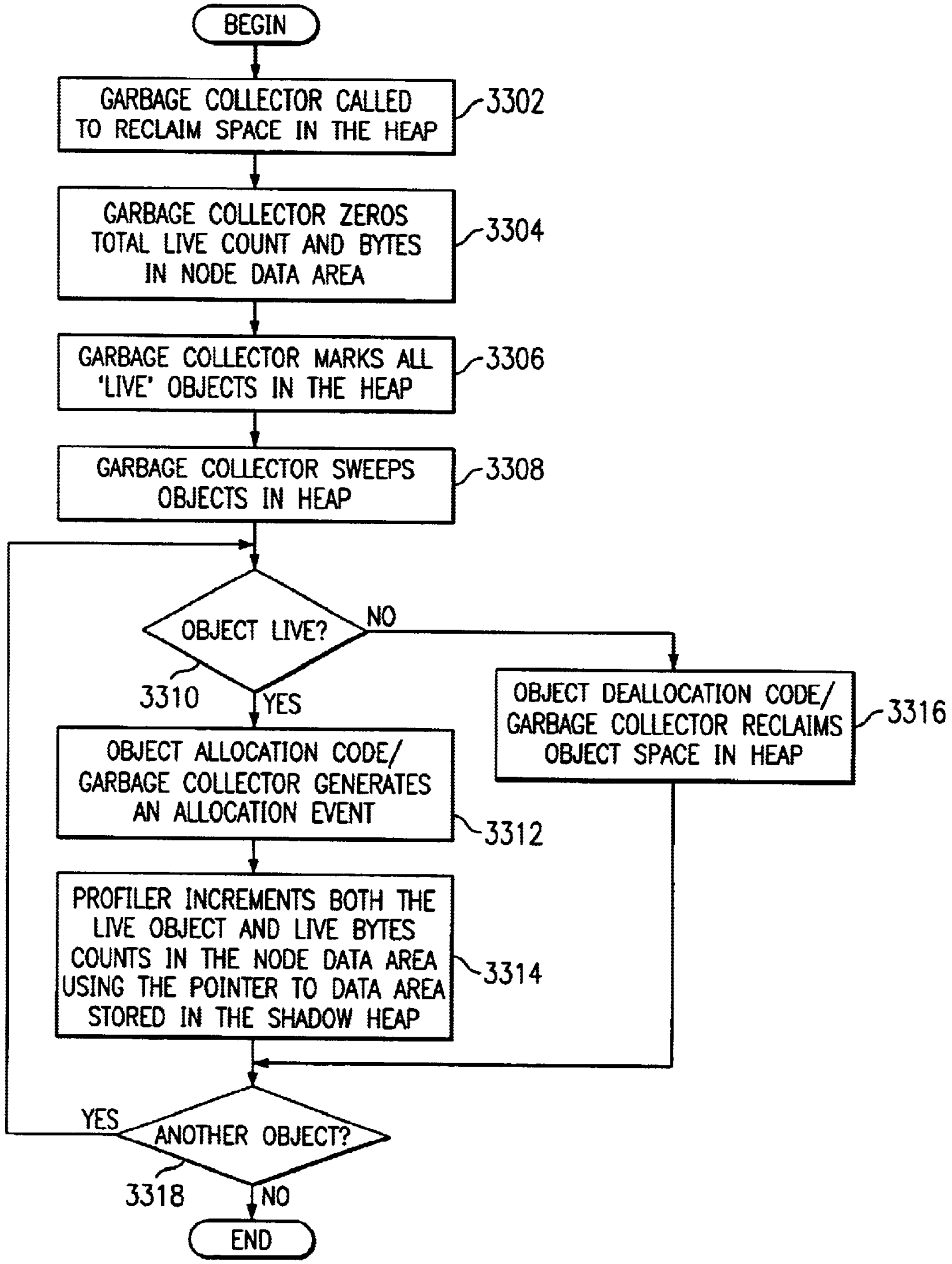
FIG. 33 is an alternate embodiment of the present invention that is specific to Java and other languages with implicit deallocation during garbage collection is depicted.

The profiler responds to object allocation and deallocation events almost identically whether the pointer to the node data area will be stored in a hash table or a shadow heap. FIGS. 32 and 33 depict processes that are similar to the processes described above with respect to FIGS. 26 and 27, respectively and therefore will not be discussed in detail.

With reference now to FIG. 32, a flowchart depicting the process followed by object deallocation code for deallocating an object with trace support in accordance with a preferred embodiment of the present invention. The process begins by calling the object deallocation code/Garbage Collector to reclaim space in the heap (step 3202). Using the mark and sweep garbage collection method, the process begins by marking each active object in the heap as a live object (step 3204) and then the Garbage Collector sweeps the heap for live objects, checking each minimum allocation space, one object allocation space at a time (step 3206). The process checks a minimum allocation space for a dying object (step 3208). If the minimum allocation space contains a dying object (deallocated object), the object deallocation code/Garbage Collector generates a deallocation event (step 3210). The profiler uses the pointer to the data node area stored in the shadow heap to decrement the live object and live bytes counters in the node data area (step 3212). Optionally, the profiler may record additional information in the node data area such as the classes of deallocated objects. The object deallocation code/Garbage Collector reclaims its space in the heap (step 3214).

The process continues by checking for another minimum allocation space in the heap (step 3216). If another space exists, the process returns to step 3208 to determine if an object in the space is dying. The process iterates from step 3208 to step 3216 until no other objects are present in the heap.

Returning again to step 3208, if the object being swept is not dying, the object deallocation code/Garbage Collector takes no action. However, the mark and sweep process continues by checking whether another object is present in the heap (step 3216). The process will continue through the heap until all object allocation spaces in the heap have been checked. Once all object allocation spaces have been checked the process ends. At the end of the process, the node data areas contain accurate metric values concerning the live objects owned by each method at each point in the call stack tree. Reports can then be generated such as those shown in FIGS. 34, 35, 36, and 37. Live object and byte counts may be compared with those at previous garbage collection points to detect memory leaks.

With reference now to FIG. 33, an alternate embodiment of the present invention that is specific to Java and other languages with implicit deallocation during garbage collection is depicted.

In this embodiment, the profiler builds a shadow heap in response to allocation events, but does not increment the live counts in the node data area. At the beginning of garbage collection the live counts in each node data area are zero. During the sweep phase of garbage collection, instead of generating events for each dying object, the garbage collector generates an event for each live object it encounters. In response to these events, the profiler increments the live object and live byte counts in the appropriate node data area. At the end of each garbage collection in which this is done, the live counts are accurate for each node in the call stack tree.

FIG. 33 describes an alternate embodiment which can only be implemented for language implementations that include explicit garbage collection. As discussed above with respect to the process depicted in FIG. 27 this embodiment has the advantage over the preferred embodiment depicted in FIG. 32 in that no work is done for objects that are allocated but that become dead before the next garbage collection. Thus, memory leak detection is done with less total work. Another advantage is that an analyst may direct that some garbage collections be skipped, for example performing the process depicted in FIG. 33 only every tenth garbage collection; this might be appropriate for detecting slow leaks, and would further reduce the amount of processing needed to accomplish memory leak detection.

The process begins when the Garbage Collector has been called to reclaim space in the heap (step 3302). The Garbage Collector zeros the total live count and bytes in the data area (step 3304). Object space reclamation is performed by first marking each active object in the heap as a live object (step 3306) and then examining each object allocation space in the heap, one object allocation space at a time (step 3308). The allocation space is checked for a live object (step 3310). If the allocation space being checked contains a live (allocated object), the Garbage Collector generates an allocation event (step 3312). The profiler increments the live object and live bytes counters in the node data area using the pointer to the node data area stored in the shadow heap in the same relative position as the object's position in the heap (step 3314). Optionally, the profiler may record additional information such as the classes of live objects.

If, at step 3310 the Garbage Collector determines that the object is not live, then the object allocation code/Garbage Collector reclaims its space in the heap (step 3316). The process continues by checking whether there another object in the heap (step 3318). If so, the process returns to step 3310 to determine if the next object is alive. The process will continue through the heap until all object allocation spaces in the heap have been checked. Once all object allocation spaces have been checked the process ends.

The advantages of the present invention should be apparent with reference to the detailed description provided above. The object allocation code, the object deallocation code, and the profiler are coordinated such that the object allocations and object deallocations are tracked through the profiler. Memory allocations and deallocations are not only tracked but also attributed to the methods that cause the memory transactions and the execution context (call stack) in which the methods performed the memory transactions. The number of allocations, deallocations, the number of bytes allocated, and the number of bytes deallocated for each method and/or thread can be traced, and the trace information can be post-processed and presented as useful information to a software developer or analyst. Examples of such information include, but are not limited to, FIGS. 34, 35, 36, and 37 presented below.

One of the simplest forms of information is a summary of all live objects at a given garbage collection, aggregated by class. FIG. 34 is an example of such a live object report. In table 3400 live objects and object bytes are listed per class for a single garbage collection. For each garbage collection time the linked list of classes is zeroed and rebuilt. From such a report an analyst may notice an unexpected number of live objects of a particular class, but this report gives the analyst no clue as to which method has created them.

FIG. 35 shows a small extract of a report attributing live objects to specific call stack configurations, showing memory allocation information for one particular call stack. In table 3500, total allocated objects, total allocated bytes, live objects, object bytes, and data pointer information are listed for each method in the call stack. The first column in table 3500 shows the level of each method on the stack, with level 0 identifying the method that was invoked first, level 1 a method it called, and so forth. In this example, method main called method screenSet_up which in turn called method parseCommandLine which in turn called method getToken. The next four columns show the total objects and bytes allocated over the life of the program, and the live objects and bytes at this particular garbage collection, respectively. The last two columns show the pointer to the node data area for this method on this call stack, and the method name, respectively.

Reports such as the one illustrated in FIG. 35 (but for the whole call stack tree, not just one call stack as shown in Table 3500) are usually sufficient to identify memory leaks in object oriented programs. The number of live objects for each method at successive garbage collection points can be compared, and methods whose live memory continues to grow are easily identified. Usually, the identity of the guilty method and its location in the call stack tree are sufficient because the software developer or analyst can detect the leak by inspection of the source code of the method once he knows which method to examine. However, if the method in question allocates many different classes of objects at many different locations in its code, additional information may be helpful.

FIG. 36 illustrates one example of additional information that can be reported if the profiler has collected the classes of live and dying objects in addition to the counts. Table 3600 gives the classes of all objects allocated by method parseCommandLine from table 3500 since the last garbage collection, and for each object, whether it is still alive or not. In this example, the method allocated three strings, which are no longer referenced, and an object of the Token class and a character array which are both still alive.

Finally, the information illustrated in table 3500 and table 3600 can be merged to produce a report identifying all allocated objects that are still alive, their class, and which method at which point in the call stack tree allocated them. FIG. 37 shows a small extract of such a report; table 3700 shows memory allocation information for one particular call stack. Four key metrics are reported for each method: "calls," "base," "cum" (short for cumulative), and the classes of all live objects. Calls indicates the number of times the method has been called since the program began execution. Base and cum both pertain to the amount of live memory. Base indicates the amount of live memory allocated directly by this method in the context defined by its set of parents. Cum indicates the amount allocated both by the method directly and by all of its children. Similarly, %Base is the percentage of all live memory allocated directly by this method, and %Cum indicates the percentage of all live memory allocated by the method and all of its children.

In this example, method getToken has allocated 55770 StringBuffer objects, each of size 640 bytes, one StringBuffer object for each time getToken has been called, and none of these objects has been freed. These objects account for over 75% of all live bytes, and may be the source of a memory leak. Verification of the leak is made by comparing live objects over subsequent object deallocations or Garbage collections.

The ability to not only detect memory leaks, but to pinpoint exactly the class of objects being leaked and the method and call stack responsible for the leak is a unique advantage of the present invention.

Although the present invention has been described above in terms of the Java runtime environment, one of ordinary skill in the art would readily realize that that the present invention could be implemented in other object oriented programming languages without departing for the scope of the invention. Call stack data for the heap leak detection may come from a variety of sources other than the Jvm heap. For example, call stack data may be obtained from a C heap memory allocation instrumentation. By utilizing a C heap the call stack can provide insight into which parts of the environment made the calls to MALLOC( ) and FREE( ). One of ordinary skill in the art would immediately understand that MALLOC( ) is a C standard library routine for memory allocation. MALLOC( ) takes the number of bytes required for a routine and returns a pointer to a block of that size rather than allocating minimum object allocation space (s) for an object as described above. Memory allocated with MALLOC must be reclaimed explicitly using the FREE( ) memory deallocation routine before the memory can be reused rather than by the Garbage Collector described in the preceding descriptions. However, the manner in which the allocation/deallocation code functions does not affect its applicability to the present invention. The advantages of the present invention are realized whether heap space is allocated for routines as contiguous predefined areas in the heap (such as minimum object allocation spaces) or a block of available memory. Similarly, the present invention functions equally well whether a 'live' object count is derived from implicit object deallocation code that reclaims heap memory as minimum object allocation spaces (such as a Garbage Collector), or from explicit deallocation code that reclaims heap memory as random sized blocks (such as FREE( )).

Note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purpose of illustration and description, but is not intended to be exhaustive or limited to the invention in the form disclosed. Many modifications and variation will be apparent to those of ordinary skill in the art. The embodiment was chosen and described in order to best explain the princiople of the invention, the particular application, and to enable others of ordinary skill in the art to understand the invention for varios embodiments with varios modifications as are suited to the particular use contemplated.

What is claimed is:

1. A method for profiling a program in a data processing system, the method comprising the computer-implemented steps of:

allocating a first object during execution of a function;

obtaining a reference to a profile data area associated with the function;

storing the reference in a shadow heap, wherein the shadow heap is a data structure in which references to profile data areas are stored at positions in the shadow heap that correspond to positions of corresponding objects in a memory heap; and updating object allocation metrics in the profile data area associated with the function.

2. The method of claim 1 further comprising:

placing the reference in a corresponding position in the shadow heap as the position of the first object in the heap.

3. The method of claim 1 further comprising:

incrementing an object allocation count in the profile data area associated with the function.

4. The method of claim 1 further comprising:

incrementing a byte allocation count in the profile data area associated with the function.

5. The method of claim 1 further comprising:

allocating a second object during execution of the function;

obtaining the reference to the profile data area associated with the function; and updating the object allocation metrics in the profile data area associated with the function.

6. The method of claim 1 further comprising:

receiving an object allocation event during execution of a current function;

determining whether the current function's node has been allocated profile data area; and returning a reference to the profile data area for the current function.

7. The method of claim 6 further comprising:

in response to a determination that a profile data area has not been allocated for the function, allocating a profile data area for the function.

8. The method of claim 7 further comprising:

storing the reference to the profile data area for the function in a call stack tree data structure.

9. The method of claim 1 further comprising:

obtaining, from the shadow heap, the reference to the profile data area associated with the function; and updating object allocation metrics in the profile data area associated with the function.

10. The method of claim 1 further comprising:

accessing the profile data area associated with the function; and comparing object allocation metrics and object deallocation metrics to identify memory leaks.

11. The method of claim 1 wherein the profile data area comprises execution context information for the function.

12. The method of claim 1 further comprising:

comparing object allocation metrics and object deallocation metrics to identify memory leaks;

ascertaining a memory leak, based on the comparison;

identifying a class of object being leaked, based on the comparison; and identifying a function and call stack responsible for the leak is a unique advantage of the present invention.

13. The method of claim 1, wherein updating object allocation metrics in the profile data area associated with the function further comprises;

incrementing a live object metric in the profile data area.

14. The method of claim 13 further comprising:

marking all live objects in a heap;

identifying at least one unmarked object in the heap;

deallocating the unmarked object;

retrieving a reference from the shadow heap, wherein the reference has the same relative position in the shadow heap as the unmarked object's position in the heap;

accessing the profile data area using the reference; and decrementing the live object metric in response to identifying the unmarked object.

15. The method of claim 1, wherein updating object allocation metrics in the profile data area associated with the function further comprises:

incrementing a total object metric in the profile data area.

16. The method of claim 15 further comprising:

marking a live object in a heap;

retrieving a reference from the shadow heap, wherein the reference has the same relative position in the shadow heap as the live object's position in the heap;

accessing the profile data area using the reference; and incrementing a live object metric in response to identifying the live object.

17. A method for profiling a program in a data processing system, the method comprising the computer-implemented steps of:

allocating a first object during execution of a function;

obtaining a reference to a profile data area associated with the function;

storing the reference in a hash table; and updating object allocation metrics in the profile data area associated with the function.

18. The method of claim 17, wherein storing the reference in a hash table further comprises:

hashing a first object identifier, wherein a first object identifier key is hashed;

comparing the first object identifier key with at least one slot index for the hash table; and storing the reference as a slot in the hash table, wherein the slot index and the first object identifier are identical.

19. The method of claim 17, wherein updating object allocation metrics in the profile data area associated with the function further comprises:

incrementing a live object metric in the profile data area.

20. The method of claim 19 further comprising:

marking all live objects in a heap;

identifying at least one unmarked object in the heap;

deallocating the unmarked object;

retrieving a reference from the hash table based on the identity of the unmarked object;

accessing the profile data area using the reference; and decrementing the live object metric in response to identifying the unmarked object.

21. The method of claim 17, wherein updating object allocation metrics in the profile data area associated with the function further comprises:

incrementing a total object metric in the profile data area.

22. The method of claim 21 further comprising:

marking a live object in a heap;

retrieving a reference from the hash table based on the identity of the marked object;

accessing the profile data area using the reference; and incrementing a live object metric in response to identifying the live object.

23. A method for profiling a program in a data processing system, the method comprising the computer-implemented steps of:

allocating a first object in a heap during execution of a function;

determining whether a profile data area associated with the function has been allocated;

obtaining a reference to a profile data area associated with the function in response to a profile data area associated with the function having been allocated;

storing the reference external to the object in a data structure wherein a position of the reference in the data structure corresponds to a position of the object in the heap; and updating object allocation metrics in the profile data area associated with the function.

24. The method of claim 23, wherein the reference is stored in one of a hash table and a shadow heap.

25. The method of claim 21 further comprising:

identifying a live object in the heap;

accessing the reference stored external to the object; and updating the object allocation metrics in the profile data area associated with the function based on identifying a live object.

26. The method of claim 25 further comprising:

accessing the profile data area associated with the function; and comparing object allocation metrics and object deallocation metrics to identify memory leaks.

27. The method of claim 25 wherein the profile data area comprises at least one of live object count metric, live object bytes metric, total allocated object count metric and total allocated object bytes metric.

28. The method of claim 25 further comprising:

comparing object allocation metrics and object deallocation metrics to identify memory leaks;

ascertaining a memory leak, based on the comparison;

identifying a class of object being leaked, based on the comparison; and identifying a function and call stack responsible for the leak is a unique advantage of the present invention.

29. The method of claim 23, wherein storing the reference external to the object further comprises:

generating a key by hashing the object's identifier;

checking a slot in a hash table for an object entry, wherein the slot is indexed by the key; and storing the reference in the hash table.

30. The method of claim 23, wherein checking a slot in a hash table for an object entry, wherein the slot is indexed by the key further comprises:

generating another key by rehashing the object's identifier in response to the slot containing object entry.

31. A data processing system for profiling a program in a data processing system, the data processing system comprising:

allocating means for allocating a first object during execution of a function; obtaining means for obtaining a reference to a profile data area associated with the function;

storing means for storing the reference in a shadow heap, wherein the shadow heap is a data structure in which references to profile data areas are stored at positions in the shadow heap that correspond to positions of corresponding objects in a memory heap; and updating means for updating object allocation metrics in the profile data area associated with the function.

32. The data processing system of claim 31 further comprising:

placing means for placing the reference in a corresponding position in the shadow heap as the position of the first object in the heap.

33. The data processing system of claim 31 further comprising:

incrementing means for incrementing an object allocation count in the profile data area associated with the function.

34. The data processing system of claim 31 further comprising:

incrementing means for incrementing a byte allocation count in the profile data area associated with the function.

35. The data processing system of claim 31 further comprising:

allocating means for allocating a second object during execution of the function;

obtaining means for obtaining the reference to the profile data area associated with the function; and updating means for updating the object allocation metrics in the profile data area associated with the function.

36. The data processing system of claim 31 further comprising:

receiving means for receiving an object allocation event during execution of a current function;

determining means for determining whether the current function's node has been allocated profile data area; and returning means for returning a reference to the profile data area for the current function.

37. The data processing system of claim 36 further comprising:

allocating means for allocating a profile data area for the function in response to a determination that a profile data area has not been allocated for the function.

38. The data processing system of claim 37 further comprising:

storing means for storing the reference to the profile data area for the function in a call stack tree data structure.

39. The data processing system of claim 31 further comprising:

obtaining means for obtaining, from the shadow heap, the reference to the profile data area associated with the function; and updating means for updating object allocation metrics in the profile data area associated with the function.

40. The data processing system of claim 31 further comprising:

accessing means for accessing the profile data area associated with the function; and comparing means for comparing object allocation metrics and object deallocation metrics to identify memory leaks.

41. The data processing system of claim 31 wherein the profile data area comprises execution context information for the function.

42. The data processing system of claim 31 further comprising:

comparing means for comparing object allocation metrics and object deallocation metrics to identify memory leaks;

ascertaining means for ascertaining a memory leak, based on the comparison;

identifying means for identifying a class of object being leaked, based on the comparison; and identifying means for identifying a function and call stack responsible for the leak is a unique advantage of the present invention.

43. The data processing system of claim 31, wherein the updating means for updating object allocation metrics in the profile data area associated with the function further comprises:

incrementing means for incrementing a live object metric in the profile data area.

44. The data processing system of claim 43 further comprising:

marking means for marking all live objects in a heap;

identifying means for identifying at least one unmarked object in the heap;

deallocating means for deallocating the unmarked object;

retrieving means for retrieving a reference from the shadow heap, wherein the reference has the same relative positioned in the shadow heap as the unmarked object's position in the heap;

accessing means for accessing the profile data area using the reference; and decrementing means for decrementing the live object metric in response to identifying the unmarked object.

45. The data processing system of claim 31, wherein the updating means for updating object allocation metrics in the profile data area associated with the system further comprises:

incrementing means for incrementing a total object metric in the profile data area.

46. The data processing system of claim 45 further comprising:

marking means for marking a live object in a heap;

retrieving means for retrieving a reference from the shadow heap, wherein the reference has the same relative positioned in the shadow heap as the live object's position in the heap;

accessing means for accessing the profile data area using the reference; and incrementing means for incrementing a live object metric in response to identifying the live object.

47. A computer program product for profiling a program in a data processing system, the product comprising the computer-implemented instructions of:

allocating instructions for allocating a first object during execution of a function;

obtaining instructions for obtaining:a reference to a profile data area associated with the function;

storing instructions for storing the reference in a shadow heap, wherein the shadow heap is a data structure in which references to profile data areas are stored at positions in the shadow heap that correspond to positions of corresponding objects in a memory heap; and updating instructions for updating object allocation metrics in the profile data area associated with the function.

48. The computer program product of claim 47 further comprising:

placing instructions for placing the reference in a corresponding position in the shadow heap as the position of the first object in the heap.

* * * * *

UNITED STATES PATENT AND TRADEMARK OFFICE

CERTIFICATE OF CORRECTION

PATENT NO. : 6,658,652 B1 
DATED : December 2, 2003
INVENTOR(S) : Alexander, III et al.

It is certified that error appears in the above-identified patent and that said Letters Patent is hereby corrected as shown below:

<u>Column 46,</u>
Line 42, after “for obtaining”, delete “:”.

Signed and Sealed this

Tenth Day of January, 2006

JON W. DUDAS
*Director of the United States Patent and Trademark Office*